United States Patent [19]

Wayne et al.

[11] Patent Number: 5,377,116
[45] Date of Patent: Dec. 27, 1994

[54] METHOD AND SYSTEM FOR DESIGNING A CUTTING TOOL

[75] Inventors: Steven F. Wayne, Scituate; David A. O'Neil, Waltham, both of Mass.; Charles E. Zimmerman, Clarkston; Yefim Val, Troy, both of Mich.

[73] Assignee: Valenite Inc., Madison Heights, Mich.

[21] Appl. No.: 724,305

[22] Filed: Jul. 1, 1991

[51] Int. Cl.$^5$ .............................. G06F 15/46
[52] U.S. Cl. .................. 364/474.17; 364/474.24; 364/474.16; 395/904
[58] Field of Search .................. 364/474.02, 474.24, 364/474.15, 474.16, 474.17, 474.24, 474.26, 468, 578, 551.01, 551.02; 395/902-904, 911-912, 914

[56] References Cited

U.S. PATENT DOCUMENTS

| | | |
|---|---|---|
| D. 308,387 | 6/1990 | Valerius . |
| 4,567,774 | 2/1986 | Manahan et al. .............. 73/826 |
| 4,992,948 | 2/1991 | Pilland et al. ................ 364/474.15 |
| 5,106,290 | 4/1992 | Carver et al. ................. 425/470 |
| 5,197,013 | 3/1993 | Dundorf ....................... 364/474.24 |
| 5,202,837 | 4/1993 | Coe et al. ..................... 364/578 |
| 5,210,704 | 5/1993 | Husseiny ...................... 364/551.01 |
| 5,251,144 | 10/1993 | Ramamurthi ................. 364/474.17 |

OTHER PUBLICATIONS

J. S. Strenkowski and G. L. Mitchum, "An Improved Finite Element Model of Orthogonal Metal Cutting," Mfg. Technology Review-NAMRC XV, pp. 506–509 (1987).
J. S. Strenkowski and J. T. Carroll, "A Finite Element Model of Orthogonal Metal Cutting," ASME J. of Engineering for Industry, vol. 107, pp. 349–354, Nov. 1985.
K. Iwata, K. Osakada, & Y. Terasaka, "Process Modeling of Orthogonal Cutting . . . Method," ASME J. of Eng. Matls. & Technology, vol. 106, pp. 132–138, Apr. 1984.
E. Usui, "Progress of Predictive Theories in Metal Cutting," ASME Intl. Journal, Series III, vol. 31, No. 2, pp. 363–369, 1988.
Y. Yao, D. Jamieson, I. Jawahir, & X. D. Fang, "Computer Animation . . . Metal Machining," Trans. NAM-RI/SME, pp. 161–166, 1990.
T. H. C. Childs & K. Maekawa, "Computer-Aided Simulation . . . Cemented Carbide Tools," Wear, 139, pp. 235–250, 1990.
V. I. Nachev and P. L. B. Oxley, "Predicting Cutting Conditions . . . Work Material Properties," Proc. Intl. Machine Tool Design & Res. Conf. pp. 225–230, 1985.
D. Lee, "The Effect of Cutting Speed . . . Orthogonal Machining," ASME J. of Eng. for Industry, vol. 107, pp. 55–62, Feb. 1985.
Grechishnikov, V. A. "Integrated CAD Systems for Designing Cutting Tools and Machine Parts", 1988, Soviet Engineering Research vol. 8, No. 8, New York US, pp. 112–118.
Kirsanov, G. N., "Tooling Management in Flexible Manufacture", 1988 Soviet Engineering Research, vol. 8, No. 8, New York US, pp. 109–111.
Machine Design, "Design, Modeling and Analysis" vol. 62, No. 21, Oct. 1990, Cleveland, Ohio, USA. pp. 23–44.
Komanduri, R., et al, "On the Catastrophic Shear Instability in High-Speed Machining of an AISI 4340 Steel", May 1982, vol. 104, pp. 121–131, Journal of Engineering for Industry.

Primary Examiner—Jerry Smith
Assistant Examiner—Thomas E. Brown
Attorney, Agent, or Firm—Harness, Dickey & Pierce

[57] ABSTRACT

A method of designing a cutting tool uses finite element numerical models to predict a response of the tool during a simulated cutting operation on a workpiece, and to simulate a chip-flow phenomenon occurring during the cutting operation. The chip-flow model incorporates representations of a fracture mechanism describing a chip separation phenomenon, a heat-generating mechanism describing a thermal coupling phenomenon, and a shear localization mechanism describing a shearing phenomenon wherein these phenomena occur during the cutting operation. The predicted tool response and the chip-flow simulation are evaluated by an artificial intelligence system to render rule-based judgments which are embodied in recommendations for continuously modifying the models and input design variables until the simulation and response converge to an optimal result.

53 Claims, 29 Drawing Sheets

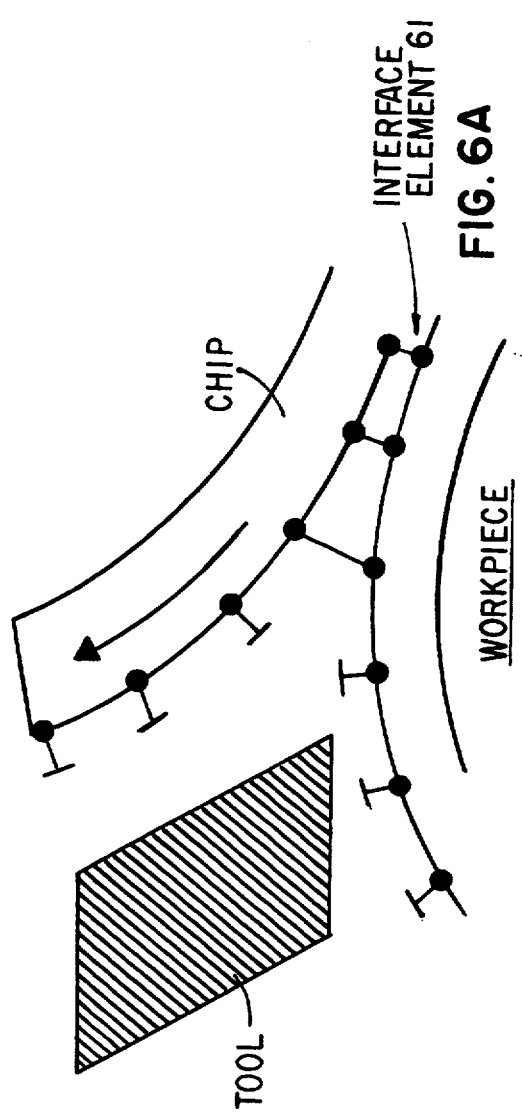
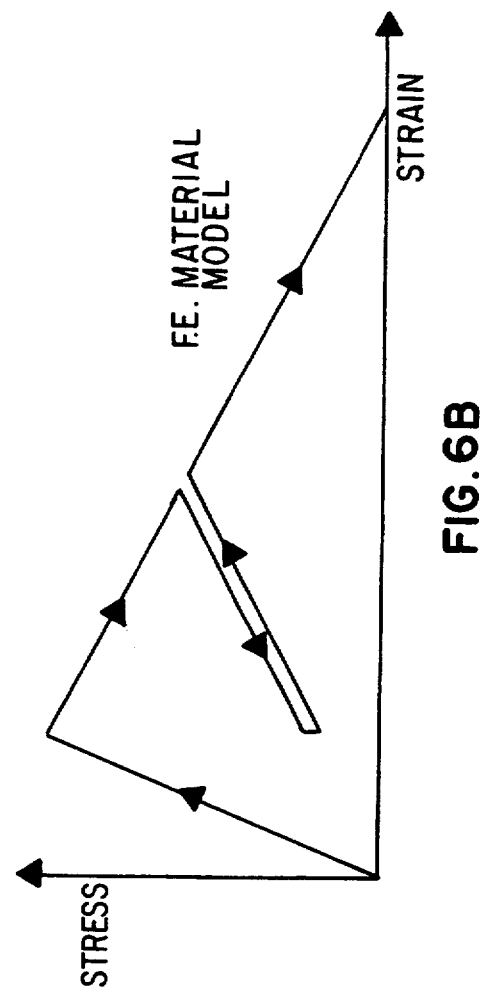
FIG. 6A
FIG. 6B

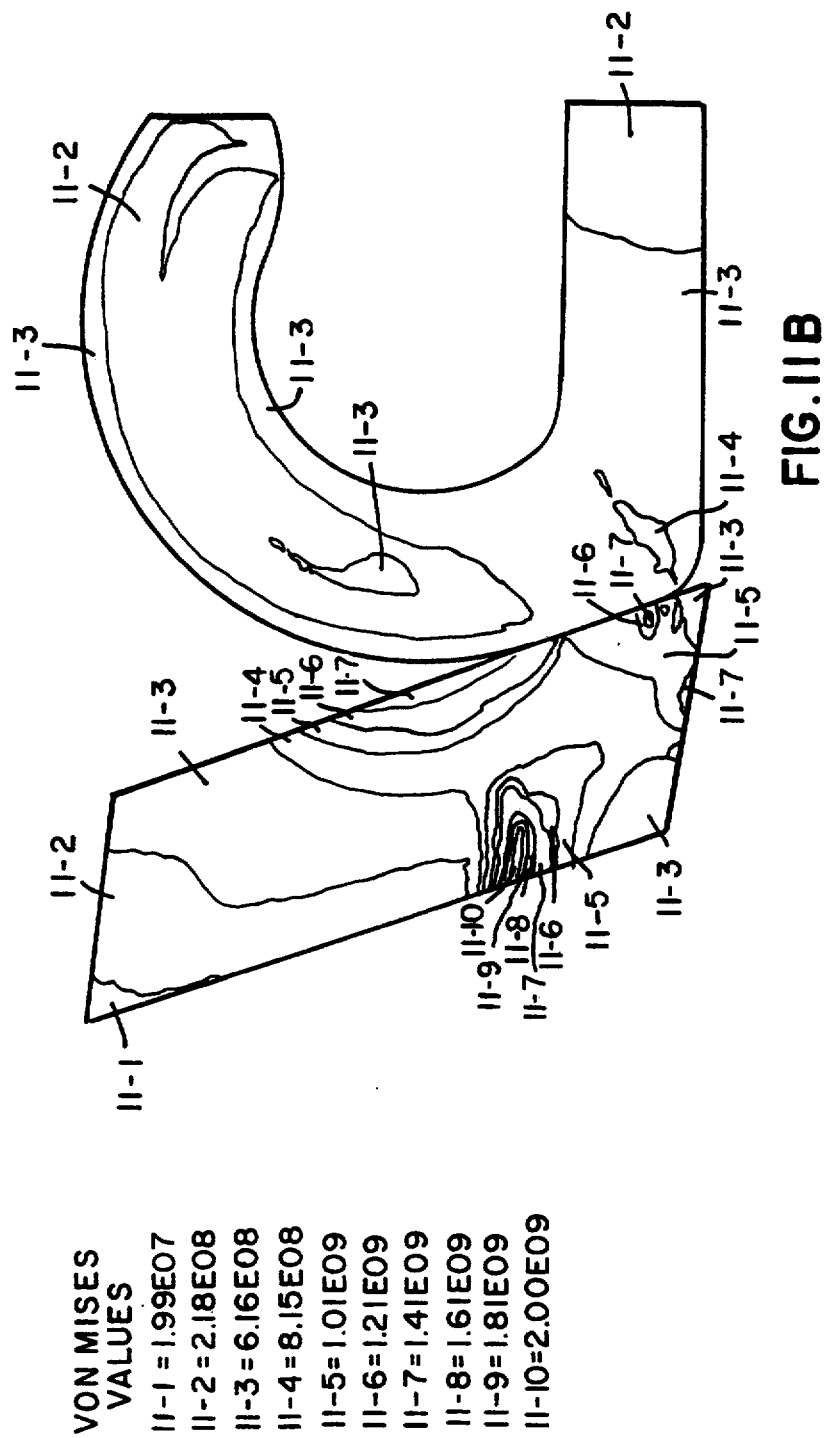

METHOD AND SYSTEM FOR DESIGNING A CUTTING TOOL

FIELD OF THE INVENTION

The present invention is directed to cutting tools and, more particularly, to a method for designing a cutting tool by evaluating predicted tool response and chip-flow simulations of simulated cutting operations.

BACKGROUND OF THE INVENTION

The design of cutting tools, and their utilization in machining materials under various cutting conditions, has traditionally relied upon a combination of experience and empirical data. Disadvantageously, this approach is very time consuming, costly, and difficult to apply. With the introduction of new cutting tool materials such as ceramics and cermets, there exists in the prior art an even greater demand for chip control, tool reliability and high performance in view of the complex cutting conditions under which these new tools are subjected.

In conventional product design cycles, the cutting-tool design engineer usually begins the design of a new tool with a specific product objective such as: (i) requirement to cut a specific material, or (ii) utilization of a particular cutting speed, feed or depth of cut in a lathe, mill, or other cutting machine. Based on previous tool design experience, the designer selects the tool material which usually consists of a hard substrate such as WC-Co with suitable coatings applied to the surface for further protection against tool wear.

The chipbreaker geometry of the cutting tool surface is specified based on tool material and machining conditions, and a prototype tool is constructed in accordance with this geometry and the design specifications. Conventional machinability tests for evaluating the performance of the tool typically consist of applying the prototype tool insert to the specified workpiece material over a range of machining conditions such as cutting speed, depth of cut, and feed rate. As the tool insert is applied to the workpiece, chips are formed with characteristics particular to each cutting condition. These chips are preferably used to construct a chip-board matrix depicting the chip geometries as a function of range of speeds and feeds for a selected workpiece material. The chip board is then used to determine the optimal range of cutting conditions for the newly designed insert based upon chip morphology, chip microstructure, machine dynamic response (such as chatter, noise, and power consumption), and wear characteristics of the cutting tool. A desired chip geometry results when the excess workpiece material is cut into small, discrete fragments curled substantially in the shape of the numeral '6'. Long or 'stringy' chips are considered unacceptable since they reduce the performance of unmanned machining centers and produce a safety hazard to machine-tool operators.

Disadvantageously, the prototypical tool design procedure of the prior art typically does not meet its desired performance objectives in the first several iterations of this design and testing process, thereby causing the designer to repeat the procedure until a suitable level of performance is attained. This is a time-consuming process, further delayed by the difficulty in manufacturing new prototype tool inserts. For example, prototype cutting tools based on the WC-Co material mentioned above are manufactured by powder metallurgy methods but require a complex and expensive punch-and-die set for cold pressing the powders. Furthermore, redesign or rework in the tool design or manufacturing operations lead to further delays and lead-time in the development of new products.

Another aspect of tool development in the prior art is the unavailability of results from previous machinability studies for use in evaluating tool response. For example, a characteristic of the cutting tool industry is that information accumulated by individual tool designers based on their experience with diverse machining operations is typically not made available to the tool industry since the industry lacks a mechanism for collecting and disseminating such information. Consequently, there exists in the industry a need to consolidate the prior information gained in machinability tests, and to integrate this data into a system whereby tool design experience can be stored and easily accessed in a computerized data base.

While the cutting tool industry has historically designed new tools by repeatedly manufacturing and testing tool prototypes as discussed above, the prior art has recently used mathematical models of the metal-cutting process to predict the shear plane angle, outgoing chip thickness, and forces exerted on the tool insert. Examples of such predictive models are discussed by E. M. Trent in Metal Cutting, Butterworths, 1984; M. C. Shaw in Metal Cutting Principles, MIT Press, 1968; and by N. N. Zorev in Metal Cutting Mechanics, Pergamon Press, 1966. Most of these models incorporate an elastic-plastic material model, but with no temperature or rate effects included. Good agreement with experimental results can be achieved with these models for the shear plane angle related to the rake angle and chip thickness. However, these models fail to adequately describe the process in that they do not account for friction along the tool-chip interface, strain hardening of the workpiece, temperature and rate-dependent properties of the workpiece, and the mechanics of separation of the chip from the workpiece. Later modifications to these models are disclosed by Boothroyd et al. in "Effects of Strain Rate and Temperature in orthogonal metal cutting," J. of Mechanical Eng. Science, 1966 and Stevenson et al.

As a further modification, Strenkowski and Carroll in "A finite element model of orthogonal metal cutting," ASME Journal of Engineering for Industry (1985) and Usui in "Progress of predictive theories in metal cutting," JSME International Journal (1988) discuss finite element models of the cutting process, The simulations with these models occur under orthogonal cutting conditions so that plane theories of deformation can be applied, and require machinability data as input (such as chip-shape and flow lines). However, these models are only applicable at very low cutting speeds. Additionally, Benton et al. in "An adiabatic heating finite element analysis of metal cutting," MIT (1986), Iwata et al. in "Process modeling of orthogonal cutting by the rigid-plastic finite element method," ASME J. of Engineering Materials and Technology (1984), and Strenkowski, supra, illustrate the separation of the chip from the workpiece by a release of certain nodes in the finite element mesh as the chip slides across the surface of the tool. Lee et al. in "Material modeling and high-speed machining processes," Advanced Machining Research Program Annual Report, General Electric Co., Schenectady, N.Y. (1982) illustrate the separation by the 'death' of certain elements by removing them from following iterations of the solution procedure. Analyses using rigid-plastic material properties for the chip at low cutting speeds under isothermal conditions were also performed as disclosed in Iwata et al., supra and Lee et al., supra. Iwata's model included a fracture prediction of the chip from the workpiece, based on the ductile fracture strain of the steel under consideration.

Strenkowski, supra, and Strenkowski and Mitchum in "An improved finite element model of orthogonal metal cutting," Manufacturing Technology Review-NAMRC XV (1987) illustrate an updated Lagrangian approach for the investigation of the cutting process. The material model of the workpiece was thermo-elasto-plastic with friction at the interface of the tool and chip. A parting-line criterion was used for the separation of the chip from the workpiece, and a critical strain measure was implemented to determine when the chip would separate. Large volumes of the workpiece and tool were modeled in this approach, thus resulting in prohibitively large computation times.

Benton et al., supra, abandoned the concept of a strain-to-failure at the debonding of the chip from the workpiece in favor of a release criterion based on the distance of the workpiece from the tip of the cutting tool.

In summary, the prior art in the design and selection of cutting tools has lacked an integrated system for readily accessing machining data and tool design experience from a database, for comprehensive and accurate modelling of the physical phenomena in cutting operations, and for adaptively evaluating tool response and chip-flow simulations.

SUMMARY OF THE PRESENT INVENTION

The present invention is directed to a method of designing a cutting tool based on a simulated cutting operation characterized by linear and non-linear physical phenomenon defining the cutting operation of a tool on a workpiece. The method comprises the steps of representing said linear phenomenon with a modifiable linear model which simulates said linear phenomenon in response to value assignments for modifiable input parameters, and further comprises the step of representing said non-linear phenomenon with a modifiable non-linear model which simulates said non-linear phenomenon in response to value assignments for modifiable input parameters. The step of exercising said linear model derives the simulation of said linear phenomenon, while the step of exercising said non-linear model derives the simulation of said non-linear phenomenon. The simulations are evaluated with an adaptive judgment base in a dynamic learning environment, wherein the simulations and evaluation are integrated into said learning environment. The input parameters are continuously modified in accordance with said evaluation until an acceptable evaluation is achieved.

BRIEF DESCRIPTION OF THE DRAWINGS

FIG. 6 shows a debonding finite element in accordance with the present invention;

FIG. 11B shows the 2-D FEA stress results from a thermally coupled simultaneous analysis of a cutting tool and metal chip with interface friction;

DETAILED DESCRIPTION OF PREFERRED EMBODIMENTS

Figure 1:
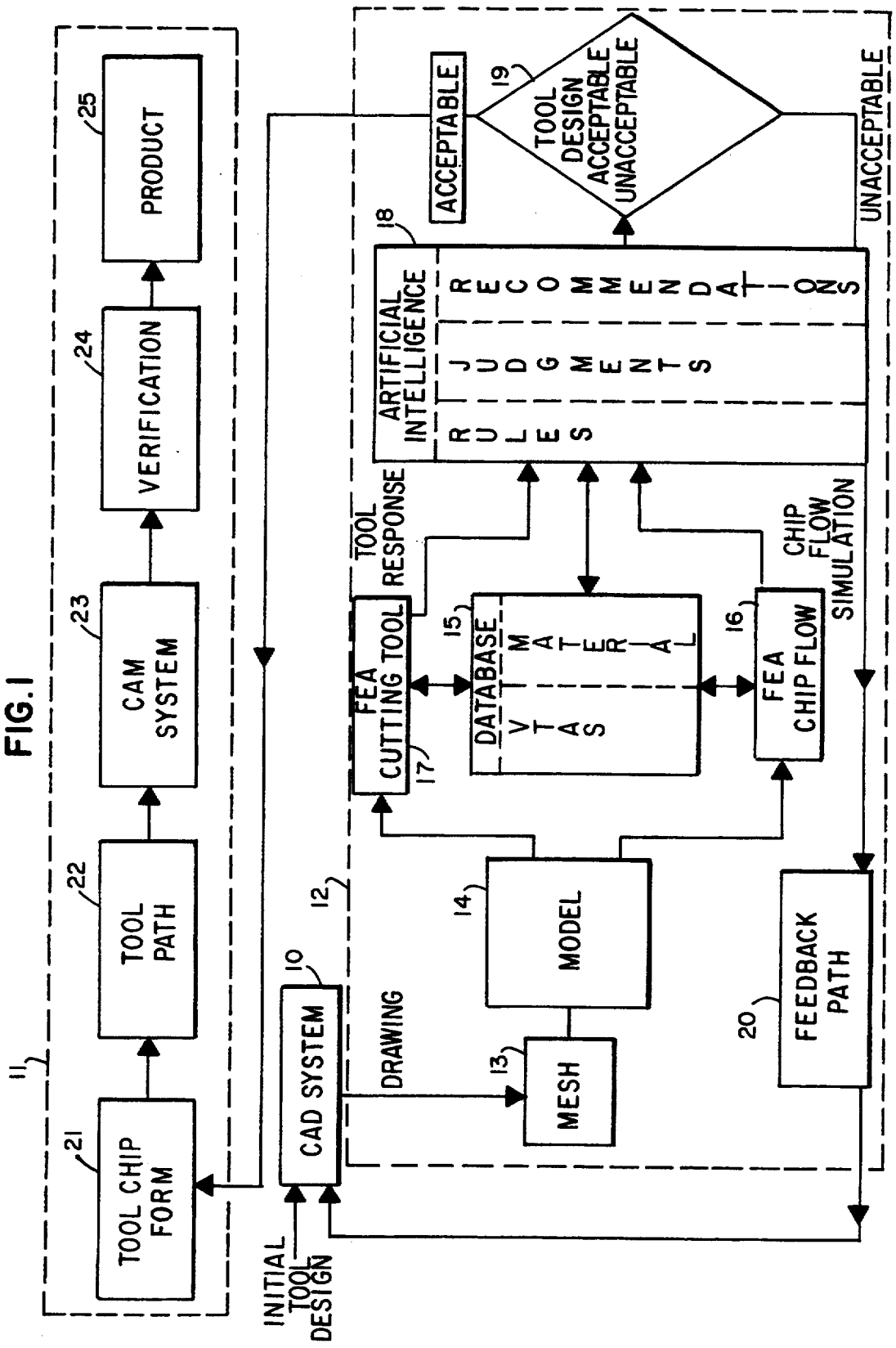
FIG. 1 shows a block diagram of a cutting tool system in accordance with the present invention.

The method for designing a cutting tool in accordance with the present invention is implemented by the system shown in block diagram format in FIG. 1. The system includes a CAD (Computer Aided Design) module 10, a manufacturing module 11, and an analysis module 12 for receiving a tool design, predicting the performance of the tool design in simulated cutting operations, and manufacturing a prototype tool based on an optimal tool design from module 12. The following sections detail the functions and operations performed by each module in FIG. 1, and illustrate the information flow among the integrated modules.

I. Simulation and Modeling

The analysis module 12 includes a mesh module 13 for creating a finite element mesh of a cutting tool geometry, a model generator 14 for providing mathematical models based on the mesh geometries, a database 15 including a materials database and a tool cutting database, a Finite Element Analysis (FEA) Chip-Flow module 16 for performing a finite element analysis of the chip formation process, an FEA Cutting Tool Module 17 for performing a finite element analysis of the cutting tool response, and an artificial intelligence (AI) module 18 for (i) evaluating the results from modules 16 and 17 by applying the simulation and response results to a rule-based comparison hierarchy and by rendering judgments based on the comparisons, and (ii) proposing a recommendation for a new tool design embodying modifications to the models and input parameters. A decision module 19 reviews the recommendation and awards control of the system to either feedback module 20 for further analysis based on the evaluation, or to manufacturing module 11 to construct a prototype tool when the tool design is acceptable.

Figure 2A:
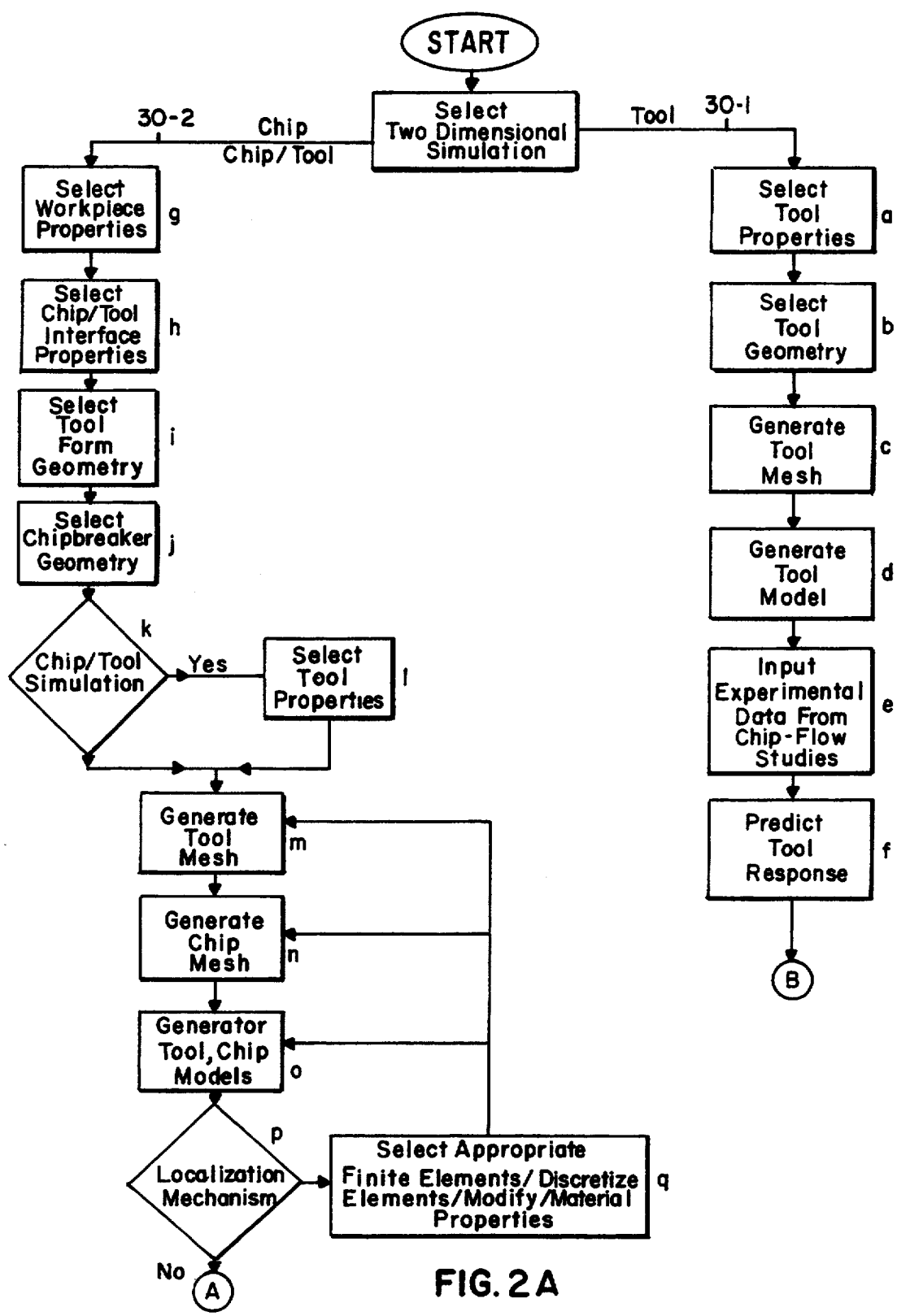
FIGS. 2A-2C are flow diagrams illustrating the function of module 12 in FIG. 1.
Figure 2B:
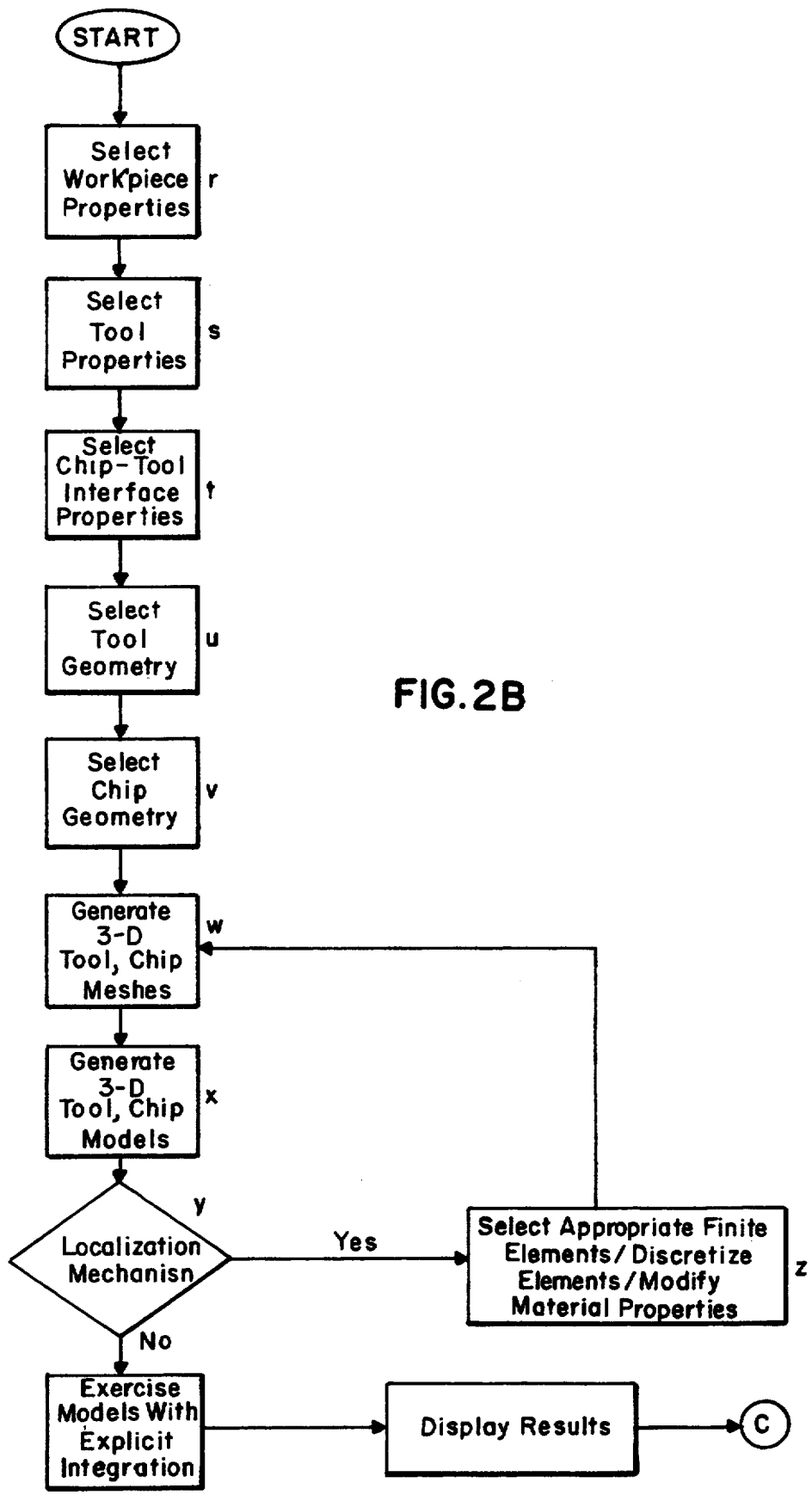
Figure 2C:
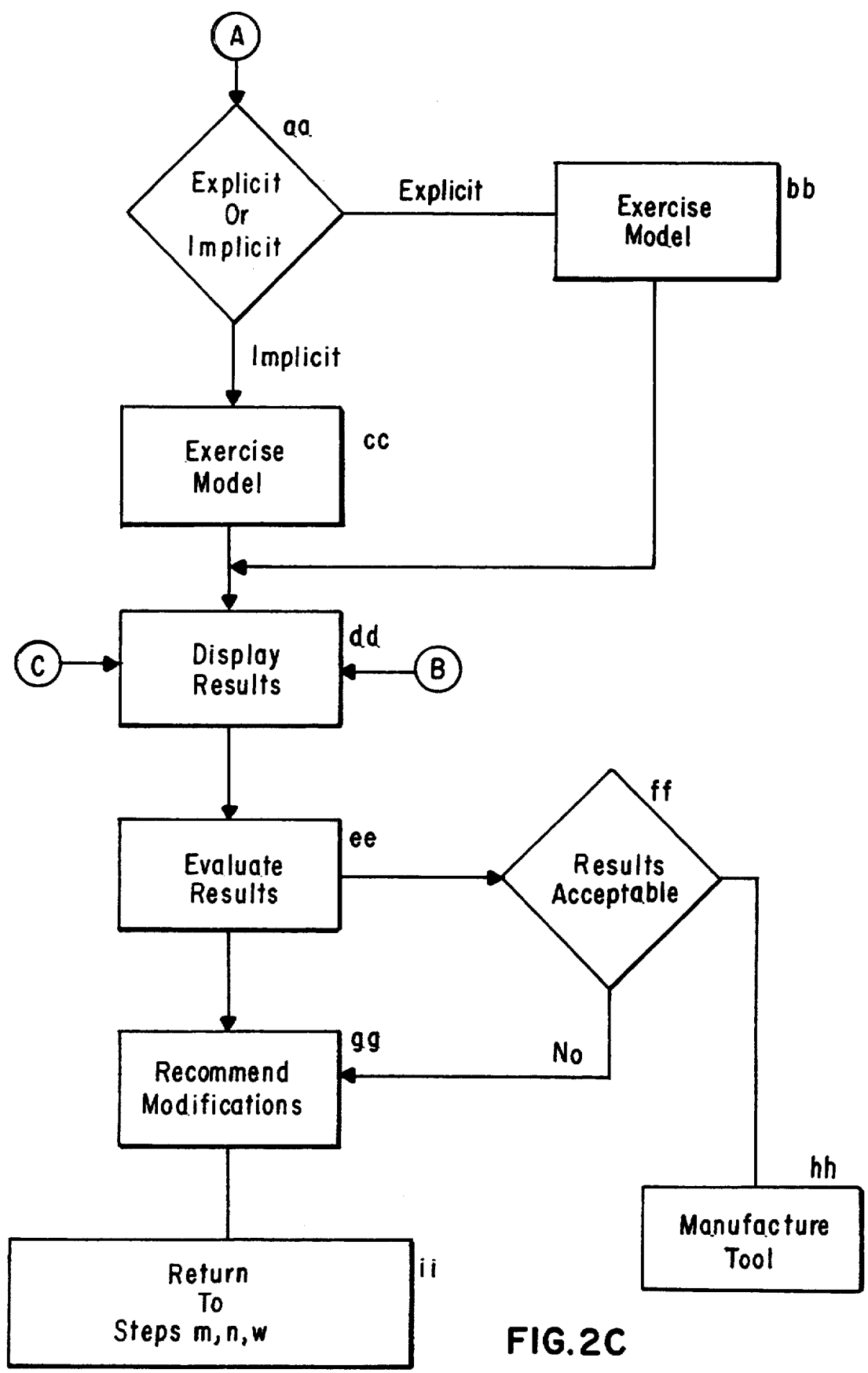

FIGS. 2A–2C are flowcharts illustrating the steps executed by the system in FIG. 1 for optimally designing a tool in accordance with the present invention. In particular, the flowcharts define the cooperative interaction between the database 15, the AI module 18, chip-flow module 16, and tool module 17 in the system block diagram of FIG. 1. Each of the decision blocks and function statements appearing in FIGS. 2A–2C will be described below in greater detail, and will be identified by a parenthesized step letter.

The particular analysis pursued by the designer is chosen from among four options: chip, tool, chip and tool, and three-dimensional (3 D). The first three analyses are two-dimensional and are represented by the flowchart in FIG. 2A, while the three-dimensional analysis is executed by the steps in FIG. 2B. The steps in FIG. 2C are common to all of the analyses.

A. Tool Response

When it is desired to predict only the tool response during a simulated cutting operation, the flowchart in FIG. 2A executes along branch 30-1. Initially, a tool geometry is selected with a corresponding set of tool properties such as stress, strain, and creep. (Steps a and b).

Figure 3A:
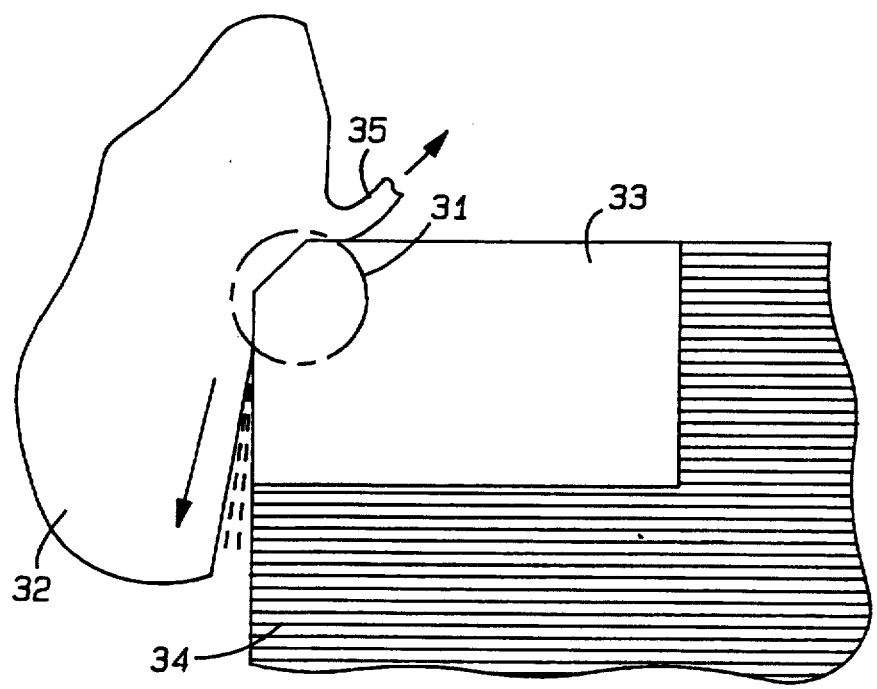
FIG. 3A shows a schematic of a metal cutting operation simulated by the present invention.

The simulated cutting operation according to the present invention is illustrated in the diagrammatic representation of FIG. 3A, and is defined by the movement of a workpiece 32 along the contact surface of a chamferred tool nose 31 (with the selected chipbreaker geometry) of a stationary tool insert 33 held by a steel tool holder 34. A chip 35 is formed by removal of material from the workpiece 32, a physical process which will hereinafter be referred to as a chip-flow phenomenon.

Figure 3B:
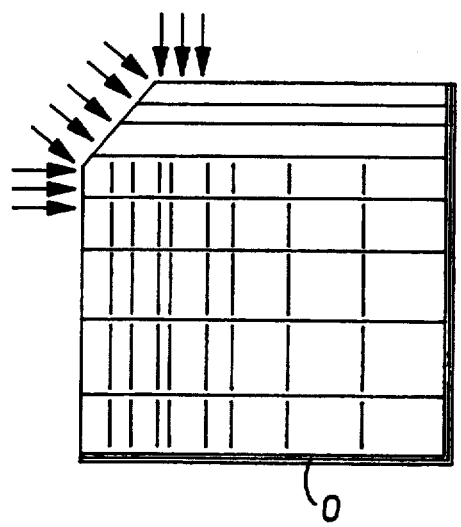
FIG. 3B shows a mesh geometry of the tool nose in FIG. 3A.

FIG. 3B is an enlarged view of the tool nose portion 31 encircled in FIG. 3A which represents a mesh geometry based on the selected tool design. (Step c).

Module 17 primarily utilizes linear finite element models of the cutting tool nose to investigate the response of the tool nose to cutting loads, and in particular has been employed in the design of new inserts, the test and failure analysis of cutting tools, and the evaluation of edge preparation methods. Non-linear responses such as creep (discussed infra) are also possible in module 17. With respect to the analyses of particular tool materials, tool behavior is linear for ceramics, while non-linearities are frequently present in the tool response of carbides and coated cutting tools.

The tool model is based on the mesh geometry of FIG. 3B, and is constructed from commercially available linear finite element software packages such as the software tools GIFTS and ANSYS. In FIG. 3B, edge chamfer and applied loads are indicated by the arrows. An opposing surface "O" is fully constrained. (Step d). These software packages, however, may provide limited non-linear capabilities, and are executable on personal computer workstations, thereby facilitating analysis in laboratories. It should be obvious to those skilled in the art that other suitable linear FEA packages can be used, as well as other hardware systems for executing the code.

Figure 4:
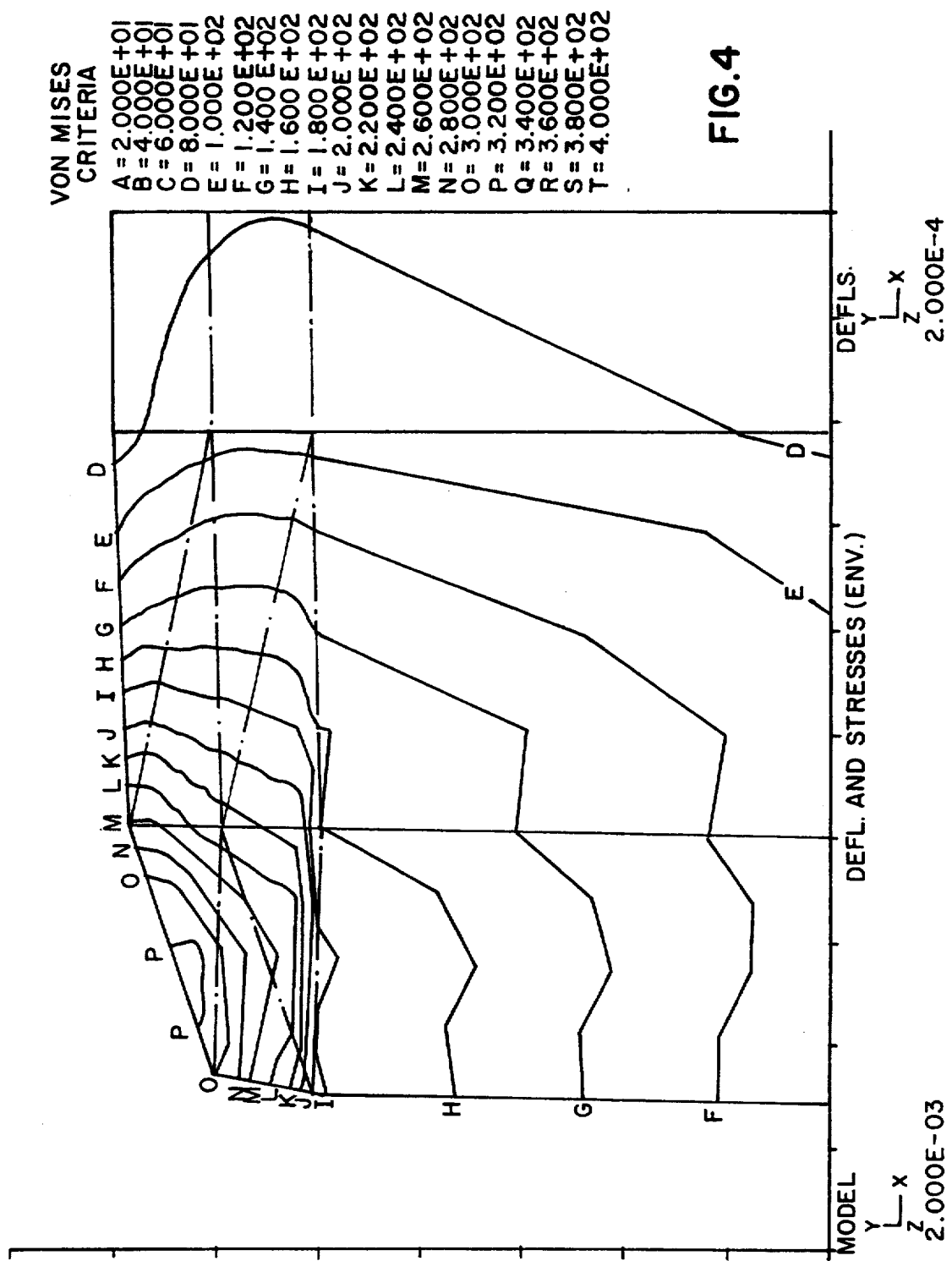
FIG. 4 shows an exemplary von Mises stress distribution in the tool nose of FIG. 3A.

Force vectors representing tool loading due to the cutting action are indicated by the arrows along the edge of nose 31 in FIG. 3B. These approximate loads are applied as input parameters to the finite element model of the cutting tool, and the response of the tool is then calculated by executing the source code from which the tool model is constructed. (Step f). One such response is the predicted von Mises stress distribution throughout the tool of FIG. 3B, which is shown in FIG. 4 as a series of stress contours each with a stress value alphabetically indexed to corresponding von Mises criteria in the accompanying legend.

Figure 5A:
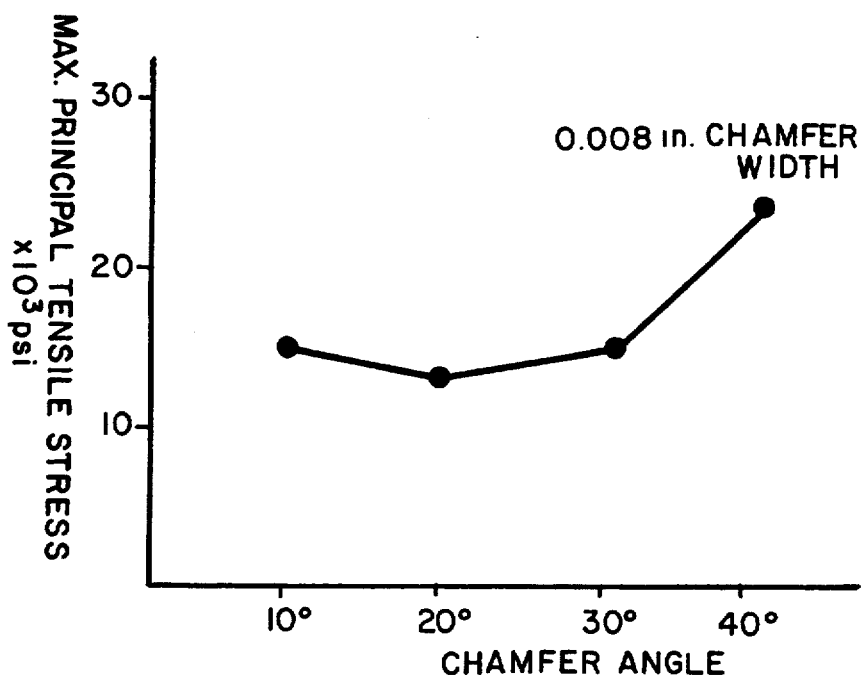
FIGS. 5A and 5B graphically depict a parameter study based on the response shown in FIG. 4.
Figure 5B:
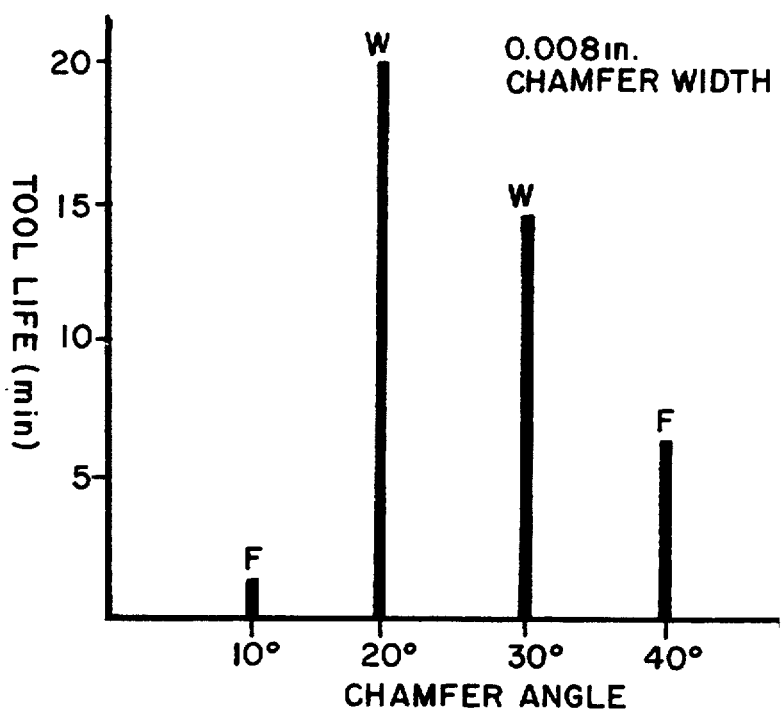

FIG. 5A reveals the results of a parameter study wherein chamfer angle served as an input parameter to the tool model. The study continually modified chamfer angle in a series of tool simulations to estimate tool response, and plotted tensile stress as a function of chamfer angles to illustrate their interdependence. Based on this study, subsequent tool life was then predicted as shown in the bar graph of FIG. 5B. Employing numerically predictive mathematical models to predict the range of tool responses allows a number of tool designs to be tested and analyzed without manufacturing a single physical tool, hence reducing the number of tool prototypes that have to be manufactured.

The above discussion concerned the steps executed for predicting tool response. The remaining steps for displaying results, interpreting/evaluating the results, and modifying the models and tool designs are explained below in sections III and IV with reference to the flowchart of FIG. 2C.

When it is desired to include characteristics of the chip-flow phenomenon as variables for consideration in the optimal design of a cutting tool, the flowchart of FIG. 2A executes along branch 30-2. The software package ABAQUS available from Hibbitt, Karlsson, and Sorenson, Inc. (HKS) of Providence, R.I. is utilized to implement the models, particularly the chip-flow model. It will be readily appreciated by those skilled in the art that the description and requirements of the chip-flow model as set forth below are sufficient to enable one skilled in the art with access to ABAQUS to write the software code representing the models.

The models discussed hereinafter in accordance with the present invention were developed using the ABAQUS Theory and Users Manuals, Version 4.8, copyright 1989 (incorporated herein by reference) available from HKS. ABAQUS is a batch program which assembles a data deck containing model data and history data. Model data define a finite element model with elements, nodes, element properties, material definitions, and any other data that specify the particulars of the model. History data define what happens to the model, and includes the sequence of events or loadings for which the model's response is sought. In ABAQUS this history is divided by the user into a sequence of steps each including a procedure type such as statis stress analysis or transient heat transfer analysis.

A finite element model consists of a geometric description defined by the elements and their nodes, and a set of properties associated with the elements describing their attributes such as material definitions and parameters for interface elements. There may also be constraints in the model represented by linear or nonlinear equations involving several of the fundamental solution variables in the model, and relating to simple boundary conditions that are to be imposed at the start of the analysis.

The element library in ABAQUS supports a geometric modeling capability wherein the elements use numerical integration to allow complete generality in material behavior. Shell and beam element properties may be defined as general section behaviors, or each cross-section of the element may be integrated numerically, so that nonlinear response can be tracked accurately if desired.

The geometric models according to the present invention utilize various finite elements of ABAQUS to simulate certain physical phenomenon, particularly the chip formation process. For modeling the chip-flow phenomenon, the stress-displacement element CPE4 is used when thermal coupling is not represented, while the coupled temperature/displacement element CPE4T is used when a thermal coupling process is included in the model.

The tool response is modeled by an element (rigid surface interface element IRS21) which does not experience defomation, and by two slide line interface elements ISL21 and ISL21T which allow for tool deformation during the cutting operation. Element ISL21T is used when a thermal coupling analysis is desired. Stree-displacement element B21 is used to model workpiece rotation, while a user-defined element U1 implements both debonding finite elements (discussed infra) in a user subroutine UEL.

The purpose of a finite element analysis is to predict the response of a model to some form of external loading, or to some non-equilibrium intiial conditions. ABAQUS makes available a series of procedures for facilitating modeling of the particular history to be analyzed. The ABAQUS history procedures used by the present invention include *COUPLED TEMPERATURE-DISPLACEMENT for performing a fully coupled simultaneous heat transfer and stress analysis, *DYNAMIC EXPLICIT for performing dynamic stress/displacement analysis using direct integration, and *STATIC for performing a non-thermal coupling static stress/displacement analysis.

The above finite elements and response analyses should not serve a a limitation of the present invention, as it should be apparent to those skilled in the art that other elements and procedures may be used to implement the tool and chip-flow simulations of the present invention.

B. Chip-Flow Simulation

Module 16 in FIG. 1 simulates the aforementioned chip-flow phenomenon which is physically represented by the curling of a metal chip 35 away from a workpiece 32 as shown in FIG. 3A. The chip-flow phenomenon is a non-liner physical process that is not as easily modelled as the tool response.

The chip-flow phenomenon in metal cutting describes the mechanics of material removal from the original workpiece during cutting operations. This phenomenon inherently involves the formation of new surfaces, large deformations associated with the creation of chips, and the internal generation of heat. Possible sources of such heat generation are sliding contact along the tool surface and permanent deformation of the chip, although other sources should be well known to those skilled in the art. Accordingly, numerical models of the chip-forming process must accurately account for these physical processes in order to render accurate predictions of stress, strain, temperature and other performance measures. Application of the finite element method to large deformation problems in solid mechanics has been documented by Y. J. Bathe in Finite Element Procedures in Engineering Analysis, Prentice-Hall (1982), and by O. C. Zienkiewicz in the Finite Element Method, McGraw-Hill (1982).

There are two principal objectives for modelling the chip-flow process: (1) calculating the loads and temperatures under steady-state conditions on the surfaces of the cutting tool to support cutting tool design, and (2) numerically predicting the chip morphology and quantifying the stress and strain state to assess the performance of a given cutting tool material and geometry on a specific workpiece material.

In practice, the tool is used in a lathe or milling machine at various speeds and depths of cut. Observations of the cutting process during machinability tests, as well as evaluation of the chips that are created, permit the tool design engineer to describe the cutting conditions under which a tool best performs. Satisfaction of these two objectives will provide data for creep and wear predictions of cutting tool inserts under operating conditions, and greatly reduce the time and cost needed in the production of improved new cutting tools.

The following sections describe several physical mechanisms which exist in the chip-flow phenomenon and which are represented in the chip-flow model of the present invention.

With respect to the flowchart of FIG. 2A, both the chip and chip/tool analyses require the selection of workpiece properties including stress, strain, and temperature values. (Step g). This exemplary list of properties should not serve as a limitation of the present invention, but rather as a representative set of the workpiece properties well known to those skilled in the art and selectable by step g.

One novel aspect of the present invention is that the chip-flow model incorporates a representation of a fracture mechanism describing a chip separation phenomenon known as debonding. The chip fracture mechanism defines a release of said chip from the workpiece and is represented by a debonding finite element in the chip-flow model. Consequently, determining the appropriate debonding properties is part of the selection of workpiece materials in step g. The following discussion is a detailed explanation of the debonding mechanism and its finite element representation in the chip-flow model.

Debonding

The finite element model embodied in module 16 includes a fracture-mechanics based debonding criterion for separation of the chip from the workpiece, and time-dependent and temperature-dependent material properties. As will be discussed hereinbelow, the model allows for the use of an explicit time integration scheme for the equations of motion to permit numerical modeling of the metal cutting chip flow problem in three dimensions.

More specifically, two debonding elements have been created to model the separation of the chip from the workpiece. Both models are fracture-mechanics based finite elements, and allow time and temperature dependent material properties. The first debonding element has a circular stress iso-surface as shown in FIG. 7B, while the second element has a concave-down iso-surface as shown in FIG. 7C. Both elements may be used in metal cutting simulations where no compression exists along the chip-workpiece interface (such as in positive rake cutting). The element with the concave-down iso-surface is compression-insensitive and may be used for simulations where any stress state exists along the chip-workpiece interface.

First Debonding Finite Element (compression-dependent)

The method by which the separation (or debonding) of the chip from the workpiece is modeled plays an important role in the morphology and response of the resultant chip, and temperatures and loads applied to the cutting tool.

In three-dimensional metal cutting, the chip separates, or debonds, from the workpiece material on two planes: one normal to the feed direction, and one normal to the depth-of-cut (DOC) direction. This separation and creation of new surface was modeled by developing a fracture mechanics-based debonding finite element 61 which is located between the chip and the workpiece as shown in FIG. 6.

The debond element provides a mechanism to gradually release the chip from the workpiece material, and also provides a nearly rigid bond for low bond strains. When a specified bond strain occurs in the neighborhood of the debonding element, the element begins to fracture. Fracture here is used in the continuous damage sense, that is the stresses decrease for increasing bond strain until zero stress is reached. It remains zero thereafter; no damage recovery (material healing) is allowed. The amount of energy dissipated by damaging is assumed to be equal to the energy required to propagate a crack across the length of the element. This energy then serves to heat the chip and workpiece material in thermally coupled models. The value of this fracture energy is determined from critical J-integral values for the workpiece material.

This element 61 debonds when a critical fracture strain is reached, which is based on the J-integral value for the workpiece material. The special element has a damaged elasticity nature with a gradual reduction in stress-carrying capabilities as the normalized damage to the material progresses from zero to one. A detailed explanation of the first debond element follows below.

Figure 7A:
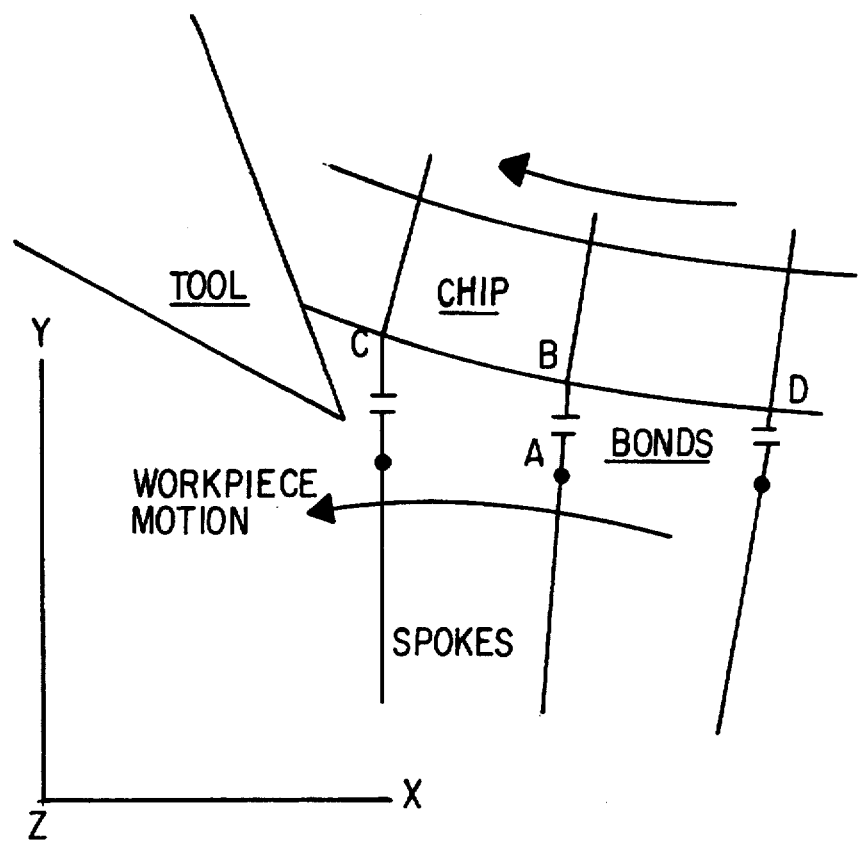
FIG. 7A illustrates a four-noded bond element utilized in the present invention.
Figure 7B:
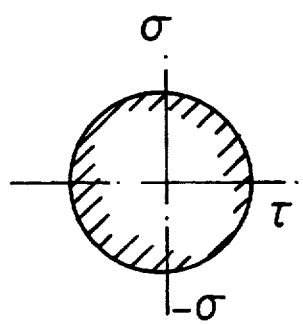
FIG. 7B illustrates a stress iso-surface in accordance with a first debond element of the present invention.
Figure 7C:
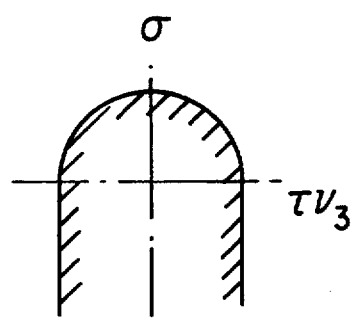
FIG. 7C illustrates a stress iso-surface in accordance with a second debond element of the present invention.

The element itself consists of four nodes, as shown in FIG. 7A. The element really only provides a bond between nodes A and B. The material properties of the workpiece material only have influence over the bond between nodes A and B, while nodes C and D are used only to provide an 'area' for stress calculations. The spokes illustrated in FIG. 7A model the workpiece material. Previous models of the chip-flow process have not included such detailed material property-based fracture of the chip from the workpiece.

This 'area' for stress computations is calculated from (length*depth), where $$\text{length} = (1-\alpha)*\text{distance}(B,C) + \alpha*\text{distance}(B,D) \quad (8)$$

and, for plane strain, unit depth is assumed. The length is based on the original geometry.

The forces transmitted by the element are simply the stresses multiplied by length, where the stresses are computed from the strains. The strain values include DirectStrain $=(V_B-V_A)/\text{thick}$ and ShearStrain $=(U_B-U_A)/\text{thick}$ where $U_B$, $U_A$, $V_B$, and $V_A$ represent displacements in the x-direction for node B, the x-direction for node A, the y-direction for node B, and the y-direction for node A, respectively.

Since the orientation of the element is fixed, the forces transmitted between nodes A and B are not truly direct so that shear forces normal to the chip surface at node A are not parallel to the Y-axis. In the models of the present invention, the center of the spokes and the tool tip both lie on the Y-axis. Advantageously, the radius of curvature of the unseparated chip is large so that the approximation errors in the debonding calculations are very small. The purpose of the element is to provide automatic debonding as determined by the cutting process and material properties.

Figure 8:
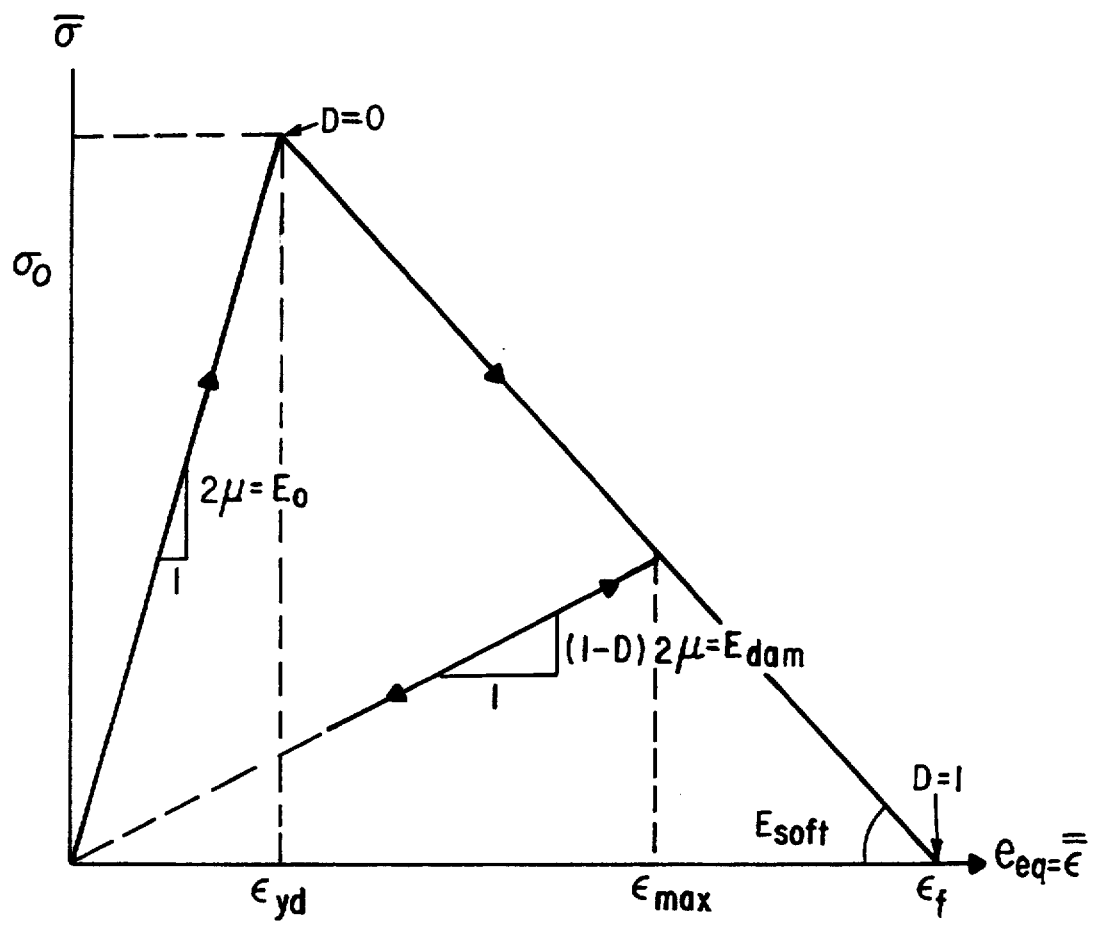
FIG. 8 is a stress-strain curve for the debonding element of FIG. 7A.

The bond material is based on a damaged $J_2$ plasticity theory. The damage manifests itself in two forms—a degradation of the yield stress with damage and a damaged elasticity. FIG. 8 illustrates the stress/strain behavior of the material model. The material behaves as an elastic material until the equivalent strain reaches a value of $e_{yd}$. If the strain continues to increase monotonically, the damage will increase from zero when the strain equals $e_{yd}$ to a value of one when the strain reaches the failure strain of $e_f$. The equivalent strain is monitored continuously and the maximum value attained is tracked. The maximum value, $e_{max}$, equals the maximum over all time of $e_f$. The equivalent strain is calculated as $$e_{eq} = (3/2 \ e_{ij}e_{ij})^{\frac{1}{2}}, \quad (1)$$

where $e_{ij}$ is the deviatoric part of the total strain $\epsilon_{ij}$. The material unloads along a damaged elasticity, as shown in FIG. 8.

The damage is calculated from the equivalent strain as $$D = (e_{max} - e_{yd})/(e_f - e_{yd}) \quad (2)$$

Note that the value of $e_{max}$ must be initialized to $e_{yd}$ in the following algorithm.

The value for $e_{yd}$ is given by the initial undamaged yield stress, $\sigma_0$, divided by $2\mu$. The value for $e_f$ is derived from fracture mechanics principles. The energy required to create a crack of length l and width w is given by $J_{IC}*lw$. The strain energy density in the material is given by the area under the stress strain curve ($\frac{1}{2} \sigma_0 e_f$) in FIG. 8. The work performed creating new fracture surface must equal the strain energy dissipated $$J_{IC}*lw = \frac{1}{2}\sigma_0 e_f lwt, \quad (3)$$

where t is the thickness of the element. Solving Equation (3) for $e_f$ gives $$e_f = 2J_{IC}/\sigma_0 t \quad (4)$$

The yield stress of the material continually degrades as the damage grows:

$$\sigma_{yd}(D) = (1-D)\sigma_0 \quad (5)$$

The material's elastic response is based on a damaged elasticity. The damaged elastic moduli are given by:

$$2\mu_D = (1-D)2\mu \quad (\epsilon_{max}/\epsilon_{yd}) \qquad (6)$$

$$K_D = (1-D)K \quad (\epsilon_{max}/\epsilon_{yd}) \qquad (7)$$

where $2\mu_D$ and $K_D$ are the damaged shear modulus and bulk modulus, respectively.

The debonding of the material is assumed to occur entirely as the result of deviatoric processes. The mean or volumetric stress plays no role in the determination of damage. As damage occurs, the pressure is reduced at the same rate as the deviatoric stresses.

Second Debonding Finite Element (compression-independent)

This element has one node on the chip and three nodes on the base. The bond is established between the node on the chip and the center node on the base. The other two nodes on the base are used to calculate the effective area associated with the element. The thickness of the debonding element h is determined by the user, and is usually some relatively small fraction of the chip thickness. The geometry of the element is shown in FIG. 7A.

The user must also specify the material properties of the debonding element. The initial Young's modulus $E_o$ is usually selected equal to the modulus of the chip material. Poisson's ratio is assumed to be 0.5. The maximum failure stress $\sigma_{max}$ is selected equal to, or, for softening materials, smaller than the initial yield stress of the chip material. The critical energy release rate for full debonding $J_c$ is usually chosen equal to the critical energy release rate for crack propagation. Since debonding mainly occurs by shearing the material, the best choice is probably the release rate for mode II crack propagation.

The thickness of the debonding element is used to obtain the debonding strains. The direct strain is $$\epsilon = \Delta v/h,$$

where $\Delta v$ is the relative displacement of the chip normal to the cutting surface and the shear strain is $$\delta = \Delta u/h,$$

where $\Delta v$ is the relative displacement of the chip tangential to the cutting surface. For small values of the strains, the direct stress $\sigma$ and the shear stress $\delta$ in the debonding material will be obtained with the elastic moduli:

$$\sigma = E_o \epsilon, \quad \tau = G_o \delta = \tfrac{1}{3} E_o \delta.$$

From the direct and the shear stress, we compute an equivalent stress with the equations $$\bar{\sigma} = (\sigma^2 + 3\tau^2)^{\tfrac{1}{2}} \text{ if } \sigma > 0$$

$$\bar{\sigma} = (3)^{\tfrac{1}{2}} \tau \quad if \sigma \leq 0.$$

Note that the first expression corresponds to the Von Mises stress. Similarly, we define the equivalent strain $$\bar{\epsilon} = (\epsilon^2 + (\tfrac{1}{3})\delta^2)^{\tfrac{1}{2}} \quad if \epsilon > 0$$

$$\bar{\epsilon} = (3)^{\tfrac{1}{2}} \delta \quad if \epsilon \leq 0.$$

An equivalent stress iso-surface is shown in FIG. 7C.

Once the equivalent stress (strain) exceeds a critical value $\sigma_{max}$ ($\epsilon_{max}$) the material of the debonding element is assumed to be damaged. The elastic modulus diminishes with increasing equivalent strain, such that the equivalent stress decreases linearly with the equivalent strain. The stress becomes zero once the equivalent strain reaches the value $$\epsilon_{soft} = 2J_c/(\sigma_{max}t)$$

Hence, we can define a softening modulus $$E_{soft} = -\sigma_{max}/\epsilon_{soft},$$

which is the effective modulus for continued loading, that is further damaging of the material. The stress-strain law is shown in FIG. 8. The amount of material damage at any given point in time is given by the damage parameter D which varies from 0 (no damage) to 1 (complete debonding). Hence, D follows from $$D = 0 \text{ if } \bar{\epsilon} \leq \epsilon_{max}$$

$$D = (\bar{\epsilon} - \epsilon_{max})/\epsilon_{soft} \text{ if } \epsilon_{max} < \bar{\epsilon} < \epsilon_{max} + \epsilon_{soft}$$

$$D = 1 \text{ if } \bar{\epsilon} \geq \epsilon_{max} + \epsilon_{soft}$$

For a partially damaged material, the damage parameter defines a critical damage stress $$\sigma_{dam} = (1-D)\sigma_{max} = (1-(\bar{\epsilon}-\epsilon_{max})/\epsilon_{soft})\cdot \sigma_{max} = (\bar{\epsilon}-\epsilon_{max}-\epsilon_{soft})E_{soft}$$

and an effective damaged modulus $$E_{dam} = \bar{\sigma}/\bar{\epsilon} = (1-(\epsilon_{max}+\epsilon_{soft})/\bar{\epsilon}) E_{soft}$$

The direct and shear stresses follow from $$\sigma = E_{dam}\epsilon, \quad \tau = G_{dam}\gamma = \tfrac{1}{3}E_{dam}\gamma \text{ if } \sigma > 0$$

$$\sigma = E_o\epsilon, \quad \tau \leq G_{dam}\gamma = \tfrac{1}{3}E_{dam}\gamma \text{ if } \sigma \leq 0.$$

If, after damaging, the equivalent strain decreases we assume that no further damage occurs and hence the material behaves elastic with Young's modulus $E_{dam}$ (or $E_o$ in compression) and shear modulus $G_{dam}$. If the equivalent strain increases the damaged modulus changes. For $\sigma > 0$ this yields.

$$d\sigma = E_{dam}d\epsilon + dE_{dam}\epsilon$$

$$d\tau = \tfrac{1}{3}(E_{dam}d\gamma + dE_{dam}\gamma)$$

and for $\sigma < 0$ $$d\sigma = E_o d\epsilon$$

$$d\tau = \tfrac{1}{3}(E_{dam}d\gamma + dE_{dam}\gamma).$$

From the previously derived expression for $E_{dam}$ follows $dE_{dam} = [(\epsilon_{max} + \epsilon_{soft})/\bar{\epsilon}]E_{soft}d\bar{\epsilon}$ For behavior in tension ($\sigma > 0$) thus follows $$dE_{dam} = [(\epsilon_{max}+\epsilon_{soft})/\bar{\epsilon}]E_{soft}(\epsilon d\epsilon + \tfrac{1}{3}\gamma d\gamma)$$

and for behavior in compression $dE_{dam} = \frac{1}{2}[(\epsilon_{max}+\epsilon_{soft})/\epsilon]E_{soft}\,E_{soft}\gamma d\gamma.$ It is convenient to define the normalized strains $n_{68} = \epsilon/\bar{\epsilon},\ n_\gamma = (\frac{1}{2})\gamma/\bar{\epsilon}.$ It is also convenient to observe that $[(\epsilon_{max}+\epsilon_{soft})/\epsilon]E_{soft} = E_{soft} = D_{dam}.$ After some manipulation this yields for the rate of change if stress in tension $d\sigma = E_{dam}d\epsilon + (E_{soft}-E_{dam})[n_{68}n_{68}d\epsilon + n_\epsilon n_\gamma d\gamma]$ $d\tau = G_{dam}d\gamma + (E_{soft}-E_{dam})[n_\gamma n_\epsilon d\epsilon + n_\epsilon n_\gamma d\gamma]$ and in compression, since $n_\epsilon = 0$ and $n_\gamma = 1/\sqrt{3}$ $d\sigma = E_0 d\epsilon$ $d\tau = G_{dam}d\gamma + \frac{1}{3}(E_{soft}-E_{dam})d\gamma = \frac{1}{3}E_{soft}d\gamma.$ The debonding process outlined above for both debonding elements is modelled with a simple elastic predictor radial return algorithm. The state variables are the total deviatoric strains, the damage, and the maximum equivalent strain. As is well known to those skilled in the art, the superscripts above variables indicate integration. The constitutive calculations proceed as follows:

1. Calculate the damaged elasticity constants:

$2\mu_D = (1-D^n)2\mu e_{max}{}^n/e_{yd}$ $K_D = (1-D^n)Ke_{max}{}^n/e_{yd}$

2. Calculate deviatoric and volumetric parts of the strain rate:

$\dot{\epsilon}_v = \frac{1}{3}d_{kk}$ $\bar{e}_{ij} = d_{ij} - \dot{\epsilon}_v\gamma_{ij}$ 3. Integrate the deviatoric strains:

$e_{ij}{}^{n+1} = e_{ij}{}^n + \Delta t \dot{e}_{ij}$

4. Calculate the new maximum equivalent strain:

$e_{eq}{}^{n+1} + [3/2\ e_{ij}{}^{n+1}\ e_{ij}{}^{n+1}]^{\frac{1}{2}}$ $e_{max}{}^{n+1} = \max(e_{eq}{}^{n+1}, e_{max}{}^n)$ 5. Calculate trial stress:

$P^{tr} = P^n + \Delta t K_D \dot{\epsilon}_v$ $S_{ij}{}^{tr} = S_{ij}{}^n = S_{ij}{}^n + \Delta t 2\mu_D \bar{e}_{ij}$ 6. Calculate the new damage value i $D^n + 1 = \max(1,\ (e_{max}{}^{n+1}-e_{yd})/(e_f-e_{yd}))$ 7. Calculate von Mises equivalent trial stress and radial return factor:

$\bar{\sigma} = [3/2\ S_{ij}{}^{tr}\ S_{ij}{}^{tr}]^{\frac{1}{2}}$ $f_r = \min(1,\ (1-D)\sigma_0/\bar{\sigma})$ 8. Perform radial return on the trial stresses:

$P^{n+1} = f_r P^{tr}$ $S_{ij}{}^{n+1} \le f_r S_{ij}{}^{tr}$

The debond element formulation is best described in two-dimensional form because of its simplicity. It should be obvious to those skilled in the art that the above-described debond algorithm is implementable in Fortran source code which can be used with the ABAQUS input deck of the chip-flow model to execute the chip-flow simulation.

Thermal Coupling

Another novel aspect of the chip-flow model of the present invention is that it incorporates a representation of a heat-generating mechanism describing a thermal coupling phenomenon. As indicated by step h, the chip and chip/tool simulations further include the selection of chip/tool interface properties such as friction coefficients, thermal properties, and interface geometries.

The work involved in machining the workpiece and in causing the material removal process contributes to the generation of heat. This heat is substantially generated by three coupled and concurrently operating mechanisms: permanent deformation of the chip material, fracture of the chip from the workpiece, and the sliding of the chip with friction along a contact face of the cutting tool. It is important to consider this heat generation in the cutting process because the material properties of the workpiece and tool material have temperature dependent properties. This temperature dependency leads to the characterization of the heat generation as a thermally coupled phenomenon since the heat generated by the mechanisms in the cutting process (which depend on tool and workpiece properties) alter the properties of the workpiece and tool, which in turn affect the cutting process.

To properly include this thermal coupling phenomenon, the chip-flow model of the present invention incorporates representations of the following phenomenon and material characteristics: the temperature dependent properties of the materials, heat and its subsequent transfer across the chip-tool interface, and fracture energy created by the debonding of the chip from the workpiece.

In particular, the permanent deformation is modeled by representing in the chip-flow model that a fraction of heat generated by said deformation is introduced into said deforming chip. The fracture is modeled by representing in the chip-flow model that a fraction of heat liberated by said debonding element upon release from said workpiece is introduced into said chip. Finally, the chip sliding is modeled by representing in the chip-flow model that a selected fraction of heat which is generated by said sliding is introduced into said chip while the remaining fraction is introduced into said tool.

As illustrated in FIG. 2A, the selection of chip/tool interface properties is followed by the selection of a tool and chipbreaker geometry, and also the selection of tool properties as in step a if a chip/tool simulation is desired. (Steps h–l). Based on the chosen geometries, the algorithms of the present invention generate tool and chip meshes from which mathematically predictive models of the tool response and chip-flow process are constructed. (Steps m–o). However, before proceeding with the simulations, the user has the option of incorporating a localization mechanism into the chip-flow model. (Step p).

Localization/Chip Breakage

As introduced above, another novel aspect of the chip-flow model of the present invention is that it incorporates a representation of a shear localization mechanism describing a shearing phenomenon.

Figure 9:
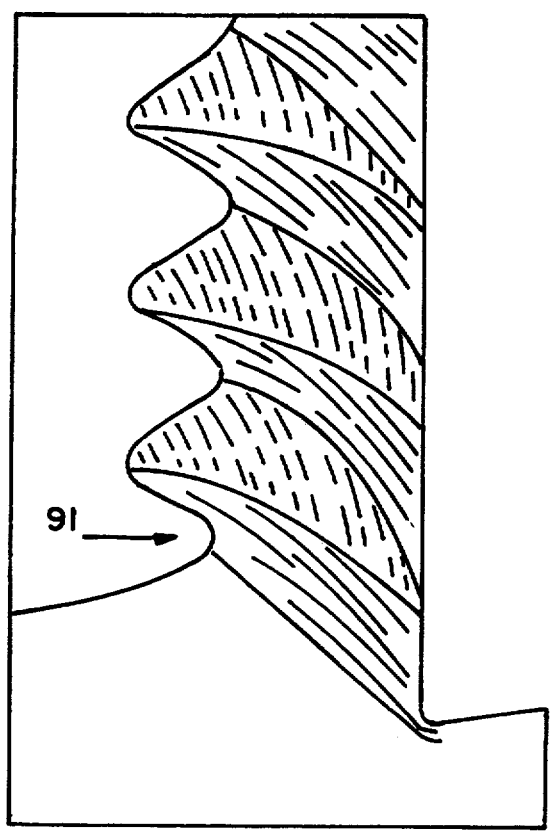
FIG. 9 shows a cross-section of the chip-forming process showing shear-localized zones.

Shear localization occurs during the cutting process when the shear strain of the workpiece material concentrates in a narrow band, effectively creating a shear strain discontinuity in the region of the band. FIG. 9 illustrates the size of this zone 91 for specific cutting conditions on AISI4340 steel. These zones give the chip a serrated inner surface, and are a precursor to chip breakage because of the weakened zone and stress concentration at the root of the serrations.

In order to mathematically reconstruct the 'chipboard' from machinability studies, the model should predict the onset of chip breakage to correctly estimate the size of the chips. Inclusion of the localization process in the chip flow model is therefore a necessity. Accordingly, the chip-flow model of the present invention incorporates this physical process by using thermally coupled material properties, and by including special finite elements which permit discontinuities in the strain field.

Figure 10A:
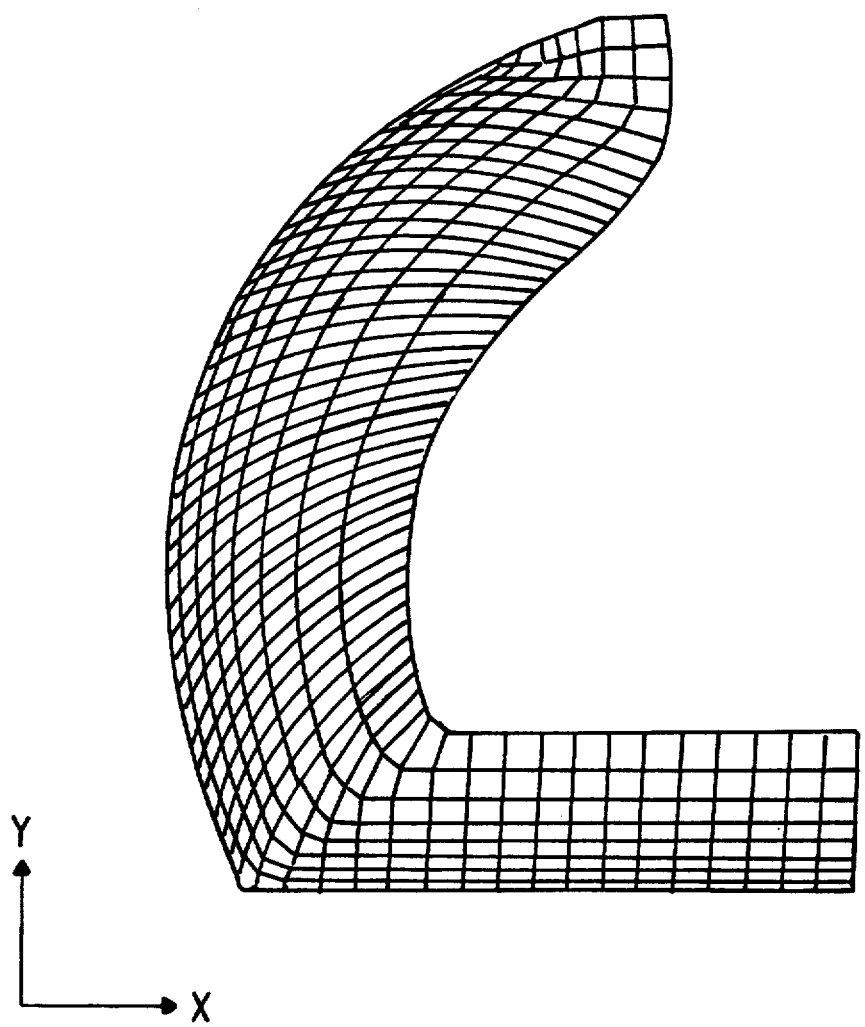
FIGS. 10A AND 10B show the finite element mesh geometries used in models simulating non-localized and localized phenomenon, respectively.
Figure 10B:
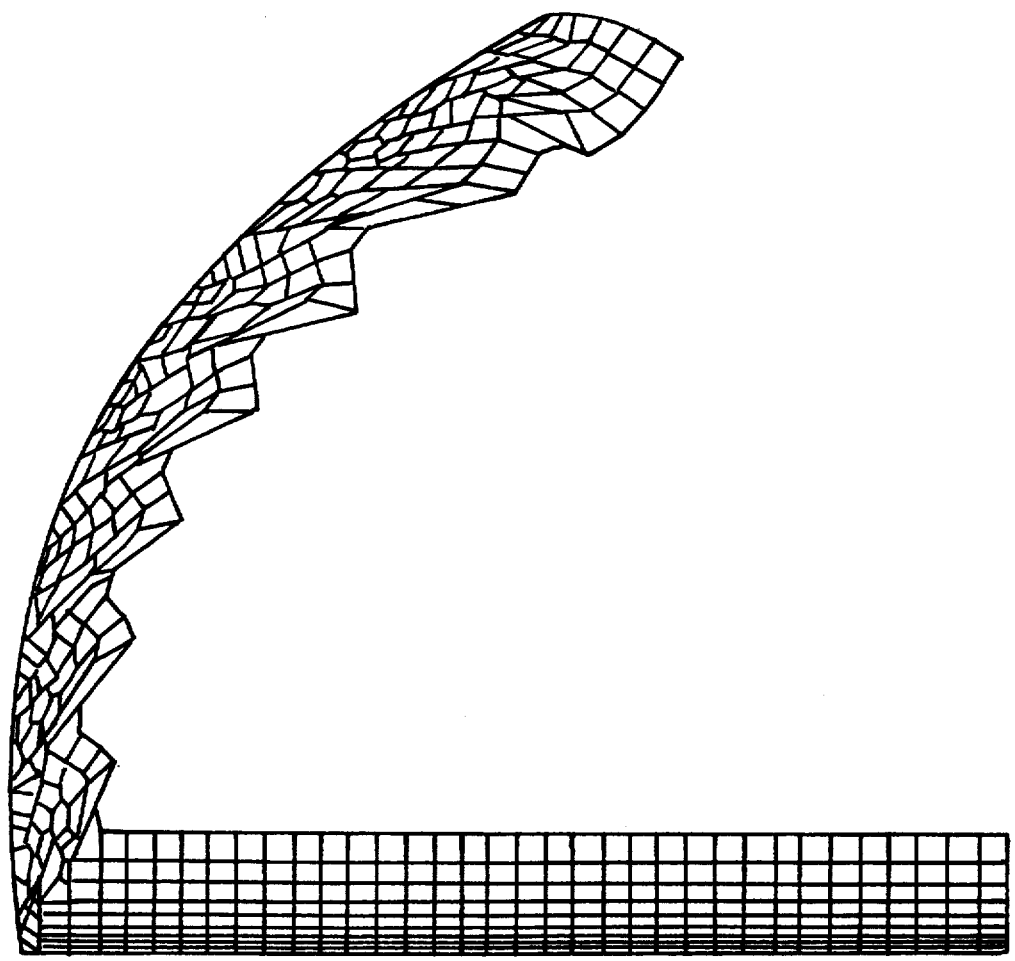

Most shear localization in metal cutting is due to thermally-induced negative stress-strain characteristics of the material; thus, thermally coupled analyses will permit this phenomenon to occur. In fact, since most metals strain-harden at a given temperature without the thermal coupling, shear localization is impossible. When the localization process begins, the elements in the primary shear zone undergo very large strains over short lengths (relative to element size). By using many elements whose sides and diagonals are approximately along the direction of localization as in FIG. 10B, the present invention has included this phenomenon in the model. FIG. 10A is shown for comparison purposes to illustrate how an inappropriate choice of finite elements will not permit the localization mechanism to be manifested during the chip formation process.

If the relative size of the shear band becomes very small, current element technology in cutting simulations cannot account for the magnitude of the strain jump at the band. However, it would be obvious to those skilled in the art that the present invention, and specifically the localization mechanism, includes other special finite elements which incorporate displacement (and strain) discontinuities in their deformation field. Should these elements prove useful, they will be included in the chip-flow model.

In summary, the shear localization mechanism represents a shear strain discontinuity in a region of said workpiece and is represented by shear discontinuity finite elements in said chip-flow model. The localization mechanism is incorporated into the chip-flow model by selecting said shear discontinuity finite elements so as to properly describe said shear localization mechanism, discretizing said discontinuity elements, and modifying material property-related parameters in said chip-flow model to be temperature-dependent. (Step q).

As presented hereinabove, the chip-flow model incorporates representations of a fracture mechanism describing a chip separation phenomenon, a heat-generating mechanism describing a thermal coupling phenomenon, and a shear localization mechanism describing a shearing phenomenon wherein these phenomena occur during the cutting operation.

Figure 20:
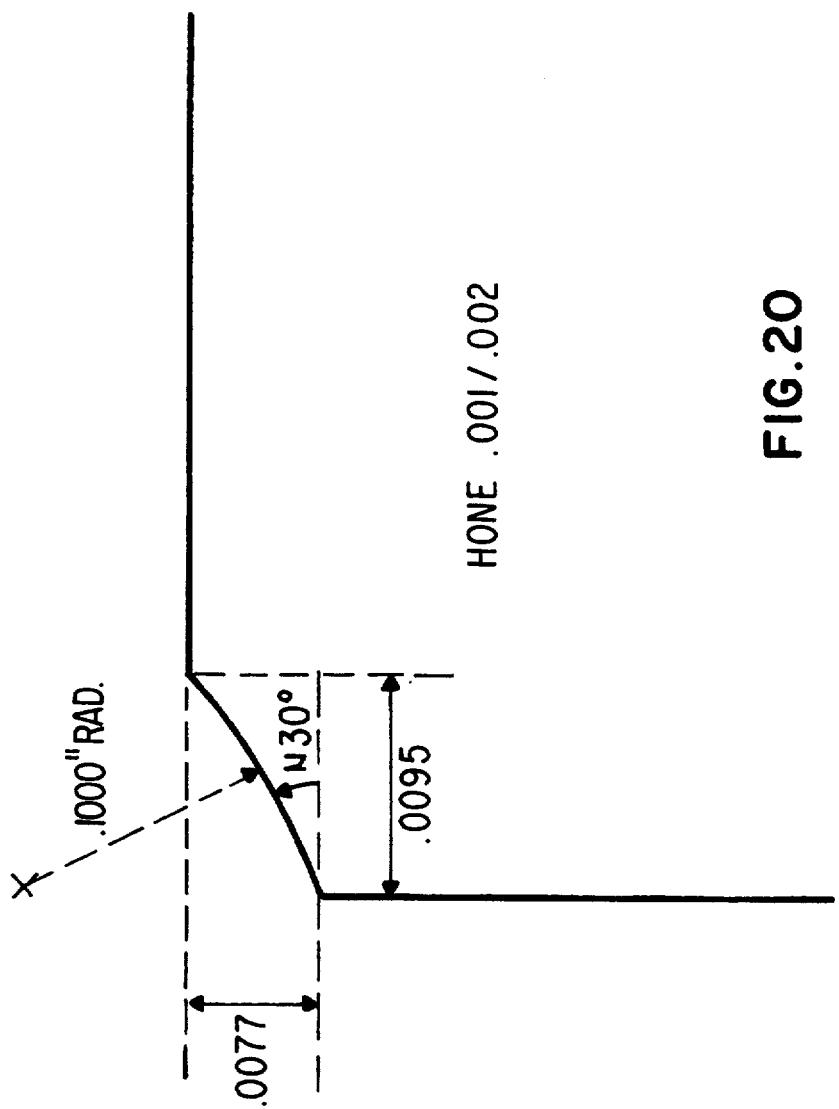
FIGS. 20 and 21 are schematics of chipbreaker geometries analyzed by the present invention.
Figure 21:
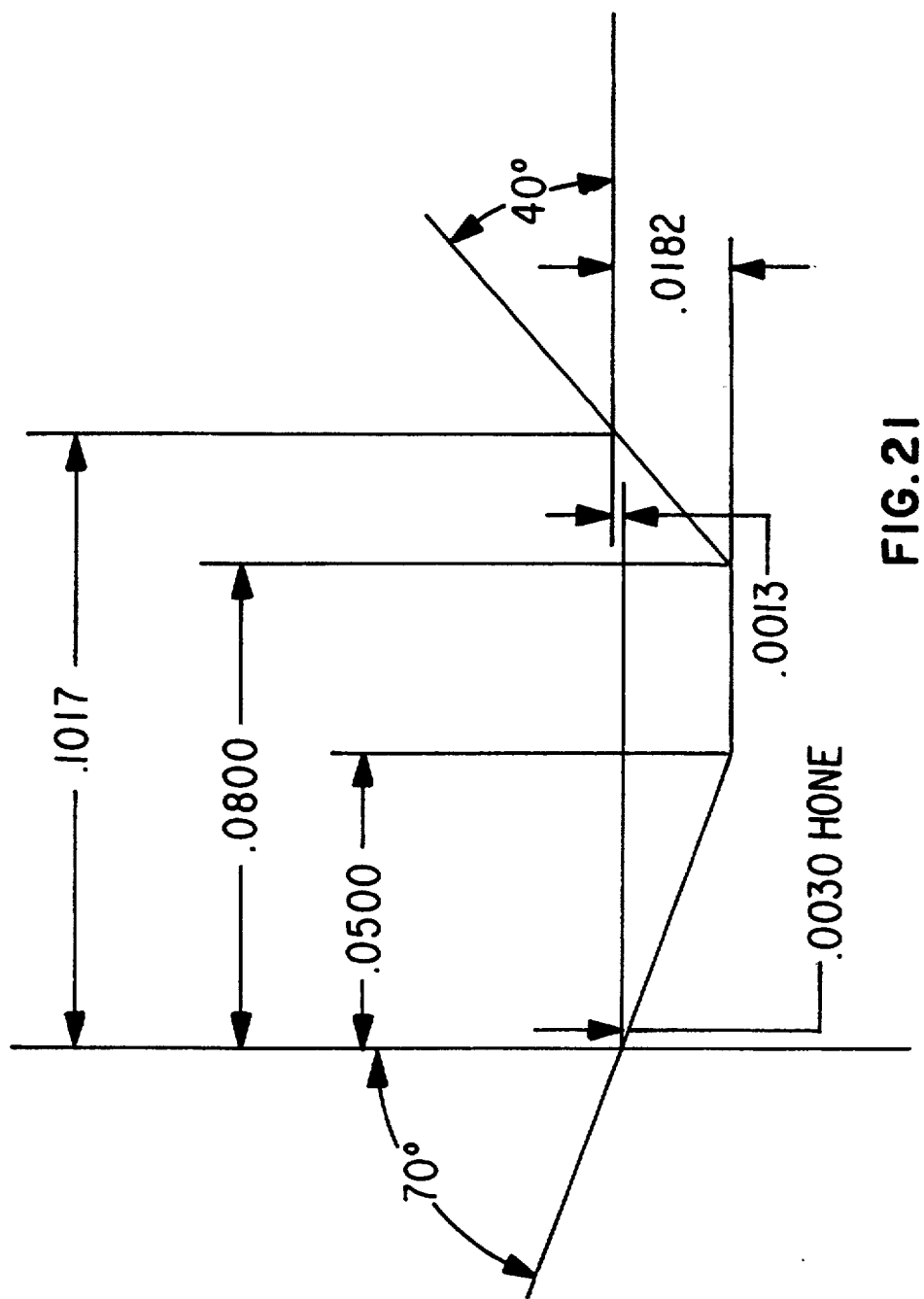
Figure 22:
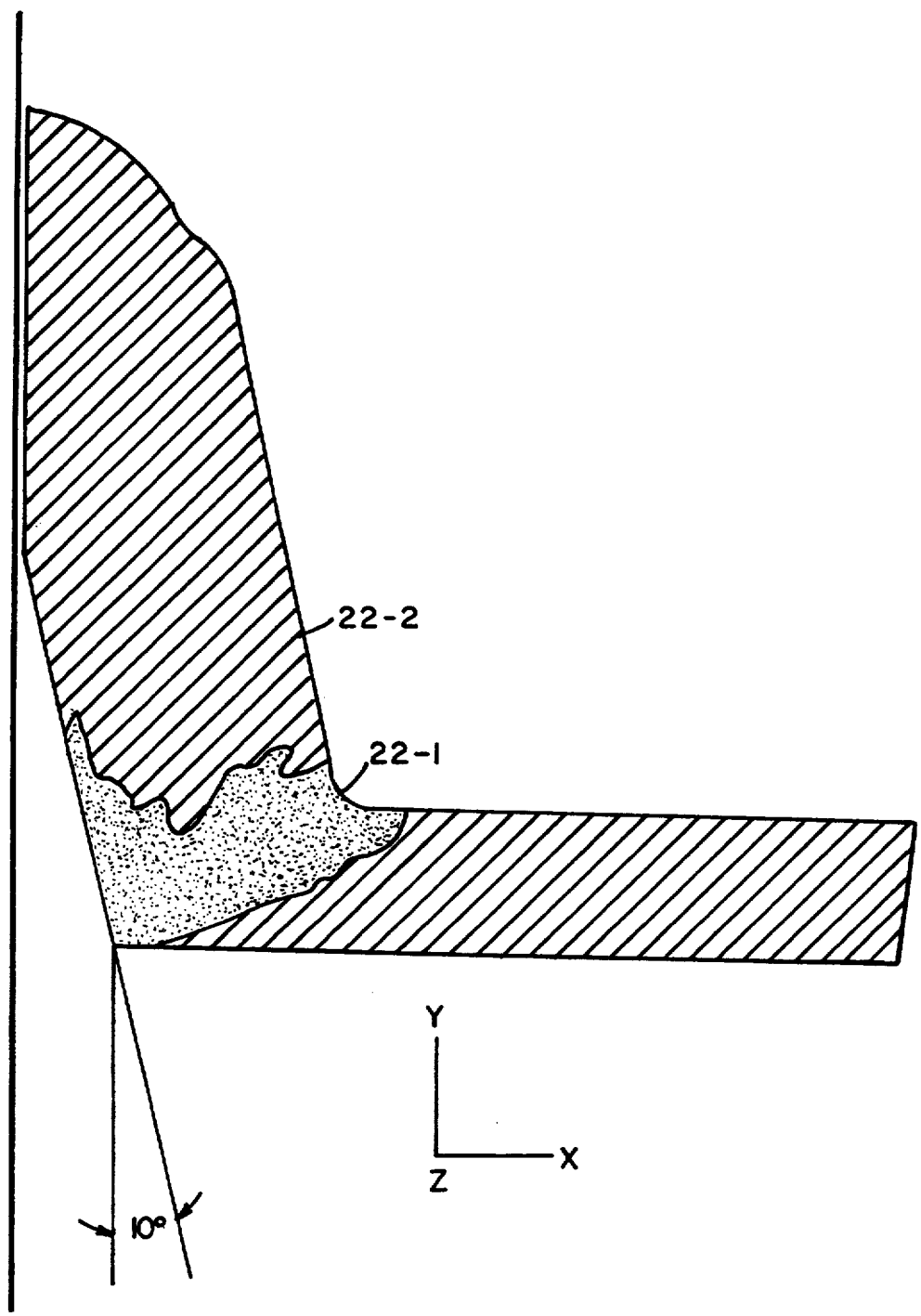
FIGS. 22 and 23 are chipflow simulations from cutting operations using the tools of FIGS. 20 and 21, respectively.
Figure 23:
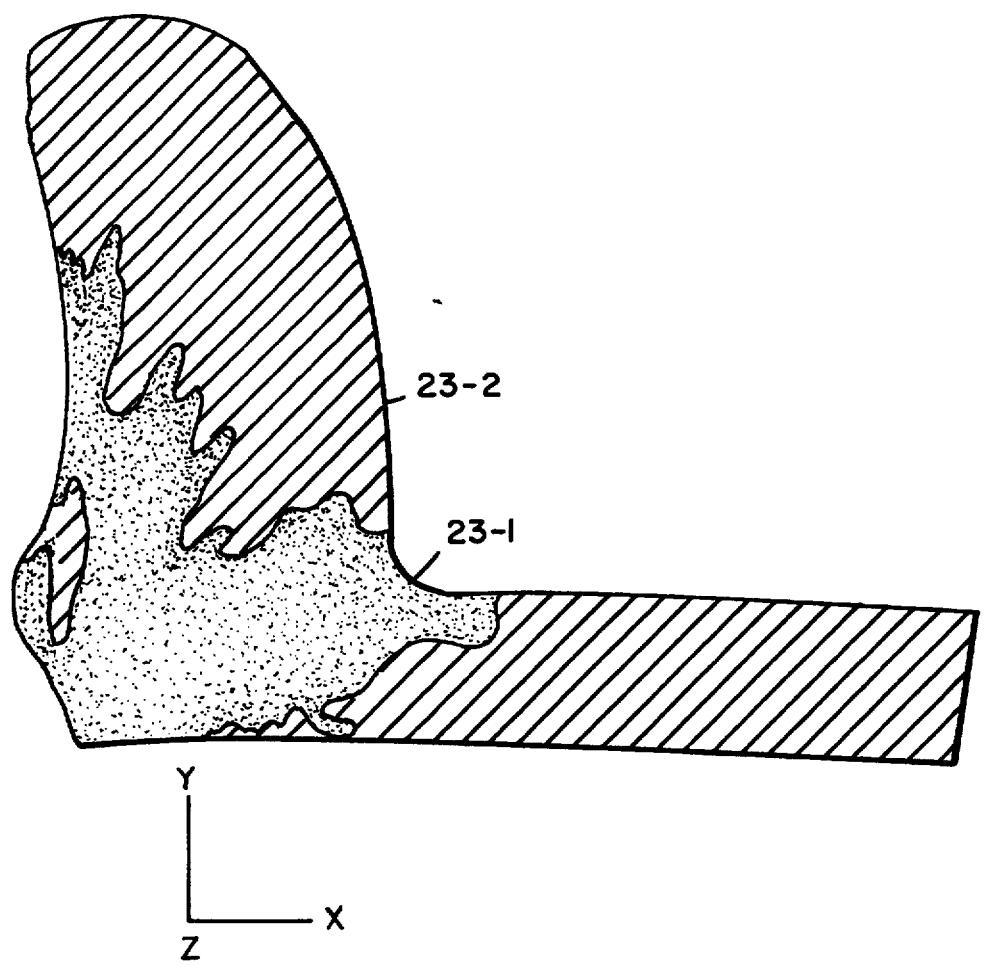

The Appendix to the specification is an ABAQUS instruction set for performing a chip-flow analysis using the chipbreaker geometries in FIGS. 20 (design #1) and 21 (design #2). The results of the analyses for the geometries in FIGS. 20 and 21 are indicated in the chip-flow illustrations of FIGS. 22 and 23, respectively. As shown, the primary shear zone 23-1 of design #2 is larger than the zone 22-1 of design #1, indicating that design #2 has the better chip control because the chip is more affected by the chipbreaker geometry.

C. Chip and Tool Studies

In connection with the discussions above concerning the phenomenon represented in the chip-flow model of the present invention, the acquisition of the boundary conditions on the tool due to the action of the cutting process is a primary consideration of any chip-flow model. By describing such boundary conditions, wear and creep studies based on the simulations can then outline the performance of the cutting tool. Conventional models, however, have considered the tool as a rigid surface which plows through the workpiece material or, at most, considered only the elastic deformation of the cutting tool.

Figure 11A:
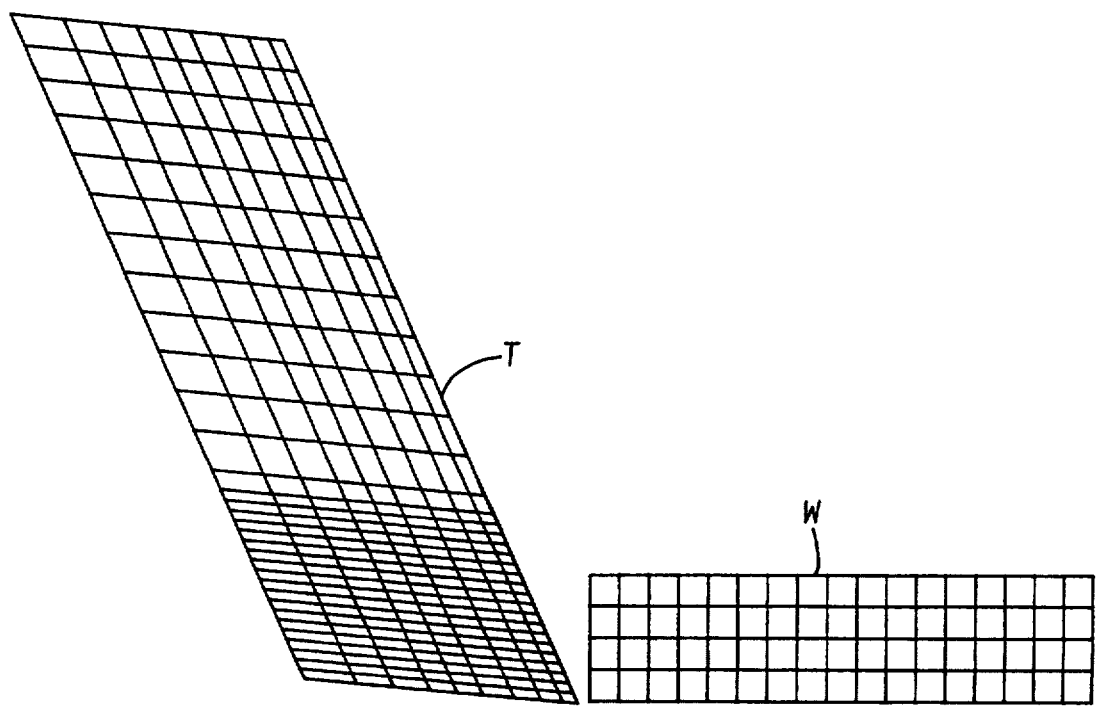
FIG. 11A illustrates a finite element tool mesh in accordance with the present invention.

Advantageously, the chip-flow models of the present invention incorporate the strain, rate, and temperature dependent properties of the tool by way of the thermal coupling phenomenon (step h), while simultaneously performing the cutting analysis. FIG. 11A shows an example of a cutting tool finite element mesh according to the present invention (steps m and n) with high element density at the tool/chip interface. In FIG. 11A, a tool "T" and a workpiece "W" are shown. The temperatures and loads from the chip flowing by the cutting tool are transferred to the tool via interface elements, resulting in the two-dimensional nonlinear finite element stress results [Pa-von Mises stress] in FIG. 11B computed from a thermally-coupled simultaneous analysis of the cutting tool and metal chip with interface friction.

The creep characteristics of the cutting tool are such that, in comparison to the rate of flow of the workpiece material over the tool, no creep of the tool will be seen over the time period of any chip flow simulation. By suitable modification of the time base of the cutting tool properties, deformation of the tool can be observed by simulating the cutting process for a sustained cut.

Figure 11C:
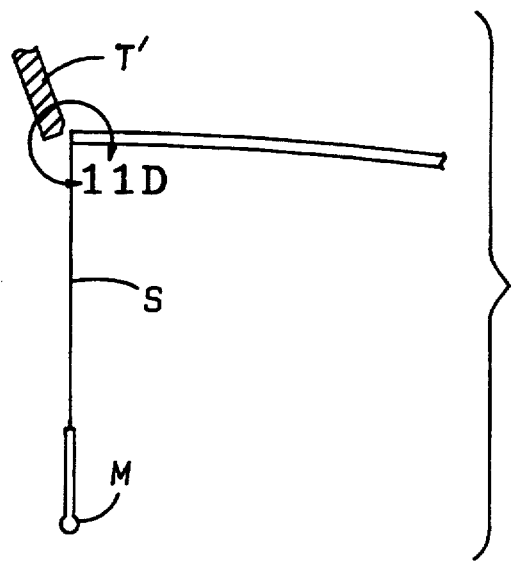
FIGS. 11C and 11D shows geometric modeling of the cutting surface of a tool.
Figure 11D:
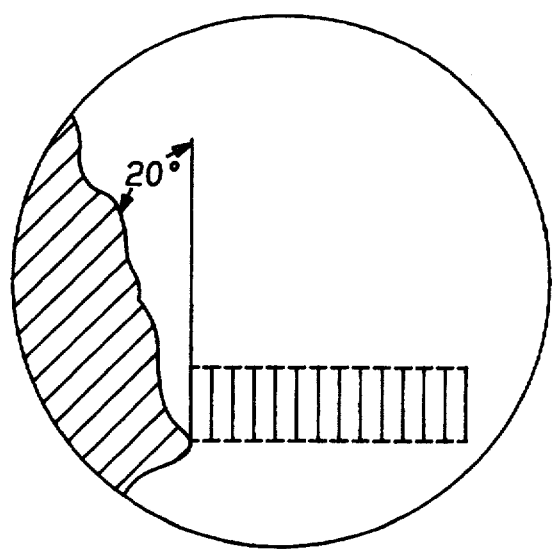

In addition to simultaneous simulation of the chip-and-tool, the chip-flow model has implemented accurate representations of the cutting tool geometry as shown in FIG. 11C. In FIG. 11C, a tool surface "T'", and a spoke "S" and a master node "M" at the center of a cylindrical workpiece are shown. This is a critical part of the chip-flow models since the subsequent chip shape and reactions on the cutting tool are a function of the 'chip-breaker' geometry (shape of the cutting tool surface).

D. Three-Dimensional Analysis

All prior work in chip-flow modeling has centered on two-dimensional simulations. Such simulations attempt to model the 'orthogonal' cutting process in lathe operations, or other cutting processes where the inclination angle is zero (such as broaching). Most cutting operations, however, are three-dimensional in both geometry and boundary conditions.

The simulations performed in three dimensions according to the present invention are executed pursuant to the flowchart of FIG. 2B in the same manner as the two-dimensional chip/tool analysis in FIG. 2A, except that the 3 D simulations require 3 D geometry and mesh descriptions (steps w and x), and utilize the ABAQUS *DYNAMICS procedure (discussed below) including a novel finite element technique known as an explicit dynamics formulation for exercising the model. This formulation is especially suited to problems where large, high speed deformations occur. The debonding formulation previously described was included in the three-dimensional model, but was expanded such that the chip tears away from two surfaces of the workpiece material, rather than one as in the two dimension cutting simulations.

Figure 12A:
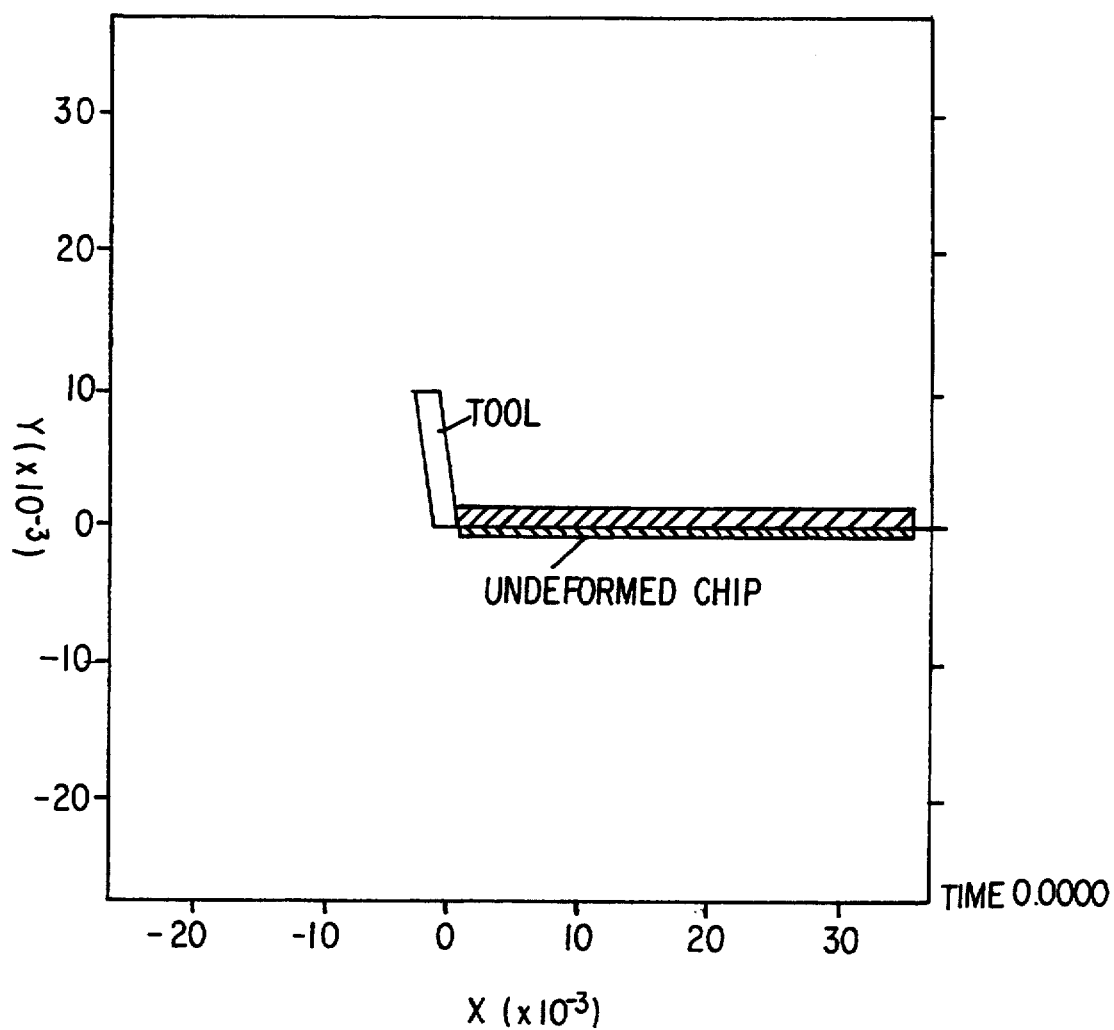
FIG. 12A is a side view of an undeformed chip.
Figure 12B:
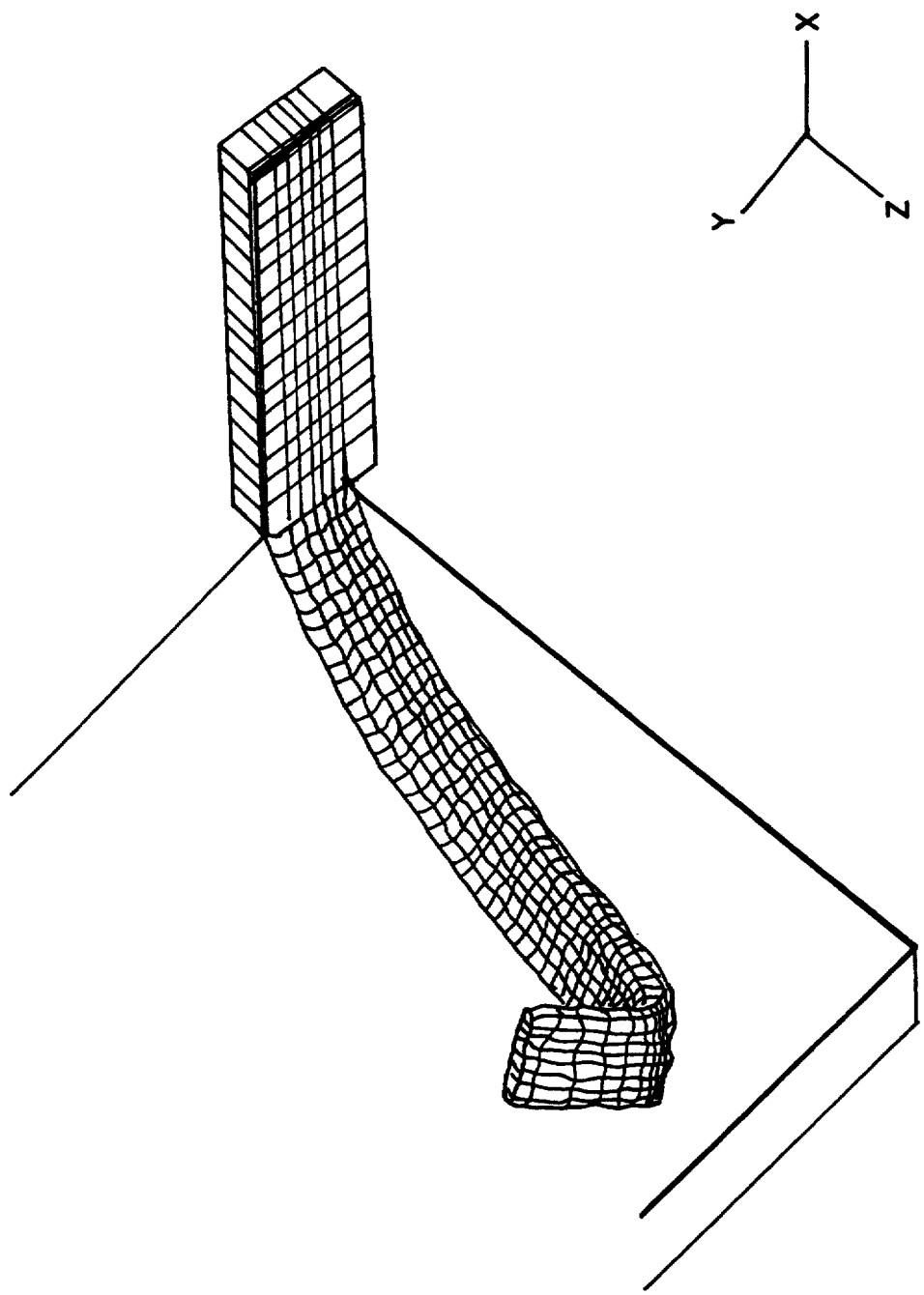
FIG. 12B is a three-dimensional view of a deformed chip in accordance with the chip-flow simulation of the present invention.
Figure 13:
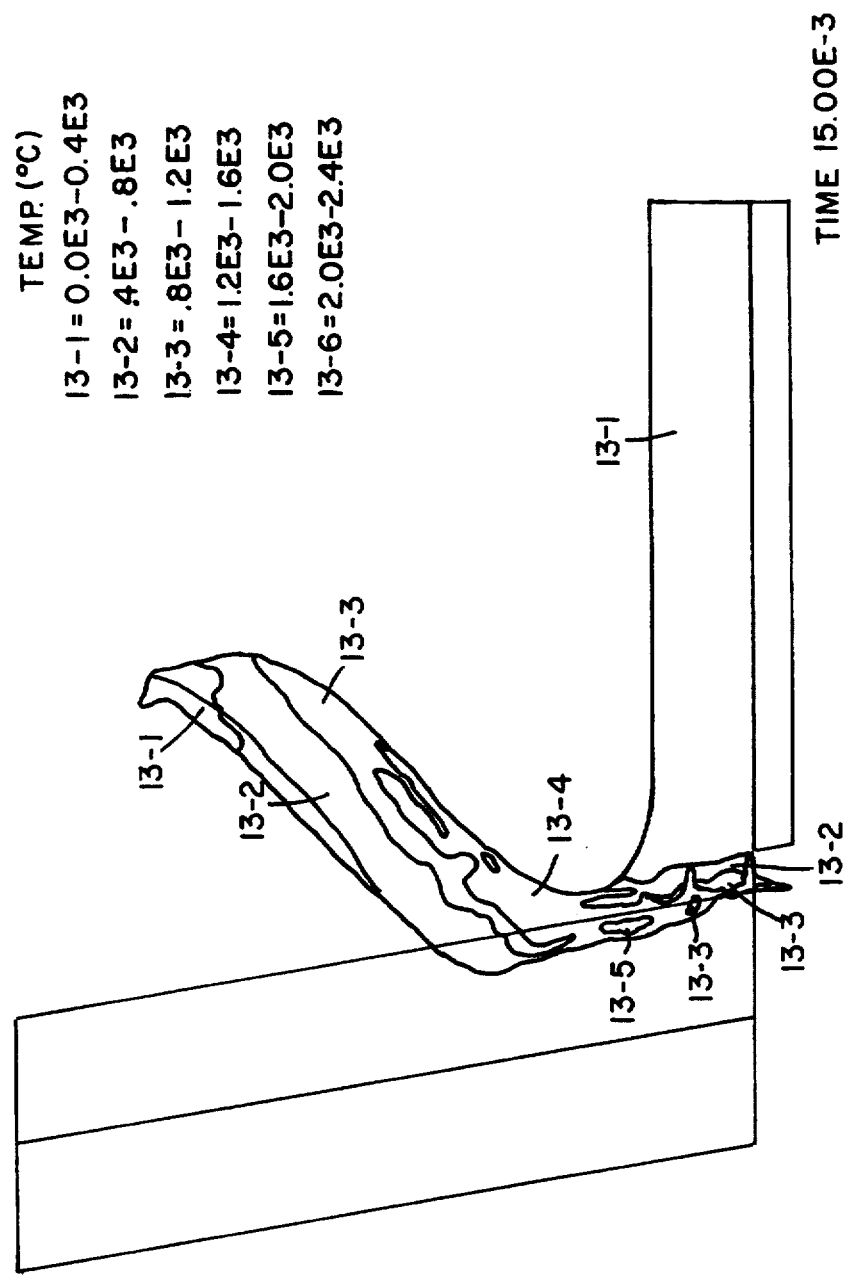
FIG. 13 is a temperature distribution of the chip in FIG. 12B.

FIG. 12B illustrates the three-dimensional nature of the cutting process with a non-zero inclination angle, while FIG. 13 illustrates the 3 D temperature gradients in the chip. It is expected that the tool designer will use such a three-dimensional simulation when it is felt that two-dimensional analyses are insufficient, such as at the end of the design cycle.

Explicit Dynamics Time Integration

The equations of motion for the chip-flow problems are $$\nabla \cdot T - \rho \ddot{u} + \rho f_B = 0, \quad (9)$$

where $\rho$ is the mass density per unit volume, $\ddot{u}$ is the acceleration of the material point, and $f_B$ is a specific (force per mass) body force vector, T is the true stress in the deformed configuration.

We seek the solution to Equation (9) subject to the boundary conditions $$u = f(t) \text{ on } S_u, \quad (10)$$

where $S_u$ represents the portion of the boundary on which kinematic quantities are specified (displacement, velocity, and acceleration). In addition to satisfying the kinematic boundary conditions given by Equation (10), we must satisfy the traction boundary conditions $$T \cdot n = s(t) \text{ on } S_T, \quad (11)$$

where $S_T$ represents the portion of the boundary on which tractions are specified. The boundary of the body is given by the union of $S_u$ and $S_T$, and we note that for a valid mechanics problem, $S_u$ and $S_t$ have a null intersection.

The jump conditions at all contact discontinuities must satisfy the relation $$(T^+ + T^-) \cdot n = 0 \text{ on } S_c, \quad (12)$$

where $S_c$ represents the contact intersection, and the superscripts "+" and "−" denote different sides of the contact surface.

The Lagrangian form of the continuity equation is written as $$\dot{\rho} - \rho \text{tr} D = 0. \quad (13)$$

This is satisfied trivially in our formulation since we do not allow mass transport. Equation (13) degenerates to $$\rho V = \rho_0 V_0, \quad (14)$$

where V is the volume, and the subscript "0" denotes a reference configuration.

The conservation of energy principle equates the increase in internal energy per unit volume to the rate at which work is being done by the stresses plus the rate at which heat is being added. In the absence of heat conduction.

$$E_v = \rho (\Delta E_m / \Delta t) = \sigma : d + \rho \dot{Q} \quad (15)$$

where $E_v$ is the energy per unit volume, $E_m$ is the energy per unit mass, and Q is the heat rate per unit mass, $\sigma$ the stress, and d the strain rate.

ABAQUS uses a modified central difference scheme to integrate the equations of motion through time. By this we mean that the velocities are integrated with a forward difference, while the displacements are integrated with a backward difference. The integration scheme for a node is expressed as $$\ddot{u}_t = (f_t^{EXT} - f_t^{INT}) / M \quad (16)$$

$$\dot{u}_{t+\Delta t} = \dot{u}_t + \Delta t \ddot{u}_t \quad (17)$$

$$u_{t+\Delta t} = u_t + \Delta t \dot{u}_{t+\Delta t} \quad (18)$$

where $f_t^{EXT}$ and $f_t^{INT}$ are the external and internal nodal forces, respectively, M is the nodal point lumped mass, and $\Delta t$ is the time increment.

The central difference operator is conditionally stable. It can be shown that the stability limit for the operator with no damping is given in terms of the highest eigenvalue in the system ($\omega_{max}$):

$$\Delta t \leq 2 / \omega_{max} \quad (19)$$

Equations (9) through (18) were discretized in the usual finite element manner for 8-noded hexahedron elements. A complete description of this process is provided by Taylor et al. in "Pronto 3D-A Three-Dimensional Transient Solid Dynamics Program," SANDIA report SAND87-1912, V6–32 (March 1989).

E. Cutting Simulation

A tool study was performed in accordance with the present invention by simulating the cutting of an AISI 4340 steel workpiece with two different hardening rates, while other cutting parameters (depth of cut, speed, feed, and tool orientation) were held constant. The following cutting conditions were used:

Cutting tool:TiC-coated WC-Co flat tool without chip breaker.
Coulomb coefficient of friction, $\mu = 0.10$
Rake angle = 10°
Inclination angle = 10°
Cutting speed = 1.75 m/s
Feed = 0.127 cm.

The AISI 4340 material properties are as follows:
Shear modulus, $2\mu = 150 \times 10^9$ Pa
Bulk modulus, $K = 196.1 \times 10^9$ Pa ($v = 0.33$)
Initial Yield, $\sigma_0 32\ 800 \times 10^6$ Pa
Hardening modulus, $H = 500 \times 10^6$ Pa and $100 \times 10^{-3}$ Pa
Initial temperature, $T_0 = 0$ K.
Stress intensity factor, $J_{IC} = 87600$ Nm/m$^{1.5}$
Thickness of bond material layer, $t = 0.5$ mm
Adiabatic factor, $1/\rho c_v = 2.618 \times 10^{-7}$ m$^3$/J-K
$e_f = 0.438$ [from Equation (4)]
Plastic work heat fraction, $W_p = 1.0$ The mesh of the uncut workpiece is shown in FIG. 12A. The mesh contained 2048 8-noded solid elements and 832 debonding elements containing a total of 3980 nodes. The cutting simulation was run for 15.0 μs, enough time to allow substantial curling of the chip over the rake face of the tool. Solution data (stress components, strains, strain rates, invariants, temperatures, etc.) was written to disk every 0.25 μs, so that 60 "snapshots" of deformation were recorded, permitting animation of the time-dependent solution variables. Computation time for the three-dimensional simulation was 32 cpu hours on a VAX 8800. This means that depending on the number of other processors currently running, the simulation turn-around could vary from 2 days to 1 week (wall-clock time) on a machine of equivalent capabilities.

Figure 14:
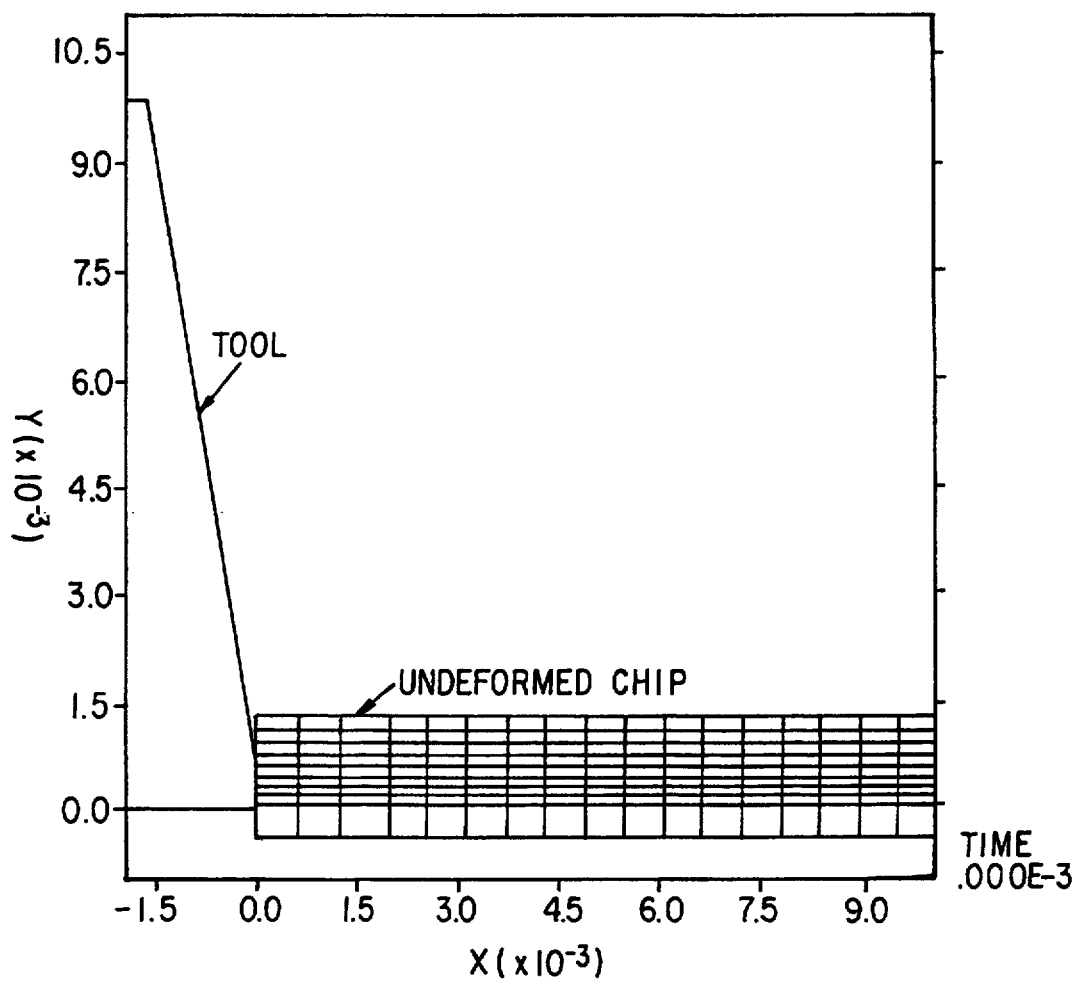
FIG. 14 is an amplified view of the chip shown in FIG. 12A, illustrating clearly the location of the cutting tool and lower surface debonding elements.

The first simulation with hardening rate of 500E6 Pa simulated 4340 steel, while the second was a nearly elasto-plastic material which could be thought of as a 4340 steel at elevated temperatures. FIGS. 12A and 14 show the mesh of the chip at t=0 s, illustrating the tool orientation and position of the debonding elements. Note the rake and the inclination angles of 10°.

During the three-dimensional cutting simulation, many time-dependent parameters were calculated at every node and gauss point in the mesh for every iteration during the solution process. These parameters include deformation, strain, strain rate, stress, principal stresses and strains, von Mises, tresca, and hydrostatic components, temperatures, plastic strain, and actively yielding flags.

Figure 15:
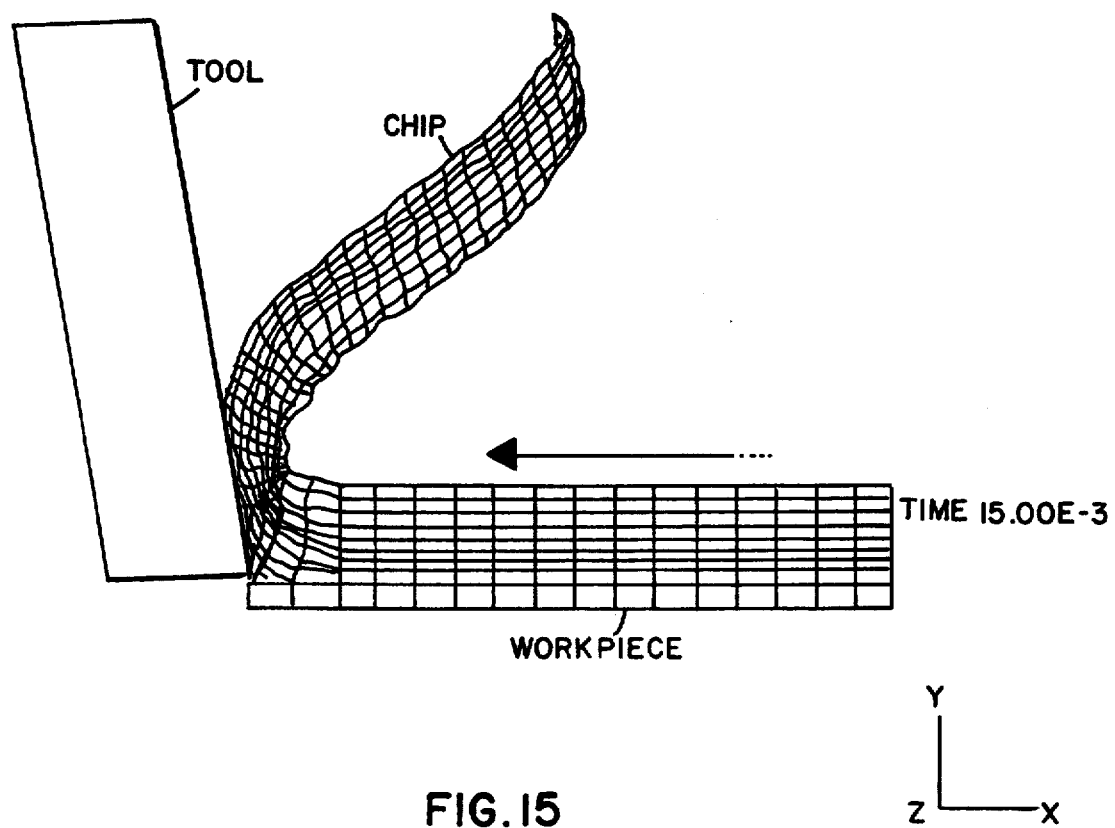
FIG. 15 is a further perspective view of the cutting operation in FIG. 12B.

Results are presented for the H=500E6 Pa case first, followed by the H=100E−3 Pa case. FIG. 15 illustrates the deformation of the chip at an intermediate time step in the solution procedure, with the chip being in thermal and mechanical equilibrium. Note the curling of the chip in several directions, opposed to the single radius of curvature found by similar two-dimensional models. Heat is generated in the models by fracturing of the chip from the workpiece, friction along the tool-chip interface, and by plastic deformation of the workpiece material. This heat generation was fully discussed hereinabove in connection with the thermal coupling phenomenon. We have assigned all of this work to the generation of heat in the chip volume, although other assignments are possible within the scope of the invention. Other researchers have concluded that little heat is transferred into the uncut material of the workpiece, substantiating this assumption. The temperature distribution in the chip would be reduced when conduction into the cutting tool convection and radiation terms are fully modeled. Furthermore, a more accurate temperature-dependent material model for the workpiece would further reduce the maximum chip temperature.

Figure 16:
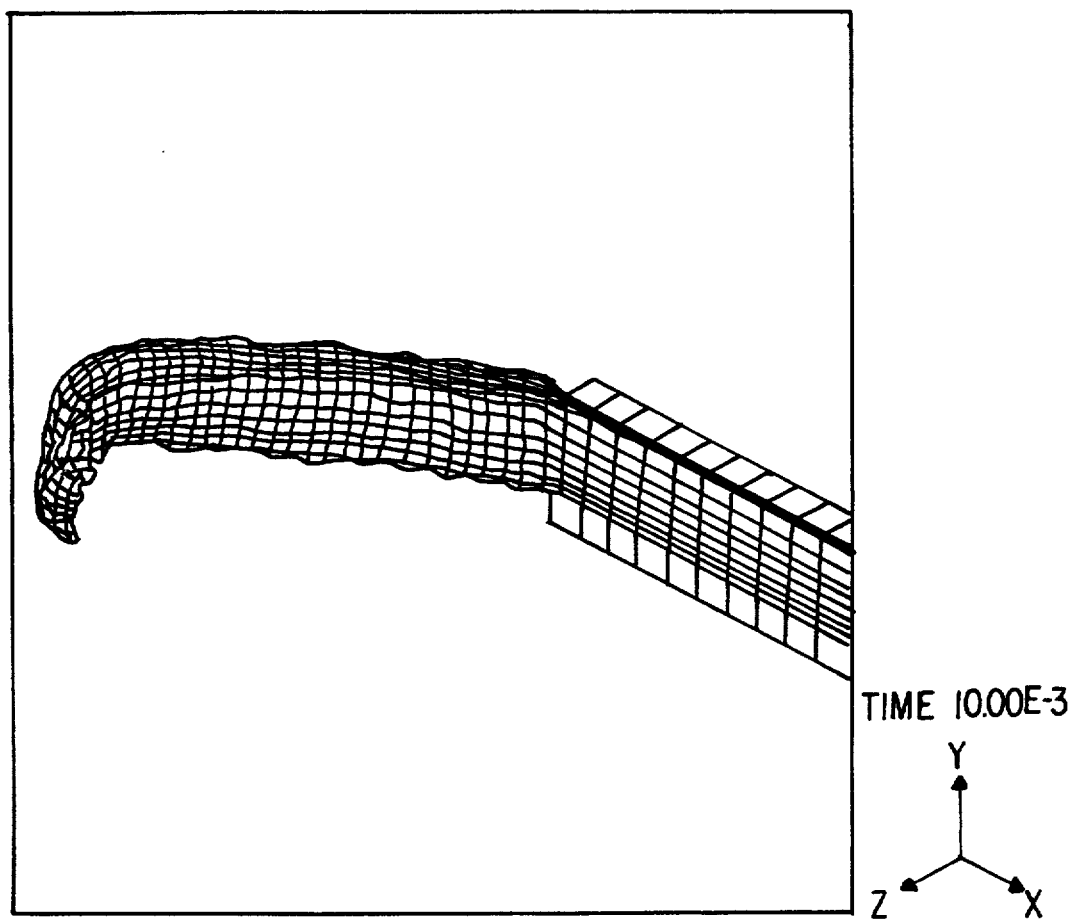
FIG. 16 is a perspective view of a deformed chip in accordance with a simulation of the present invention.
Figure 17:
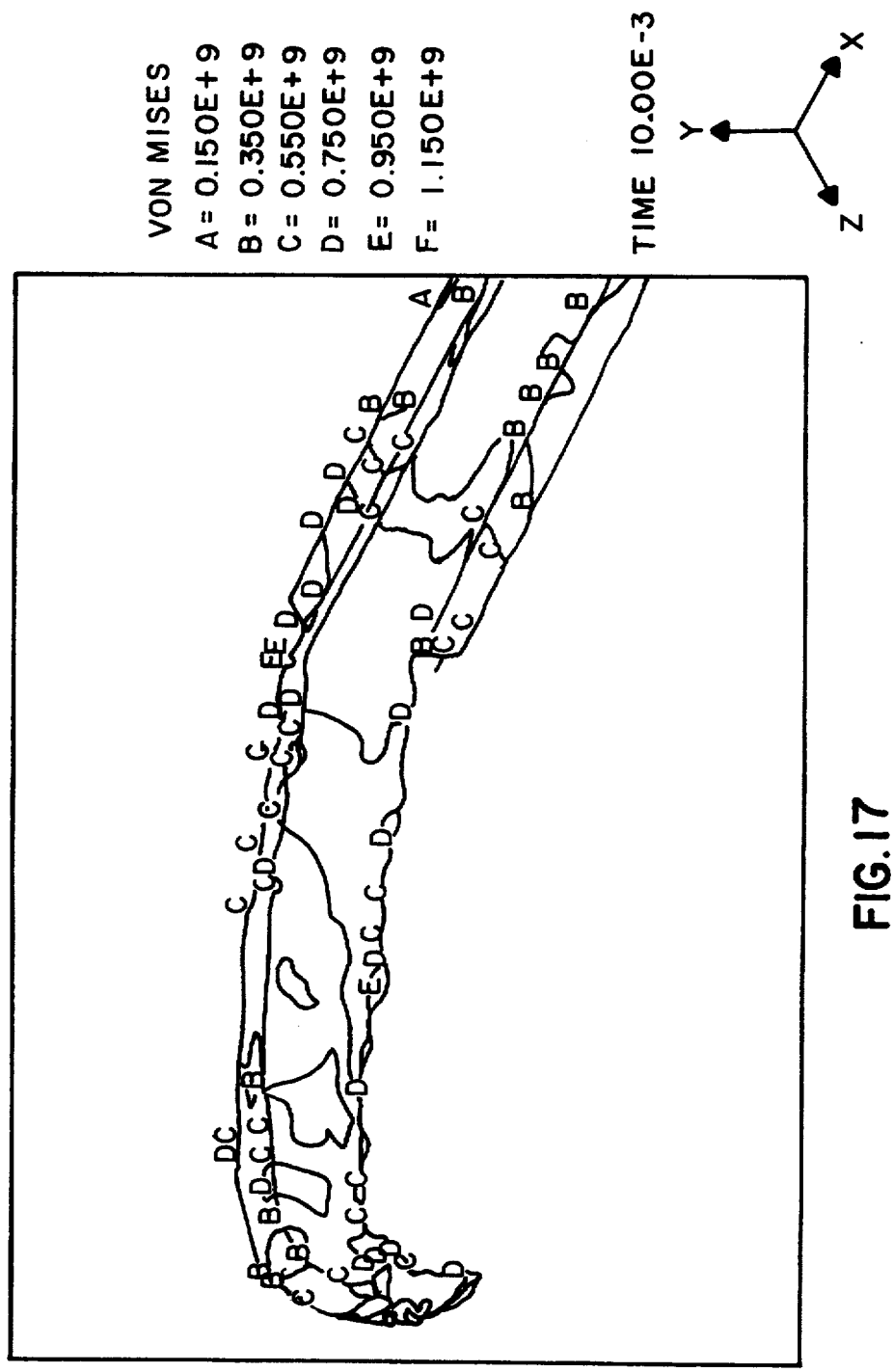
FIG. 17 illustrates a series of von Mises stress contours for a deformed chip.

The deformed shape at an intermediate time interval for the H=100E−3 Pa case (FIG. 16) shows the change in chip shape for a lower hardening rate material. Note the increased contact zone in these figures, compared to the case with the larger hardening rate. FIG. 17 illustrates the distribution of the von Mises stress in the deformed chip at this time interval of the solution.

The successful simulation of the chip-flow process in three-dimensions facilitates an analysis of metal flow over the tool face. Three-dimensional simulations clearly give much more information about the morphology of the chip in its deformed state. Chip curl radii in several directions can be easily resolved from the images of the deformed shapes, or directly from the solution data. This information is useful in the "numerical construction" of chips-boards to judge the application range for a given tool and workpiece geometry. The higher hardening rate material provides a tighter chip radius since the stress state through the thickness of the chip is much less uniform, resulting in a tendency to curl the chip.

The tighter chip curl radius also results in a lower contact area (patch) for the H=500E6 Pa case. This could conceivably reduce wear and heat transfer in the rake face of the chip, depending upon the reaction forces and temperatures in the contact zone. This information on the contact region is also indicative of how cutting tool edge geometry will effect the morphology of the chip. For instance, small t-landed edge designs will have little effect on resulting chip shape for elasto-plastic materials.

The curling of the chip in several directions can provide a means to investigate the breakage of the chip from the workpiece. For example, if the chip curls in a manner such that it hits the just-machined surface of the workpiece, or curls back and hits the tool holder, the force encountered during this impact is usually sufficient to break the chip away. This is frequently seen in the machining of steel workpiece materials. In order to predict chip lengths from models, bending moments could be applied to curled chips of various lengths to determine the final chip size.

The highest temperatures encountered in the chip occur at the intersection of the planes containing the debonding element. This has been demonstrated in infrared temperature measurements of the cutting process. In the numerical model, this temperature peak in the chip occurs because the energy released in fracturing the chip all goes into the creation of heat energy, and also because this is a corner of the chip, so the heat transfer rate is smaller than if this heat source was located at the center of the chip volume.

Several enhancements can be made in the model prior to use in a tool-design environment. These include a more accurate material model for the workpiece, which would require temperature and strain-dependent material properties, and temperature-dependent fracture toughness for the debonding element. Also, specific cutting tool chip breaker geometries could be used as input for the analyses. Lastly, improvements in computer speed and visualization would be required for improved post processing of the large data sets created during a three-dimensional simulation of the cutting process.

The above results demonstrate the possibility of using three-dimensional cutting simulations to support cutting tool design. In fact, the computational time to complete the three-dimensional chip-flow analysis is manageable with a minisupercomputer, thus making this a viable method of analyzing the chip formation process for turning and milling operations.

The linear finite element analysis of the present invention has been applied to the design of a ceramic chip-breaker disclosed in U.S. Pat. No. 4,963,061.

II. Artificial Intelligence

Once the mathematical models have been exercised to provide predictive performance results of the tool response and chip-flow simulation, the results are reviewed by an artificial intelligence (AI) module 18 in FIG. 1. (Steps aa–gg in FIG. 2C).

In accordance with the present invention, each simulation model can be represented, for illustrative purposes only, by a function $y=f(x)$ wherein x is an input vector of modifiable parameters, and f(x) is the series of mathematical relationships between the input x and output vector y. In the present invention, f(x) will be an implicit function of the design variables x, since a suitable chip-flow analysis using ABAQUS is necessary to find the function f for a given set of x.

The AI system includes a hierarchical structure of rules for comparing the predicted y vector to predetermined acceptability criteria y'. (Step ee). This rule-based comparison produces a judgment which indicates whether the predicted response is acceptable or unacceptable within the constraints of the rule. (Step ff).

Based on these judgments, a recommendation is made to modify the defining relationships of the model represented by f(x) and/or modify the parameters of the input vector x. (Step gg). Specifically, the new design parameters of the chip-flow and tool models are returned to the mesh and model-generating steps m, n, and w for constructing new models to be exercised. (Step ii).

Thus, it is apparent that the AI system performs a rule-based comparison module, renders judgments based on the comparison, provides a recommendation embodying said judgment, and modifies the model/input parameters in accordance with the recommendation.

Figure 19:
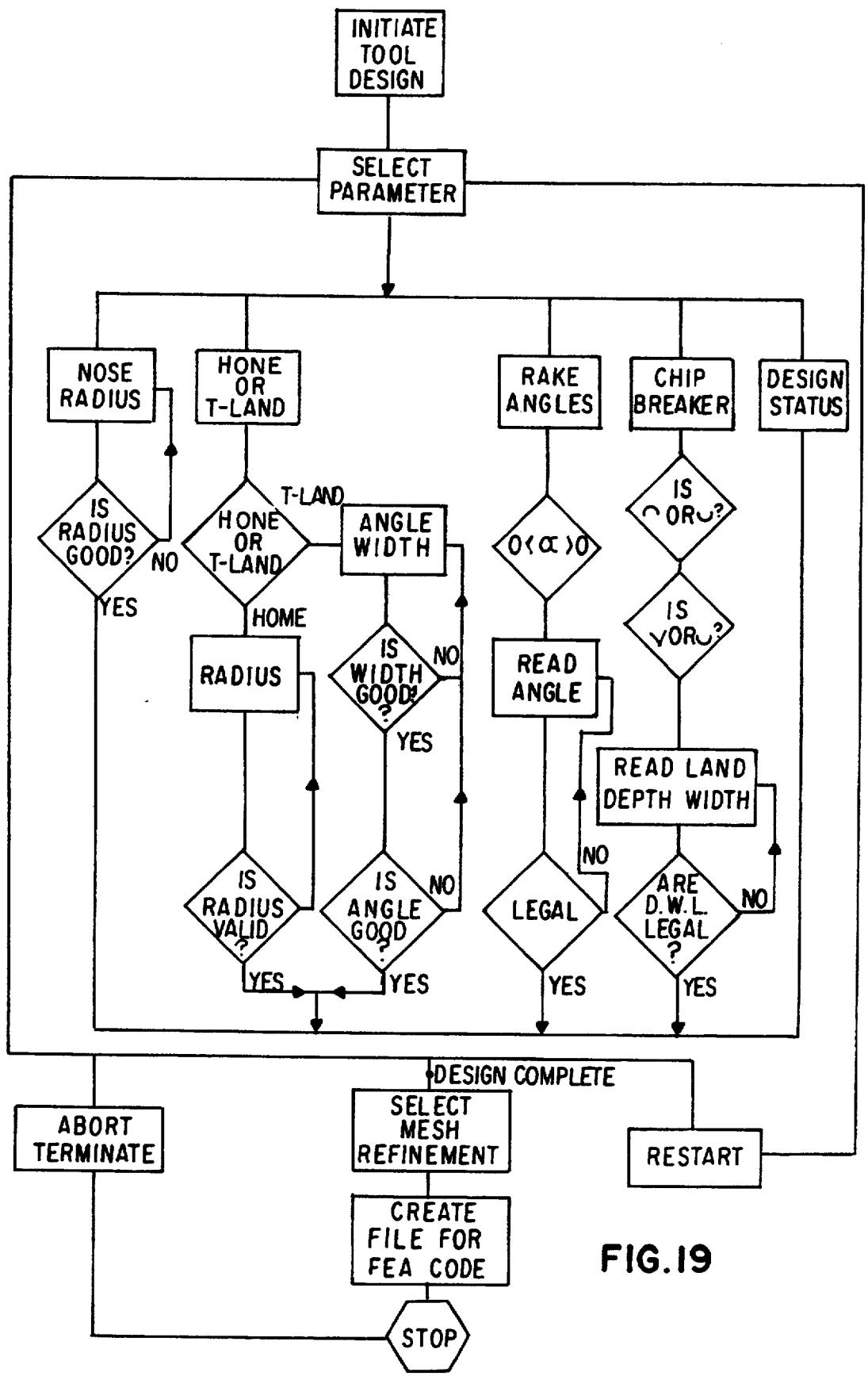
FIG. 19 is a flow diagram used to evaluate a tool design.

FIG. 19 illustrates the decision-making process involved in a rule-based system for evaluating the design of a cutting tool, and is representative of the logic flow of the AI module 18 for tool response and chip-flow simulations. The tool design is characterized by parameters such as land-width, land-angle, chip-breaker depth, form-width, incident-angle, and other variables relating to the geometry and angles of a chip-breaker design on the cutting nose of the tool insert. These listed measures are only a representative list as it should be well known to those skilled in the art that other measures are also included.

As indicated in FIG. 19, these variables are applied to rule-based decision blocks embodying tool requirements relating to such evaluative measurements as geometric characteristics, stress, and temperature levels. Based on the acceptability of these measurements, the design variables are appropriately modified until an acceptable design is achieved.

In accordance with FIG. 19, an AI module for evaluating tool and chip-flow simulations would use characteristics such as chip size, chip radii, chip thickness, localization, and other such parameters available from chip-board matrices to evaluate the simulations. In particular, a design vector of the above-identified variables is used to design a tool such that tool failure does not occur and suitable chip-control is obtained.

In order to implement AI module 18, a set of pre-existing rules on the strength of the tool material, and acceptable sizes and shapes of the resultang chips would be stored within the cutting tool data base. At every tool design iteration (i.e., after a chip-flow or cutting tool analysis), the chip size and stresses within the cutting tool would be compared to the values in the database. Any conditions that are violated will necessitate computation of the appropriate changes in the design variables such that the rule-based judgments in subsequent iterations will converge to an acceptable design.

As discussed above, and outlined in the instruction sets of the Appendix, the present invention provides as an input deck to ABAQUS a description of the chip-breaker geometry and boundary conditions; node coordinate specifications; element definitions for chip, spokes, bonds, and tool-chip interfaces; stress-strain curve data; material property definitions; and analysis type. It should be apparent to those skilled in the art that modifications can be made to the instruction sets to supplement the analysis with other ABAQUS subroutines.

Once analysis results are produced, the simulation is evaluated. For example, in the drawings of FIGS. 22 and 23, the degree of localization in the primary shear zone is used to compare the relative merits of designs #1 and #2. If the analysis is modified to allow for chip removal, data available from chip-board matrices, such as chip size, radii, and thickness, is used to evaluate chip control.

Although the analysis for designs #1 and #2 differ only in the chip-breaker geometries being analyzed, the representative set of parameters for the input deck listed above can be modified on subsequent iterations. However, if such parameters are fixed to correspond to a desired cutting environment, the chipbreaker geometry is changed by modifying the interface element definition until an acceptable chip-flow simulation is achieved. Other analyses which a designer may review in conducting the simulations include temperature distributions, reaction forces on the contact surfaces, and stress-strain levels.

In the present invention, the knowledge base for the expert system is derived from the material and VTAS database from all previous tool trials. The inference engine is a program which controls the testing of internals rules, or "IF-THEN" statements which make judgments on the current tool design.

Incorporated herein by reference are the following United States patents which are instructive of the field of artificial intelligence: U.S. Pat. Nos. 4,949,278, 4,918,620, 4,648,044, 4,866,635, 4,595,982, and 4,967,368.

While each programmable function and operation executed by the algorithms of the present invention consists of one or more equations embodied in a numerical model, the invention is not so limited to models with specific relationships between the input and output variables.

In certain applications to be represented by an expert system, the required relationship between variables may be too complex to be represented by an equation. In such cases, it may be necessary to extrapolate the desired result from available data. One way to accomplish this extrapolation function is by including a neural-net in the system model section of the expert system architecture of the present invention. A neural-net is a software simulation of a parallel distributed processing system in which each node is similar to a neuron and connected to all other nodes. In typical applications as known in the art, neural-nets are used either for pattern association, where a set of patterns are associated with another set of patterns, or for auto-association, where a partial input pattern is associated with its complete pattern. In applying neural-nets to the present invention architecture, the neural-net is utilized to associate a set of input data with a set of output data. The data module provides the user with an input and an output file. Using these files, the user enters into the system a set of input and output data. The data module then calls the neural-net software and passes to it the information contained in these files. Using this data, the neural-net software learns the relationship between the input and output data. This relationship is stored in the neural-net as weights, or strength of connections, between input and output nodes representative of the input and output variables. Subsequently, the data module asks the user for a set of new input parameters. The data module then passes the new input data to the neural-net. Using the weights between input and output nodes, the neural-net software determines the output data associated with the input data submitted by the user. Thus, the operating flexibility of the expert system can be enhanced by use of neural-net technology. A brief description of performance of pattern association by neural-nets is provided in the reference entitled "Parallel Distributed Processing" by Rumelhart et al., Vol. 1, page 446, the MIT Press, Cambridge, Mass.

While in accordance with the architecture of the preferred embodiment of the present invention the various software functions performed within the system architecture are each designated as part of one of the architecture modules, the invention is not so limited. As will be recognized by those skilled in the art, the designations of program and data modules as well as the other architectural components, while preferred herein, are primarily for convenience in organizing the various program functions. To some extent, the various functions could be allocated differently among the architectural modules or, alternatively, different modules could be designated and program functions assigned thereto, all without affecting expert system operation.

III. Database Creation

The database module shown in FIG. 1 interacts with the simulation modules 16 and 17 of both the chip-flow and tool responses, respectively, and with the AI module 18 in rendering new tool designs.

Presently, the database implemented in the system of FIG. 1 is the Valenite Tooling and Analysis Software (VTAS) package available from GTE Valenite. VTAS receives basic information from a user about the cutting application, such as speeds, feeds, and materials, and executes algorithms to match the characteristics of the cutting operation to the best choice in tool grade and geometry. This method has the advantage of being able to extrapolate information from a limited amount of internal and external data to make useful recommendations on almost any cutting operation.

Figure 18:
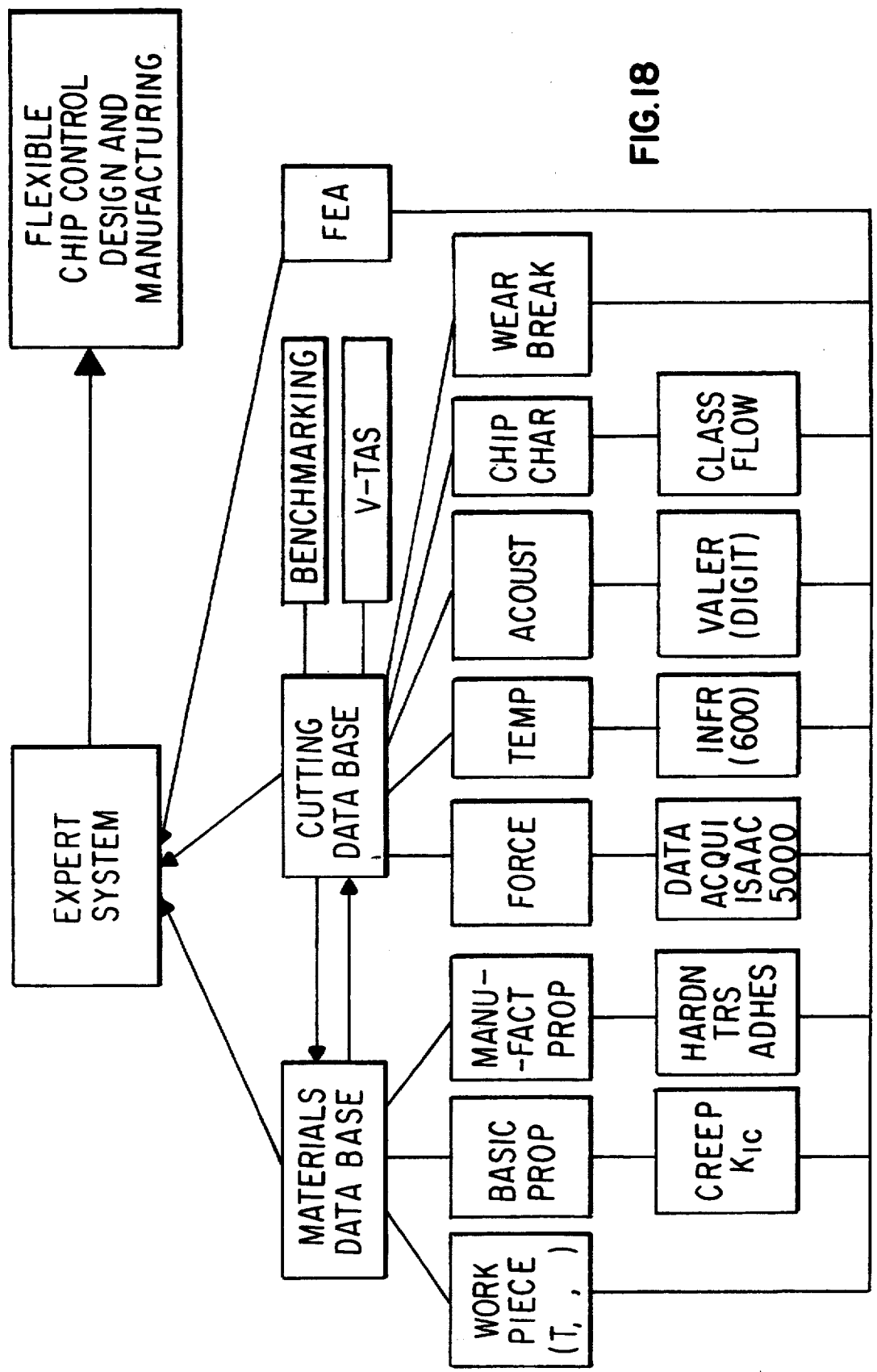
FIG. 18 shows an overview of the database system used in the present invention.

VTAS combines a materials database with a cutting database as shown in FIG. 18. The following list of database parameters should not serve as a complete recitation of the data values available to the analysis module 12, but rather as an exemplary subset of parameters whereby other parameters should be readily appreciated by those skilled in the art to be included in the present invention.

The cutting database includes empirically determined information about the cutting condition and machining parameters. The cutting condition includes data on such parameters as cutting speed, feed, and depth of cut, while the machining parameters include data on static and dynamic factors, operational features (turning, milling, drilling, thread cutting), and thermal effects. Parameters such as forces and temperatures are acquired by equipment well known in the art for monitoring cutting operations, such as the ISAAC 5000 Data Acquisition system, infrared sensors, and the Dynametrics measurement assembly.

The materials database includes primary physical and mechanical properties of the tool and workpiece. For example, cutting tool parameters include tool geometries, chip form (chipbreaker designs and constraints), bit grade, deflection shoulders, loadabilities, working ranges, and suitability for different workpiece materials, cutting conditions, stabilities, cutting rates, chip cross-sections, and individual processing methods. Workpiece properties include treatment conditions, hardness, alloying components, mechanical strength, surface conditions, machining behavior, and raw and finished dimensions.

The material properties and cutting conditions together provide the boundary conditions of the cutting operation. U.S. Pat. No. 4,992,948, hereby incorporated by reference, discloses a data processing unit accessing a database for controlling a machine tool.

The VTAS database is continually modified as new workpiece materials, tool inserts and tool materials are studied. Similarly, when some contents of the database become obsolete, they will be removed from the database. Also, simulation results are included in the database, and can be easily modified when new models which describe the cutting process are derived. The results from the simulation studies which are to be included into the machinability database do not include any experimentally-determined variables (such as chip thickness) in the analysis. This means that only primary physical and mechanical properties of the tool and the workpiece (such as stiffness, thermal conductivity, and yield strength) are used to simulate machine tests. This analysis is supplemented by database information on forces and temperatures of the cutting operation, which are measured from actual cutting operations.

It should be obvious to those skilled in the art that a computer-accessible and modifiable database other than VTAS is implementable in a computer system and therefore forms a part of the present invention, wherein such a database combines machining data, materials data, cutting operation information, and results of simulated and real-time tool studies.

IV. Animation/Results Evaluation

Chip-flow modeling generates very large data sets, since all parameters (temperature, stresses, strains, invariants) are monitored for every increment in the simulation. Such large volumes of information require novel visualization techniques for interpretation of the data. Previous work has centered on contour plots (still images), or frame-by-frame animation of the incremental data. GTE Laboratories, an assignee of the present application, has produced an animation system which allows the tool designer to interact with the data set as it is being visually represented. Currently, the deformation and a single time-dependent parameter (such as temperature) may be monitored during the animation. The animation tools, however, are modifiable to permit the simultaneous rendering of several time-dependent parameters.

V. Manufacturing of Tool

Once the decision module 19 in FIG. 1 determines that the tool design is acceptable, system control is awarded to the manufacturing module 11 for fabricating a physical tool prototype as discussed in section A. below, or for fabricating a plastic tool prototype as discussed in section B. below. (Step hh in FIG. 2C).

A. CAD-CAM Integration

A computer-aided design (CAD) module 10 in FIG. 1 is employed by GTE Valenite in generating tool prototypes based on acceptable tool designs using a Unigraphics workstation to produce three-dimensional tool geometries which are directly downloaded to a chip form module 21. Module 21 preferably includes a 4-axis mill for cutting a tool form with the desired chipbreaker design.

A computer-aided manufacturing (CAM) module 23 receives the tool form and produces a physical cutting tool. However, the fabrication of a physical tool prototype with a conventional CAD/CAM system possesses the following disadvantages:

Inability to incorporate, enhance, and manufacture more sophisticated design elements in chipbreaker geometries.

Difficulty in transferring accurate dimensional design details into manufacturing.

Time restraints on receipt of engineering prints and hard tooling.

Additional manufacturing time needed to incorporate improved design changes.

Accuracy/repeatability of ground prototypes.

Performance changes are not easily implemented from ground prototype to final pressed product.

Transfer of dimensional design requirements on additional styles.

Manufacturing time needed to produce test pieces.

B. Plastic Tooling

The present invention preferably utilizes the conventional CAD/CAM assembly discussed above with a novel process employing plastic as a die material for producing plastic tool prototypes. The plastic tooling process is directed to a method for making a compact for a densified cutting insert of a hard refractory material having a predetermined desired shape, comprising the following steps: (i) forming a machinable wax material into the predetermined desired shape, (ii) contacting the shaped machinable wax material with an uncured flowable liquid moldable plastic material and curing the moldable plastic material to form a substantially incompressible solid plastic mold, and (iii) compacting a powdered mixture comprising an organic binder and hard refractory particles into contact with the mold at a sufficient pressure to form a compact having the predetermined desired shape.

This plastic tooling process is disclosed in copending application entitled "METHOD OF MAKING CUTTING INSERTS," Ser. No. 07/489,798 filed Mar. 5, 1990 by Thomas J. Bernadic et al. and assigned to GTE Valenite of Troy, Mich., which copending application is a continuation of copending application entitled "METHOD OF MAKING CUTTING INSERTS," Ser. No. 07/228,116 filed Aug. 4, 1988 by Bernadic et al. and assigned to GTE Valenite, wherein both of said copending applications are hereby incorporated by reference into the present application.

The advantages of a CAD/CAM system implementing plastic tooling include the following:

Ability to incorporate, enhance, and manufacture more sophisticated design elements in chipbreaker geometries.

Produce 3-D models of required chipbreaker designs via a CAD system.

Produce machining coordinates via CAD/CAM link to 4-axis milling machine to produce press tooling.

Substantial time savings for improved design changes.

Repeatability/accuracy of each chipbreaker design is machine tested.

Accurate Translations of required chipbreaker design into manufacturing.

Improved manufacturing times on engineering drawings and hard tooling.

Complete design requirements on additional styles before producing hard tooling sets.

Quick response for capturing smaller mark windows.

Taking designs risks without high up-front costs.

The plastic tooling of prototypes in combination with the optimal designing of cutting tools by performing simulations of various cutting operations offer tool designers significant savings in development time and engineering resources.

Advantageously, CAD/CAM plastic tooling in accordance with the present invention has been employed in light duty tool standards development and customer-requested special deliveries, and has potential uses in the actual manufacture of tool inserts.

IV. EXTENSIONS

This invention greatly reduces the time required to design and select cutting tools by virtually eliminating the trial and error process currently used, and replaces it with an integrated CAD/CAM, machinability database that has retrievable information from all previous machinability studies performed, on-going machinability studies, and the results from simulating the chip-flow process by detailed numerical models of the material removal process. The key element is the integration of the database with the CAD, CAM and numerical simulations, tailored specifically for cutting tool manufacturing (FIG. 1).

It should be readily appreciated by those skilled in the art that such a system as described herein can serve as a manufacturing cell responsive to customer requests for providing either a tool design or a plastic tool prototype based on this design. In particular, a customer's request may include a description of the desired tool materials, workpiece, and cutting environment from which the simulated machinability studies of the present invention can provide a range of tool designs with associated performance measures for review and selection by the customer. Once an optimal design is chosen pursuant to the customer's special requirements, a plastic tool prototype can be manufactured, or preferably a set of prototypes with different designs are manufactured for testing and evaluation since the plastic tooling process affords such batch production in a short period of time.

The following is a summary of the modules in the cutting tool system of the present invention along with the benefits and opportunities available with each such module.

CAD/CAM

Increase manufacturing efficiency on special short run jobs.

Reduction in time/manpower/cost by utilizing plastic tooling.

DATABASE

Real-time process control.

On-demand benchmarking information.

TIME-SHARING

Common FEA resource for engineering applications.

Capability for modeling of complex problems such as milling and drilling.

Linkage of material/tool/toolholder models.

SUPER-COMPUTING NETWORK

Improving speed of ABAQUS calculations.

CHIP-BREAKER DESIGN

Short term tool optimization on specific job applications.

Field accessible resource for problem solving.

FAILURE ANALYSIS

Performance predictions based on physical property measurement.

"Expert system" based grade selection.

Product analysis in terms of manufacturing tolerances.

While preferred embodiments have been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

APPENDIX TO SPECIFICATIO

```
*HEADING, UNSYMM
RATE INDEP, 10 DEGREE RAKE (FROM VERTICAL)
SPEED = 1.75 M/S, FRICTION=0.5, GRADED MESH
DEBONDING ELEMENT
**WAVEFRONT MINIMIZATION,SUPPRESS
** put restart at a freq. of 1000 to write only LAST iteration
*RESTART, WRITE, FREQ=1000
**
** NODES
**
*NODE, SYSTEM=C
    1, 0.10033, 90.000
 1001, 0.10033, 90.000
 9001, 0.10160, 89.945
*NSET, NSET=BL
1001
*NSET, NSET=TL
9001
*NFILL, BIAS=0.8, NSET=LHS
BL, TL, 8, 1000
*NSET, NSET=LHS, GEN
1, 9001, 1000
*NCOPY, OLD SET=LHS, CHANGE NUMBER=1, SHIFT, MULTIPLE=64, NEW SET=ALL
0., 0., 0.
0., 0., 0.,  0., 0., -1.,  0.159
*NSET, NSET=ALL
LHS
*NSET, NSET=BOT, GEN
1001, 1065, 1
*NODE, NSET=MASTER
50001, 0., 0.
*NCOPY, OLD SET=MASTER, CHANGE NUMBER=1, SHIFT, MULTIPLE=64
0., 0., 0.
0., 0., 0.,  0., 0., -1.,  0.0
*NSET, NSET=CENTER, GEN
50001, 50065, 1
*NODE, NSET=TOOL
60000, 0.0, 0.10033
**
** DEFINE ELEMENTS
**
**    CHIP
**
*ELEMENT, TYPE=CPE4
1001, 1001, 1002, 2002, 2001
```

```
*ELGEN, ELSET=CHIP
1001,  64, 1, 1,   8, 1000, 1000
*SOLID SECTION, ELSET=CHIP, MAT=ST4340
*MATERIAL, NAME=ST4340
*ELASTIC
209.0E9, 0.33
*PLASTIC
** this is the "CHIP8" stress - strain curve
 800.0E6, 0.00
 850.0E6, 0.10
 800.0E6, 0.25
 750.0E6, 0.50
 700.0E6, 1.00
 700.0E6, 1.25
 700.0E6, 1.50
 700.0E6, 2.00
***RATE DEPENDENT
** 40.0, 5.0
*SPECIFIC HEAT
**J/kg -K
599.13
*DENSITY
kg/m3
7700.0
*CONDUCTIVITY
**W/m-K
43.0
***EXPANSION
** /K
**21.6E-3
*INELASTIC HEAT FRACTION
1.0
**
**     SPOKES
**
*ELEMENT, TYPE=B21, ELSET=SPOKE
50001, 50001, 1
*ELGEN, ELSET=SPOKE
50001, 65, 1, 1
*BEAM SECTION, MAT=SPOKE, ELSET=SPOKE, SECT=RECT
** WIDTH, DEPTH
1.0, 0.1
*MATERIAL, NAME=SPOKE
*ELASTIC
209.0E9, 0.33
**
**     BONDS
**
*USER ELEMENT, TYPE=U1, NODES=4, COORDINATES=2, PROP=7, VAR=2, UNSYMM
1, 2
*UEL PROPERTY, ELSET=BOND
** E1, E2, EP1, EP2, EZ1, EZ2, THICK
** WHERE  THICK*EZ1 = 2*J1C/SIGY1,   THICK*EZ2 = 2*J2C/SIGY2
**   AND  SIGY2 = SIGY1/2  AND  E2 = E1/(2*(1+NU))
** J1C = J2C = 87600 N-M/M**2 (= 500 IN-LBF/IN**2)
200.0E9, 75.2E9,  4.0E-3, 5.33E-3, 3.65, 7.30, 0.06E-3
*ELEMENT, TYPE=U1, ELSET=BOND
 1,  1, 1001, 1001, 1002
 2,  2, 1002, 1001, 1003
65, 65, 1065, 1064, 1065
*ELGEN, ELSET=BOND
2, 63, 1, 1
**
**    TOOL-CHIP INTERFACES
**
*ELEMENT, TYPE=IRS21, ELSET=INTER
60001, 1001, 1002, 60000
61001, 1001, 2001, 60000
*ELGEN, ELSET=INTER
60001, 64,    1,    1
61001,  8, 1000, 1000
```

```
** DESIGN 1 INTERFACE ELEMENT DEFINITION (UNITS - METERS)
*RIGID SURFACE, TYPE=SEGMENTS, ELSET=INTER, SMOOTH=.0381E-03
** 1 MM HAS BEEN ADDED TO ALL 'Y' VALUES
START, 0.0, 107.33E-03
LINE,  0.0, 100.57E-03
LINE,  -.19558E-03, 100.33E-03
LINE,  0 0, 99.33E-03
*INTERFACE, ELSET=INTER
*FRICTION
0.0, 1.0E12
**
*BOUNDARY
TOOL,   1, 2,  0.0
CENTER, 1, 2,  0.0
**
*INITIAL CONDITIONS, TYPE=TEMP
ALL, 0.0
**
*ELSET, ELSET=MODEL
CHIP, INTER
***PLOT
***DETAIL, ELSET=MODEL
***DRAW
**
*USER SUBROUTINE
      SUBROUTINE UEL(RHS,AMATRX,SVARS,ENERGY,JLINES,XVAL,NDOFEL,NRHS,
     1 NSVARS,PROPS,NPROPS,COORDS,MCRD,NNODE,U,DU,V,A,JTYPE,TIME,DTIME,
     2 KSTEP,KINC,JELEM,PARAMS,NDLOAD,JDLTYP,ADLMAG,PREDEF,NPRED,LFLAGS)
C     THIS ROUTINE BELONGS IN MAIN                        LAST UPDATE
C
C     THIS ROUTINE DEALS WITH A 4-NODED DEBONDING ELEMENT. THE INITIAL BOND
C     IS BETWEEN NODES 1 AND 2. NODES 3 AND 4 ON THE 'MASTER' SURFACE ARE
C     USED ONLY FOR CALCULATING A SURFACE AREA. IT CALLS SUBROUTINE BOND
C     TO PROVIDE THE STRESSES AND MATERIAL TANGENT STIFFNESSES FOR THE
C     BONDING MATERIAL.
C
      IMPLICIT REAL*8(A-H,O-Z)
      PARAMETER (ONE=1.0, ZERO=0.0, NTENS=2, LU=50)
      DIMENSION RHS(NDOFEL,NRHS),AMATRX(NDOFEL,NDOFEL),SVARS(1),
     1 ENERGY(6),JLINES(1),XVAL(1),PROPS(1),COORDS(MCRD,NNODE),
     2 U(NDOFEL),DU(NDOFEL),V(NDOFEL),A(NDOFEL),TIME(7),DTIME(7),
     3 PARAMS(1),JDLTYP(NDLOAD,NRHS),ADLMAG(NDLOAD,NRHS,2),
     4 PREDEF(NPRED,NNODE,2),LFLAGS(4)
     E ,STRESS(NTENS),DDSDDE(NTENS,NTENS),STRAN(NTENS)
      COMMON/CLINES/VERSN,DAT(2),TIM,NLPAGE,KLINE,KPAGE,JINP,JOUTP
C     INCLUDE 'ABQ47:[ABQ7.CMN1]CONSTS.CMN/LIST'
C
C     SAVE KOUNT,INCOLD
C     DATA KOUNT/0/ INCOLD/1/
C     KOUNT = KOUNT + 1
C     IF (KOUNT.EQ.1) THEN
C        OPEN(UNIT=LU,FILE='TEST.DBG',STATUS='NEW')
C     ENDIF
C     IF (KINC.NE.INCOLD) WRITE(LU,*) ' '
C     INCOLD = KINC
C     WRITE(LU,100) KSTEP,KINC,JELEM,KOUNT
C 100 FORMAT(' KSTEP = ',I2,'  KINC = ',I5,
C    1       '  JELEM = ',I5,'  KOUNT = ',I6)
C     WRITE(LU,*) 'U'
C     WRITE(LU,*) (U(I),I=1,NDOFEL)
C
      DO 20 JDOFEL=1,NDOFEL
      RHS(JDOFEL,1) = ZERO
      DO 20 IDOFEL=1,NDOFEL
   20 AMATRX(IDOFEL,JDOFEL) = ZERO
C
      DAM = SVARS(1)
      IF (DAM.GE.ONE) RETURN
      THICK = PROPS(7)
      ALPHA = 0.5
C
```

```fortran
C       COMPUTE ELEMENT AREA/LENGTH
C
        X2 = COORDS(1,2)
        Y2 = COORDS(2,2)
        X3 = COORDS(1,3)
        Y3 = COORDS(2,3)
        X4 = COORDS(1,4)
        Y4 = COORDS(2,4)
        ALEN23 = DSQRT((X3-X2)*(X3-X2) + (Y3-Y2)*(Y3-Y2))
        ALEN24 = DSQRT((X4-X2)*(X4-X2) + (Y4-Y2)*(Y4-Y2))
        ALEN = (ONE-ALPHA)*ALEN23 + ALPHA*ALEN24
C
C       COMPUTE STRAINS
C
        STRAN(1) = (U(4) - U(2))/THICK
        STRAN(2) = (U(3) - U(1))/THICK
C
C       COMPUTE STRESSES AND MATERIAL TANGENT STIFFS AND UPDATE DAMAGE
C
        CALL BOND(STRESS,SVARS,DDSDDE,
     2            STRAN,
     3            NDI,NSHR,NTENS,NSVARS,PROPS,NPROPS)
C
        XNN = DDSDDE(1,1)*ALEN/THICK
        XNS = DDSDDE(1,2)*ALEN/THICK
        XSN = DDSDDE(2,1)*ALEN/THICK
        XSS = DDSDDE(2,2)*ALEN/THICK
        FN  = STRESS(1)*ALEN
        FS  = STRESS(2)*ALEN
C       WRITE(LU,*) 'XNN, XNS, XSN, XSS, FN, FS'
C       WRITE(LU,*)  XNN, XNS, XSN, XSS, FN, FS
C
C       STIFFNESS MATRIX
C
        AMATRX(1,1) = XSS
        AMATRX(1,2) = XSN
        AMATRX(1,3) = -AMATRX(1,1)
        AMATRX(1,4) = -AMATRX(1,2)
        AMATRX(2,1) = XNS
        AMATRX(2,2) = XNN
        AMATRX(2,3) = -AMATRX(2,1)
        AMATRX(2,4) = -AMATRX(2,2)
        AMATRX(3,1) = -AMATRX(1,1)
        AMATRX(3,2) = -AMATRX(1,2)
        AMATRX(3,3) =  AMATRX(1,1)
        AMATRX(3,4) =  AMATRX(1,2)
        AMATRX(4,1) = -AMATRX(2,1)
        AMATRX(4,2) = -AMATRX(2,2)
        AMATRX(4,3) =  AMATRX(2,1)
        AMATRX(4,4) =  AMATRX(2,2)
C
C       RESIDUAL CONTRIBUTION
C
        RHS(1,1) = FS
        RHS(2,1) = FN
        RHS(3,1) = -RHS(1,1)
        RHS(4,1) = -RHS(2,1)
C
        RETURN
        END
C
C
C
        SUBROUTINE BOND(STRESS,STATEV,DDSDDE,
     2                  STRAN,
     3                  NDI,NSHR,NTENS,NSTATV,PROPS,NPROPS)
C
C       BONDING MATERIAL. THE BEHAVIOUR IS ELASTIC-FRACTURING IN
C       TENSION AND SHEAR AND ELASTIC IN COMPRESSION.
C
C       E1  : YOUNG'S MODULUS IN COMPRESSION AND INITIALLY IN TENSION
```

```
C      EP1 : STRAIN AT PEAK COMPRESSIVE STRESS
C      EZ1 : STRAIN AT ZERO/FRACTURED STRESS
C      E2  : SHEAR MODULUS
C      EP2 : STRAIN AT PEAK SHEAR STRESS
C      EZ2 : STRAIN AT ZERO/FRACTURED STRESS
C      STRAN(1) : DIRECT STRAIN
C      STRAN(2) : SHEAR STRAIN
C      STRESS(1) : DIRECT STRESS
C      STRESS(2) : SHEAR STRESS
C      DDSDDE(I,J) : MATERIAL TANGENT STIFFNESS = DSTRESS(I)/DSTRAN(J)
C      DAM  : DAMAGE PARAMETER
       IMPLICIT REAL*8(A-H,O-Z)
       PARAMETER (ONE=1.0, ZERO=0.0)
       DIMENSION STRESS(NTENS),STATEV(NSTATV),
     1 DDSDDE(NTENS,NTENS),
     3 STRAN(NTENS),
     4 PROPS(NPROPS)
C
       E1  = PROPS(1)
       E2  = PROPS(2)
       EP1 = PROPS(3)
       EP2 = PROPS(4)
       EZ1 = PROPS(5)
       EZ2 = PROPS(6)
       DAM = STATEV(1)
C
       DO 10 I=1,NTENS
       STRESS(I)=ZERO
       DO 10 J=1,NTENS
    10 DDSDDE(I,J)=ZERO
C
       SIGP1 = E1*EP1
       SIGP2 = E2*EP2
       EPZ1  = EZ1 - EP1
       EPZ2  = EZ2 - EP2
       SOFT1 = -SIGP1/EPZ1
       SOFT2 = -SIGP2/EPZ2
C
C      DETERMINE CURRENT DAMAGE
C
       DAM1 =       (STRAN(1)-EP1)/EPZ1
       DAM2 = (DABS(STRAN(2))-EP2)/EPZ2
       IF (DAM1.GE.DAM2) THEN
          JACT = 1
          DAMACT = DAM1
       ELSE
          JACT = 2
          DAMACT = DAM2
       ENDIF
       IF (DAM.LT.DAMACT) THEN
          DAM = DAMACT
          STATEV(1) = DAM
       ELSE
          JACT = 0
       ENDIF
       STATEV(2) = FLOAT(JACT)
C
C      IF COMPLETELY DAMAGED, WE'RE DONE
C
       IF (DAM.LT.ONE) THEN
C
C         CALCULATE CURRENT PEAK STRAIN AND CURRENT STIFFNESSES AND FORCES
C
          EP1N = EP1 + DAM*EPZ1
          EP2N = EP2 + DAM*EPZ2
          S1   = SIGP1*(ONE-DAM)/EP1N
          S2   = SIGP2*(ONE-DAM)/EP2N
          STRESS(1) = S1*STRAN(1)
          STRESS(2) = S2*STRAN(2)
C
C         CALCULATE TANGENT STIFFNESSES
C
```

```
            IF (JACT.EQ.0) THEN
C              NO DAMAGING
               DDSDDE(1,1) = S1
               DDSDDE(2,2) = S2
            ELSEIF (JACT.EQ.1) THEN
C              DAMAGING IN TENSION ONLY
               DDSDDE(1,1) = SOFT1
               DDSDDE(2,2) = S2
               DDSDDE(2,1) = -SIGP2*EZ2*STRAN(2)/(EP2N*EP2N*EPZ1)
            ELSE
C              DAMAGING IN SHEAR ONLY
               DDSDDE(1,1) = S1
               DDSDDE(2,2) = SOFT2
               DDSDDE(1,2) = -SIGP1*EZ1*STRAN(1)
     1                      /(EP1N*EP1N*DSIGN(EPZ2,STRAN(2)))
            ENDIF
         ENDIF
         IF (STRAN(1).LE.ZERO) THEN
            DDSDDE(1,1)  = E1
            STRESS(1) = E1*STRAN(1)
         ENDIF
C
         RETURN
         END
**
** STEP 1 : RAKE TOOL 10.0 DEG FROM VERTICAL
**
*STEP, NLGEOM, INC=10, CYC=10, SUBMAX, AMPLITUDE=STEP, MONOTONIC
*COUPLED TEMPERATURE-DISPLACEMENT, PTOL=150.0, TEMTOL=3.0, DELTMX=500.0
1.0E-3, 1.0E-3, 1.0E-5
*BOUNDARY
TOOL,   6,, 0.174533
CENTER, 6,, 0.0
*NODE PRINT, FREQ=0
*EL PRINT, FREQ=0
** *NODE PRINT, FREQ=1, NSET=TOOL
** RF
** *ENERGY PRINT
** *PRINT, CONTACT=YES, DEFORMATION=YES
** *NODE PRINT, FREQ=5, NSET=BOT
** U
** *EL PRINT, ELSET=INTER, FREQ=5
** S,E
** *NODE PRINT, FREQ=5
** NT
** *PLOT, FREQ=5
** *DETAIL, ELSET=MODEL
** *DISPLACED
** U, 1.0, 1
*END STEP
**
** STEP 2 : INITIAL FRICTIONLESS MOVEMENT
**
*STEP, NLGEOM, INC=1000, CYC=10, SUBMAX, AMPLITUDE=RAMP, MONOTONIC
*COUPLED TEMPERATURE-DISPLACEMENT, PTOL=750.0, TEMTOL=3.0, DELTMX=500.0
0.5E-6, 0.5E-3, 0.5E-8
*BOUNDARY
CENTER, 6,, 0.00875
*NODE PRINT, FREQ=0
*EL PRINT, FREQ=0
** *NODE PRINT, FREQ=20, NSET=TOOL
** RF
** *ENERGY PRINT
** *PRINT, CONTACT=YES, DEFORMATION=YES
** *NODE PRINT, FREQ=20, NSET=BOT
** U
** *EL PRINT, ELSET=INTER, FREQ=20
** S,E
** *EL PRINT, ELSET=BOND, FREQ=20
** SDV
** *NODE PRINT, FREQ=20
** NT
```

```
**  *PLOT, FREQ=20
**  *DETAIL, ELSET=MODEL
**  *DISPLACED
**  U, 1.0, 1
*END STEP
***** ** here's chip4rl.inp **********************
**  *HEADING, UNSYMM
**  RATE INDEP, 10 DEGREE RAKE (FROM VERTICAL)
**  SPEED = 1.75 M/S, WITH FRICTION, GRADED MESH
**  USER ELEMENT FOR AUTO RELEASE - DEBONDING ELEMENT
  WAVEFRONT MINIMIZATION,SUPPRESS
**  *RESTART, READ, STEP=2, INC=52, WRITE, FREQ=50
 
**  *USER SUBROUTINE
**        SUBROUTINE UEL(RHS,AMATRX,SVARS,ENERGY,JLINES,XVAL,NDOFEL,NRHS,
**       1 NSVARS,PROPS,NPROPS,COORDS,MCRD,NNODE,U,DU,V,A,JTYPE,TIME,DTIME,
**       2 KSTEP,KINC,JELEM,PARAMS,NDLOAD,JDLTYP,ADLMAG,PREDEF,NPRED,LFLAGS)
** C     THIS ROUTINE BELONGS IN MAIN                         LAST UPDATE
** C
** C     THIS ROUTINE DEALS WITH A 4-NODED DEBONDING ELEMENT. THE INITIAL BOND
** C     IS BETWEEN NODES 1 AND 2. NODES 3 AND 4 ON THE 'MASTER' SURFACE ARE
** C     USED ONLY FOR CALCULATING A SURFACE AREA. IT CALLS SUBROUTINE BOND
** C     TO PROVIDE THE STRESSES AND MATERIAL TANGENT STIFFNESSES FOR THE
** C     BONDING MATERIAL.
** C
**        IMPLICIT REAL*8(A-H,O-Z)
**        PARAMETER (ONE=1.0, ZERO=0.0, NTENS=2, LU=50)
**        DIMENSION RHS(NDOFEL,NRHS),AMATRX(NDOFEL,NDOFEL),SVARS(1),
**       1 ENERGY(6),JLINES(1),XVAL(1),PROPS(1),COORDS(MCRD,NNODE),
**       2 U(NDOFEL),DU(NDOFEL),V(NDOFEL),A(NDOFEL),TIME(7),DTIME(7),
**       3 PARAMS(1),JDLTYP(NDLOAD,NRHS),ADLMAG(NDLOAD,NRHS,2),
**       4 PREDEF(NPRED,NNODE,2),LFLAGS(4)
**        E ,STRESS(NTENS),DDSDDE(NTENS,NTENS),STRAN(NTENS)
** C     COMMON/CLINES/VERSN,DAT(2),TIM,NLPAGE,KLINE,KPAGE,JINP,JOUTP
** C     INCLUDE 'ABQ47:[ABQ7.CMN1]CONSTS.CMN/LIST'
** C
** C       SAVE KOUNT,INCOLD
** C       DATA KOUNT/0/ INCOLD/1/
** C       KOUNT = KOUNT + 1
** C       IF (KOUNT.EQ.1) THEN
** C         OPEN(UNIT=LU,FILE='TEST.DBG',STATUS='NEW')
** C       ENDIF
** C       IF (KINC.NE.INCOLD) WRITE(LU,*) ' '
** C       INCOLD = KINC
** C       WRITE(LU,100) KSTEP,KINC,JELEM,KOUNT
** C  100 FORMAT(' KSTEP = ',I2,'   KINC = ',I5,
** C       1      '   JELEM = ',I5,'   KOUNT = ',I6)
** C       WRITE(LU,*) 'U'
** C       WRITE(LU,*) (U(I),I=1,NDOFEL)
** C
**        DO 20 JDOFEL=1,NDOFEL
**        RHS(JDOFEL,1) = ZERO
**        DO 20 IDOFEL=1,NDOFEL
**     20 AMATRX(IDOFEL,JDOFEL) = ZERO
** C
**        DAM = SVARS(1)
**        IF (DAM.GE.ONE) RETURN
**        THICK = PROPS(7)
**        ALPHA = 0.5
** C
** C     COMPUTE ELEMENT AREA/LENGTH
** C
**        X2 = COORDS(1,2)
**        Y2 = COORDS(2,2)
**        X3 = COORDS(1,3)
**        Y3 = COORDS(2,3)
**        X4 = COORDS(1,4)
**        Y4 = COORDS(2,4)
**        ALEN23 = DSQRT((X3-X2)*(X3-X2) + (Y3-Y2)*(Y3-Y2))
**        ALEN24 = DSQRT((X4-X2)*(X4-X2) + (Y4-Y2)*(Y4-Y2))
**        ALEN = (ONE-ALPHA)*ALEN23 + ALPHA*ALEN24
** C
```

```
** C      COMPUTE STRAINS
** C
**        STRAN(1) = (U(4) - U(2))/THICK
**        STRAN(2) = (U(3) - U(1))/THICK
** C
** C      COMPUTE STRESSES AND MATERIAL TANGENT STIFFS AND UPDATE DAMAGE
** C
**        CALL BOND(STRESS,SVARS,DDSDDE,
**       2          STRAN,
**       3          NDI,NSHR,NTENS,NSVARS,PROPS,NPROPS)
** C
**        XNN = DDSDDE(1,1)*ALEN/THICK
**        XNS = DDSDDE(1,2)*ALEN/THICK
**        XSN = DDSDDE(2,1)*ALEN/THICK
**        XSS = DDSDDE(2,2)*ALEN/THICK
**        FN  = STRESS(1)*ALEN
**        FS  = STRESS(2)*ALEN
** C      WRITE(LU,*) 'XNN, XNS, XSN, XSS, FN, FS'
** C      WRITE(LU,*)  XNN, XNS, XSN, XSS, FN, FS
** C
** C      STIFFNESS MATRIX
** C
**        AMATRX(1,1) = XSS
**        AMATRX(1,2) = XSN
**        AMATRX(1,3) = -AMATRX(1,1)
**        AMATRX(1,4) = -AMATRX(1,2)
**        AMATRX(2,1) = XNS
**        AMATRX(2,2) = XNN
**        AMATRX(2,3) = -AMATRX(2,1)
**        AMATRX(2,4) = -AMATRX(2,2)
**        AMATRX(3,1) = -AMATRX(1,1)
**        AMATRX(3,2) = -AMATRX(1,2)
**        AMATRX(3,3) =  AMATRX(1,1)
**        AMATRX(3,4) =  AMATRX(1,2)
**        AMATRX(4,1) = -AMATRX(2,1)
**        AMATRX(4,2) = -AMATRX(2,2)
**        AMATRX(4,3) =  AMATRX(2,1)
**        AMATRX(4,4) =  AMATRX(2,2)
** C
** C      RESIDUAL CONTRIBUTION
** C
**        RHS(1,1) = FS
**        RHS(2,1) = FN
**        RHS(3,1) = -RHS(1,1)
**        RHS(4,1) = -RHS(2,1)
** C
**        RETURN
**        END
** C
** C
** C
**        SUBROUTINE BOND(STRESS,STATEV,DDSDDE,
**       2                STRAN,
**       3                NDI,NSHR,NTENS,NSTATV,PROPS,NPROPS)
** C
** C      BONDING MATERIAL. THE BEHAVIOUR IS ELASTIC-FRACTURING IN
** C      TENSION AND SHEAR AND ELASTIC IN COMPRESSION.
** C
** C      E1  : YOUNG'S MODULUS IN COMPRESSION AND INITIALLY IN TENSION
** C      EP1 : STRAIN AT PEAK COMPRESSIVE STRESS
** C      EZ1 : STRAIN AT ZERO/FRACTURED STRESS
** C      E2  : SHEAR MODULUS
** C      EP2 : STRAIN AT PEAK SHEAR STRESS
** C      EZ2 : STRAIN AT ZERO/FRACTURED STRESS
** C      STRAN(1) : DIRECT STRAIN
** C      STRAN(2) : SHEAR STRAIN
** C      STRESS(1) : DIRECT STRESS
** C      STRESS(2) : SHEAR STRESS
** C      DDSDDE(I,J) : MATERIAL TANGENT STIFFNESS = DSTRESS(I)/DSTRAN(J)
** C      DAM : DAMAGE PARAMETER
** C
```

```
      IMPLICIT REAL*8(A-H,O-Z)
      PARAMETER (ONE=1.0, ZERO=0.0)
      DIMENSION STRESS(NTENS),STATEV(NSTATV),
     1 DDSDDE(NTENS,NTENS),
     3 STRAN(NTENS),
     4 PROPS(NPROPS)
C
      E1  = PROPS(1)
      E2  = PROPS(2)
      EP1 = PROPS(3)
      EP2 = PROPS(4)
      EZ1 = PROPS(5)
      EZ2 = PROPS(6)
      DAM = STATEV(1)
C
      DO 10 I=1,NTENS
      STRESS(I)=ZERO
      DO 10 J=1,NTENS
   10 DDSDDE(I,J)=ZERO
C
      SIGP1 = E1*EP1
      SIGP2 = E2*EP2
      EPZ1 = EZ1 - EP1
      EPZ2 = EZ2 - EP2
      SOFT1 = -SIGP1/EPZ1
      SOFT2 = -SIGP2/EPZ2
C
C     DETERMINE CURRENT DAMAGE
C
      DAM1 =       (STRAN(1)-EP1)/EPZ1
      DAM2 = (DABS(STRAN(2))-EP2)/EPZ2
      IF (DAM1.GE.DAM2) THEN
         JACT = 1
         DAMACT = DAM1
      ELSE
         JACT = 2
         DAMACT = DAM2
      ENDIF
      IF (DAM.LT.DAMACT) THEN
         DAM = DAMACT
         STATEV(1) = DAM
      ELSE
         JACT = 0
      ENDIF
      STATEV(2) = FLOAT(JACT)
C
C     IF COMPLETELY DAMAGED, WE'RE DONE
C
      IF (DAM.LT.ONE) THEN
C
C        CALCULATE CURRENT PEAK STRAIN AND CURRENT STIFFNESSES AND FORCES
C
         EP1N = EP1 + DAM*EPZ1
         EP2N = EP2 + DAM*EPZ2
         S1   = SIGP1*(ONE-DAM)/EP1N
         S2   = SIGP2*(ONE-DAM)/EP2N
         STRESS(1) = S1*STRAN(1)
         STRESS(2) = S2*STRAN(2)
C
C        CALCULATE TANGENT STIFFNESSES
C
         IF (JACT.EQ.0) THEN
C           NO DAMAGING
            DDSDDE(1,1) = S1
            DDSDDE(2,2) = S2
         ELSEIF (JACT.EQ.1) THEN
C           DAMAGING IN TENSION ONLY
            DDSDDE(1,1) = SOFT1
            DDSDDE(2,2) = S2
            DDSDDE(2,1) = -SIGP2*EZ2*STRAN(2)/(EP2N*EP2N*EPZ1)
         ELSE
C           DAMAGING IN SHEAR ONLY
```

```
**             DDSDDE(1,1) = S1
**             DDSDDE(2,2) = SOFT2
**             DDSDDE(1,2) = -SIGP1*EZ1*STRAN(1)
**      1                  /(EP1N*EP1N*DSIGN(EPZ2,STRAN(2)))
**          ENDIF
**        ENDIF
**        IF (STRAN(1).LE.ZERO) THEN
**             DDSDDE(1,1) = E1
**             STRESS(1) = E1*STRAN(1)
**        ENDIF
** C
**        RETURN
**        END
**
** STEP 3 : CONTINUE WITH FRICTION / CHANGED FRICTION CONSTANTS
**
*STEP, NLGEOM, INC=800, CYC=10, SUBMAX, AMPLITUDE=RAMP, MONOTONIC
*COUPLED TEMPERATURE-DISPLACEMENT, PTOL=750.0, TEMTOL=3.0, DELTMX=500.0
1.0E-5, 5.5E-3, 1.0E-8
*CHANGE MATERIAL, ELSET=INTER
*FRICTION
**   oneil put the friction at .50  !! ***
** ref: Iwata, Osakada et al,"process modeling ... rigid-plastic FEM"
0.5, 40.0E12, 400.0E6
*BOUNDARY
** TOTAL ANGULAR ADVANCE OF 6 DEG
CENTER, 6,, 0.104720
*NODE PRINT, FREQ=0
*EL PRINT, FREQ=0
** *NODE PRINT, FREQ=20, NSET=TOOL
** RF
** *ENERGY PRINT
** *PRINT, CONTACT=YES, DEFORMATION=YES
** *NODE PRINT, FREQ=150
** U
** *EL PRINT, ELSET=INTER, FREQ=20
** S,E
** *EL PRINT, ELSET=BOND, FREQ=20
** SDV
** *NODE PRINT, FREQ=20
** NT
** *PLOT, FREQ=20
** *DETAIL, ELSET=MODEL
** *DISPLACED
** U, 1.0, 1
** ** some oneil output additions
*FILE FORMAT,ASCII
*NODE FILE, FREQ=100
U
NT
COORD
RF
*EL FILE, FREQ=100
S
SINV
PE
TEMP
** end of oneil output mods. ***
*END STEP
*HEADING, UNSYMM
RATE INDEP, 10 DEGREE RAKE (FROM VERTICAL)
SPEED = 1.75 M/S, FRICTION=0.5, GRADED MESH
DEBONDING ELEMENT
**WAVEFRONT MINIMIZATION,SUPPRESS
** put restart at a freq. of 1000 to write only LAST iteration
*RESTART, WRITE, FREQ=1000
**
** NODES
**
*NODE, SYSTEM=C
   1, 0.10033, 90.000
```

```
1001, 0.10033, 90.000
9001, 0.10160, 89.945
*NSET, NSET=BL
1001
*NSET, NSET=TL
9001
*NFILL, BIAS=0.8, NSET=LHS
BL, TL, 8, 1000
*NSET, NSET=LHS, GEN
1, 9001, 1000
*NCOPY, OLD SET=LHS, CHANGE NUMBER=1, SHIFT, MULTIPLE=64, NEW SET=ALL
0., 0., 0.
0., 0., 0.,   0., 0., -1.,  0.159
*NSET, NSET=ALL
LHS
*NSET, NSET=BOT, GEN
1001, 1065, 1
*NODE, NSET=MASTER
50001, 0., 0.
*NCOPY, OLD SET=MASTER, CHANGE NUMBER=1, SHIFT, MULTIPLE=64
0., 0., 0.
0., 0., 0.,   0., 0., -1.,  0.0
*NSET, NSET=CENTER, GEN
50001, 50065, 1
*NODE, NSET=TOOL
60000, 0.0, 0.10033
**
** DEFINE ELEMENTS
**
**    CHIP
**
*ELEMENT, TYPE=CPE4
1001, 1001, 1002, 2002, 2001
*ELGEN, ELSET=CHIP
1001,  64, 1, 1,   8, 1000, 1000
*SOLID SECTION, ELSET=CHIP, MAT=ST4340
*MATERIAL, NAME=ST4340
*ELASTIC
209.0E9, 0.33
*PLASTIC
** this is the "CHIP8" stress - strain curve
 800.0E6, 0.00
 850.0E6, 0.10
 800.0E6, 0.25
 750.0E6, 0.50
 700.0E6, 1.00
 700.0E6, 1.25
 700.0E6, 1.50
 700.0E6, 2.00
***RATE DEPENDENT
** 40.0, 5.0
*SPECIFIC HEAT
**J/kg -K
599.13
*DENSITY
kg/m3
7700.0
*CONDUCTIVITY
**W/m-K
43.0
***EXPANSION
** /K
**21.6E-6
*INELASTIC HEAT FRACTION
1.0
**
**    SPOKES
**
*ELEMENT, TYPE=B21, ELSET=SPOKE
50001, 50001, 1
*ELGEN, ELSET=SPOKE
50001, 65, 1, 1
```

```
*BEAM SECTION, MAT=SPOKE, ELSET=SPOKE, SECT=RECT
** WIDTH, DEPTH
1.0, 0.1
*MATERIAL, NAME=SPOKE
*ELASTIC
209.0E9, 0.33
**
**    BONDS
**
*USER ELEMENT, TYPE=U1, NODES=4, COORDINATES=2, PROP=7, VAR=2, UNSYMM
1, 2
*UEL PROPERTY, ELSET=BOND
** E1, E2, EP1, EP2, EZ1, EZ2, THICK
** WHERE  THICK*EZ1 = 2*J1C/SIGY1,    THICK*EZ2 = 2*J2C/SIGY2
**    AND  SIGY2 = SIGY1/2   AND   E2 = E1/(2*(1+NU))
** J1C = J2C = 87600 N-M/M**2 (= 500 IN-LBF/IN**2)
200.0E9, 75.2E9,  4.0E-3, 5.33E-3, 3.65, 7.30, 0.06E-3
*ELEMENT, TYPE=U1, ELSET=BOND
 1,  1, 1001, 1001, 1002
 2,  2, 1002, 1001, 1003
65, 65, 1065, 1064, 1065
*ELGEN, ELSET=BOND
2, 63, 1, 1
**
**    TOOL-CHIP INTERFACES
**
*ELEMENT, TYPE=IRS21, ELSET=INTER
60001, 1001, 1002, 60000
61001, 1001, 2001, 60000
*ELGEN, ELSET=INTER
60001, 64,    1,    1
61001,  8, 1000, 1000
** DESIGN 5 INTERFACE ELEMENT DEFINITION (UNITS - METERS)
*RIGID SURFACE, TYPE=SEGMENTS, ELSET=INTER, SMOOTH=.0762E-03
** 1 MM HAS BEEN ADDED TO ALL 'Y' VALUES
START, 0.0, 107.33E-03
LINE,  0.0, 102.91318E-03
LINE, -.46228E-03, 102.332E-03
LINE, -.46228E-03, 101.6E-03
LINE,  0.0, 100.33E-03
LINE,  0.0, 99.33E-03
*INTERFACE, ELSET=INTER
*FRICTION
0.0, 1.0E12
**
*BOUNDARY
TOOL,   1, 2,  0.0
CENTER, 1, 2,  0.0
**
*INITIAL CONDITIONS, TYPE=TEMP
ALL, 0.0
**
*ELSET, ELSET=MODEL
CHIP, INTER
***PLOT
***DETAIL, ELSET=MODEL
***DRAW
**
*USER SUBROUTINE
      SUBROUTINE UEL(RHS,AMATRX,SVARS,ENERGY,JLINES,XVAL,NDOFEL,NRHS,
     1 NSVARS,PROPS,NPROPS,COORDS,MCRD,NNODE,U,DU,V,A,JTYPE,TIME,DTIME,
     2 KSTEP,KINC,JELEM,PARAMS,NDLOAD,JDLTYP,ADLMAG,PREDEF,NPRED,LFLAGS)
C     THIS ROUTINE BELONGS IN MAIN                          LAST UPDATE
C
C     THIS ROUTINE DEALS WITH A 4-NODED DEBONDING ELEMENT. THE INITIAL BOND
C     IS BETWEEN NODES 1 AND 2. NODES 3 AND 4 ON THE 'MASTER' SURFACE ARE
C     USED ONLY FOR CALCULATING A SURFACE AREA. IT CALLS SUBROUTINE BOND
C     TO PROVIDE THE STRESSES AND MATERIAL TANGENT STIFFNESSES FOR THE
C     BONDING MATERIAL.
C
      IMPLICIT REAL*8(A-H,O-Z)
      PARAMETER (ONE=1.0, ZERO=0.0, NTENS=2, LU=50)
      DIMENSION RHS(NDOFEL,NRHS),AMATRX(NDOFEL,NDOFEL),SVARS(1),
```

```
     1 ENERGY(6),JLINES(1),XVAL(1),PROPS(1),COORDS(MCRD,NNODE),
     2 U(NDOFEL),DU(NDOFEL),V(NDOFEL),A(NDOFEL),TIME(7),DTIME(7),
     3 PARAMS(1),JDLTYP(NDLOAD,NRHS),ADLMAG(NDLOAD,NRHS,2),
     4 PREDEF(NPRED,NNODE,2),LFLAGS(4)
     E ,STRESS(NTENS),DDSDDE(NTENS,NTENS),STRAN(NTENS)
C      COMMON/CLINES/VERSN,DAT(2),TIM,NLPAGE,KLINE,KPAGE,JINP,JOUTP
C      INCLUDE 'ABQ47:[ABQ7.CMN1]CONSTS.CMN/LIST'
C
C      SAVE KOUNT,INCOLD
C      DATA KOUNT/0/ INCOLD/1/
C      KOUNT = KOUNT + 1
C      IF (KOUNT.EQ.1) THEN
C          OPEN(UNIT=LU,FILE='TEST.DBG',STATUS='NEW')
C      ENDIF
C      IF (KINC.NE.INCOLD) WRITE(LU,*) ' '
C      INCOLD = KINC
C      WRITE(LU,100) KSTEP,KINC,JELEM,KOUNT
C 100  FORMAT(' KSTEP = ',I2,'  KINC = ',I5,
C     1       ' JELEM = ',I5,'  KOUNT = ',I6)
C      WRITE(LU,*) 'U'
C      WRITE(LU,*) (U(I),I=1,NDOFEL)
C
      DO 20 JDOFEL=1,NDOFEL
      RHS(JDOFEL,1) = ZERO
      DO 20 IDOFEL=1,NDOFEL
  20  AMATRX(IDOFEL,JDOFEL) = ZERO
C
      DAM = SVARS(1)
      IF (DAM.GE.ONE) RETURN
      THICK = PROPS(7)
      ALPHA = 0.5
C
C     COMPUTE ELEMENT AREA/LENGTH
C
      X2 = COORDS(1,2)
      Y2 = COORDS(2,2)
      X3 = COORDS(1,3)
      Y3 = COORDS(2,3)
      X4 = COORDS(1,4)
      Y4 = COORDS(2,4)
      ALEN23 = DSQRT((X3-X2)*(X3-X2) + (Y3-Y2)*(Y3-Y2))
      ALEN24 = DSQRT((X4-X2)*(X4-X2) + (Y4-Y2)*(Y4-Y2))
      ALEN = (ONE-ALPHA)*ALEN23 + ALPHA*ALEN24
C
C     COMPUTE STRAINS
C
      STRAN(1) = (U(4) - U(2))/THICK
      STRAN(2) = (U(3) - U(1))/THICK
C
C     COMPUTE STRESSES AND MATERIAL TANGENT STIFFS AND UPDATE DAMAGE
C
      CALL BOND(STRESS,SVARS,DDSDDE,
     2          STRAN,
     3          NDI,NSHR,NTENS,NSVARS,PROPS,NPROPS)
C
      XNN = DDSDDE(1,1)*ALEN/THICK
      XNS = DDSDDE(1,2)*ALEN/THICK
      XSN = DDSDDE(2,1)*ALEN/THICK
      XSS = DDSDDE(2,2)*ALEN/THICK
      FN  = STRESS(1)*ALEN
      FS  = STRESS(2)*ALEN
C     WRITE(LU,*) 'XNN, XNS, XSN, XSS, FN, FS'
C     WRITE(LU,*)  XNN, XNS, XSN, XSS, FN, FS
C
C     STIFFNESS MATRIX
C
      AMATRX(1,1) = XSS
      AMATRX(1,2) = XSN
      AMATRX(1,3) = -AMATRX(1,1)
      AMATRX(1,4) = -AMATRX(1,2)
      AMATRX(2,1) = XNS
      AMATRX(2,2) = XNN
```

```
            AMATRX(2,3) = -AMATRX(2,1)
            AMATRX(2,4) = -AMATRX(2,2)
            AMATRX(3,1) = -AMATRX(1,1)
            AMATRX(3,2) = -AMATRX(1,2)
            AMATRX(3,3) =  AMATRX(1,1)
            AMATRX(3,4) =  AMATRX(1,2)
            AMATRX(4,1) = -AMATRX(2,1)
            AMATRX(4,2) = -AMATRX(2,2)
            AMATRX(4,3) =  AMATRX(2,1)
            AMATRX(4,4) =  AMATRX(2,2)
      C
      C     RESIDUAL CONTRIBUTION
      C
            RHS(1,1) =  FS
            RHS(2,1) =  FN
            RHS(3,1) = -RHS(1,1)
            RHS(4,1) = -RHS(2,1)
      C
            RETURN
            END
      C
      C
      C
            SUBROUTINE BOND(STRESS,STATEV,DDSDDE,
           2                STRAN,
           3                NDI,NSHR,NTENS,NSTATV,PROPS,NPROPS)
      C
      C     BONDING MATERIAL. THE BEHAVIOUR IS ELASTIC-FRACTURING IN
      C     TENSION AND SHEAR AND ELASTIC IN COMPRESSION.
      C
      C     E1   : YOUNG'S MODULUS IN COMPRESSION AND INITIALLY IN TENSION
      C     EP1  : STRAIN AT PEAK COMPRESSIVE STRESS
      C     EZ1  : STRAIN AT ZERO/FRACTURED STRESS
      C     E2   : SHEAR MODULUS
      C     EP2  : STRAIN AT PEAK SHEAR STRESS
      C     EZ2  : STRAIN AT ZERO/FRACTURED STRESS
      C     STRAN(1)  : DIRECT STRAIN
      C     STRAN(2)  : SHEAR STRAIN
      C     STRESS(1) : DIRECT STRESS
      C     STRESS(2) : SHEAR STRESS
      C     DDSDDE(I,J) : MATERIAL TANGENT STIFFNESS = DSTRESS(I)/DSTRAN(J)
      C     DAM  : DAMAGE PARAMETER
      C
            IMPLICIT REAL*8(A-H,O-Z)
            PARAMETER (ONE=1.0, ZERO=0.0)
            DIMENSION STRESS(NTENS),STATEV(NSTATV),
           1 DDSDDE(NTENS,NTENS),
           3 STRAN(NTENS),
           4 PROPS(NPROPS)
      C
            E1  = PROPS(1)
            E2  = PROPS(2)
            EP1 = PROPS(3)
            EP2 = PROPS(4)
            EZ1 = PROPS(5)
            EZ2 = PROPS(6)
            DAM = STATEV(1)
      C
            DO 10 I=1,NTENS
            STRESS(I)=ZERO
            DO 10 J=1,NTENS
         10 DDSDDE(I,J)=ZERO
      C
            SIGP1 = E1*EP1
            SIGP2 = E2*EP2
            EPZ1  = EZ1 - EP1
            EPZ2  = EZ2 - EP2
            SOFT1 = -SIGP1/EPZ1
            SOFT2 = -SIGP2/EPZ2
      C
      C     DETERMINE CURRENT DAMAGE
      C
```

```
      DAM1 =      (STRAN(1)-EP1)/EPZ1
      DAM2 = (DABS(STRAN(2))-EP2)/EPZ2
      IF (DAM1.GE.DAM2) THEN
         JACT = 1
         DAMACT = DAM1
      ELSE
         JACT = 2
         DAMACT = DAM2
      ENDIF
      IF (DAM.LT.DAMACT) THEN
         DAM = DAMACT
         STATEV(1) = DAM
      ELSE
         JACT = 0
      ENDIF
      STATEV(2) = FLOAT(JACT)
C
C     IF COMPLETELY DAMAGED, WE'RE DONE
C
      IF (DAM.LT.ONE) THEN
C
C     CALCULATE CURRENT PEAK STRAIN AND CURRENT STIFFNESSES AND FORCES
C
         EP1N = EP1 + DAM*EPZ1
         EP2N = EP2 + DAM*EPZ2
         S1   = SIGP1*(ONE-DAM)/EP1N
         S2   = SIGP2*(ONE-DAM)/EP2N
         STRESS(1) = S1*STRAN(1)
         STRESS(2) = S2*STRAN(2)
C
C     CALCULATE TANGENT STIFFNESSES
C
         IF (JACT.EQ.0) THEN
C           NO DAMAGING
            DDSDDE(1,1) = S1
            DDSDDE(2,2) = S2
         ELSEIF (JACT.EQ.1) THEN
C           DAMAGING IN TENSION ONLY
            DDSDDE(1,1) = SOFT1
            DDSDDE(2,2) = S2
            DDSDDE(2,1) = -SIGP2*EZ2*STRAN(2)/(EP2N*EP2N*EPZ1)
         ELSE
C           DAMAGING IN SHEAR ONLY
            DDSDDE(1,1) = S1
            DDSDDE(2,2) = SOFT2
            DDSDDE(1,2) = -SIGP1*EZ1*STRAN(1)
     1                    /(EP1N*EP1N*DSIGN(EPZ2,STRAN(2)))
         ENDIF
      ENDIF
      IF (STRAN(1).LE.ZERO) THEN
         DDSDDE(1,1) = E1
         STRESS(1) = E1*STRAN(1)
      ENDIF
C
      RETURN
      END
**
** STEP 1 : RAKE TOOL 10.0 DEG FROM VERTICAL
**
*STEP, NLGEOM, INC=10, CYC=10, SUBMAX, AMPLITUDE=STEP, MONOTONIC
*COUPLED TEMPERATURE-DISPLACEMENT, PTOL=150.0, TEMTOL=3.0, DELTMX=500.0
1.0E-3, 1.0E-3, 1.0E-5
*BOUNDARY
TOOL,   6,, 0.174533
CENTER, 6,, 0.0
*NODE PRINT, FREQ=0
*EL PRINT, FREQ=0
** *NODE PRINT, FREQ=1, NSET=TOOL
** RF
** *ENERGY PRINT
** *PRINT, CONTACT=YES, DEFORMATION=YES
** *NODE PRINT, FREQ=5, NSET=BOT
```

```
**  U
** *EL PRINT, ELSET=INTER, FREQ=5
**  S,E
** *NODE PRINT, FREQ=5
**  NT
** *PLOT, FREQ=5
** *DETAIL, ELSET=MODEL
** *DISPLACED
**  U, 1.0, 1
*END STEP
**
** STEP 2 : INITIAL FRICTIONLESS MOVEMENT
**
*STEP, NLGEOM, INC=1000, CYC=10, SUBMAX, AMPLITUDE=RAMP, MONOTONIC
*COUPLED TEMPERATURE-DISPLACEMENT, PTOL=750.0, TEMTOL=3.0, DELTMX=500.0
0.5E-6, 0.5E-3, 0.5E-8
*BOUNDARY
CENTER, 6,, 0.00875
*NODE PRINT, FREQ=0
*EL PRINT, FREQ=0
** *NODE PRINT, FREQ=20, NSET=TOOL
**  RF
** *ENERGY PRINT
** *PRINT, CONTACT=YES, DEFORMATION=YES
** *NODE PRINT, FREQ=20, NSET=BOT
**  U
** *EL PRINT, ELSET=INTER, FREQ=20
**  S,E
** *EL PRINT, ELSET=BOND, FREQ=20
**  SDV
** *NODE PRINT, FREQ=20
**  NT
** *PLOT, FREQ=20
** *DETAIL, ELSET=MODEL
** *DISPLACED
**  U, 1.0, 1
*END STEP
*********** here's chip4rl.inp ********************
** *HEADING, UNSYMM
** RATE INDEP, 10 DEGREE RAKE (FROM VERTICAL)
** SPEED = 1.75 M/S, WITH FRICTION, GRADED MESH
** USER ELEMENT FOR AUTO RELEASE - DEBONDING ELEMENT
 WAVEFRONT MINIMIZATION,SUPPRESS
** *RESTART, READ, STEP=2, INC=52, WRITE, FREQ=50
 
** *USER SUBROUTINE
**         SUBROUTINE UEL(RHS,AMATRX,SVARS,ENERGY,JLINES,XVAL,NDOFEL,NRHS,
**      1 NSVARS,PROPS,NPROPS,COORDS,MCRD,NNODE,U,DU,V,A,JTYPE,TIME,DTIME,
**      2 KSTEP,KINC,JELEM,PARAMS,NDLOAD,JDLTYP,ADLMAG,PREDEF,NPRED,LFLAGS)
** C    THIS ROUTINE BELONGS IN MAIN                          LAST UPDATE
** C
** C    THIS ROUTINE DEALS WITH A 4-NODED DEBONDING ELEMENT. THE INITIAL BOND
** C    IS BETWEEN NODES 1 AND 2. NODES 3 AND 4 ON THE 'MASTER' SURFACE ARE
** C    USED ONLY FOR CALCULATING A SURFACE AREA. IT CALLS SUBROUTINE BOND
** C    TO PROVIDE THE STRESSES AND MATERIAL TANGENT STIFFNESSES FOR THE
** C    BONDING MATERIAL.
** C
**         IMPLICIT REAL*8(A-H,O-Z)
**         PARAMETER (ONE=1.0, ZERO=0.0, NTENS=2, LU=50)
**         DIMENSION RHS(NDOFEL,NRHS),AMATRX(NDOFEL,NDOFEL),SVARS(1),
**      1 ENERGY(6),JLINES(1),XVAL(1),PROPS(1),COORDS(MCRD,NNODE),
**      2 U(NDOFEL),DU(NDOFEL),V(NDOFEL),A(NDOFEL),TIME(7),DTIME(7),
**      3 PARAMS(1),JDLTYP(NDLOAD,NRHS),ADLMAG(NDLOAD,NRHS,2),
**      4 PREDEF(NPRED,NNODE,2),LFLAGS(4)
**      E ,STRESS(NTENS),DDSDDE(NTENS,NTENS),STRAN(NTENS)
** C      COMMON/CLINES/VERSN,DAT(2),TIM,NLPAGE,KLINE,KPAGE,JINP,JOUTP
** C      INCLUDE 'ABQ47:[ABQ7.CMN1]CONSTS.CMN/LIST'
** C
** C      SAVE KOUNT,INCOLD
** C.     DATA KOUNT/0/ INCOLD/1/
** C      KOUNT = KOUNT + 1
** C      IF (KOUNT.EQ.1) THEN
```

```
** C        OPEN(UNIT=LU,FILE='TEST.DBG',STATUS='NEW')
** C      ENDIF
** C      IF (KINC.NE.INCOLD) WRITE(LU,*) ' '
** C      INCOLD = KINC
** C      WRITE(LU,100) KSTEP,KINC,JELEM,KOUNT
** C 100 FORMAT(' KSTEP = ',I2,'  KINC = ',I5,
** C     1       '  JELEM = ',I5,'  KOUNT = ',I6)
** C      WRITE(LU,*) 'U'
** C      WRITE(LU,*) (U(I),I=1,NDOFEL)
** C
**        DO 20 JDOFEL=1,NDOFEL
**        RHS(JDOFEL,1) = ZERO
**        DO 20 IDOFEL=1,NDOFEL
**     20 AMATRX(IDOFEL,JDOFEL) = ZERO
** C
**        DAM = SVARS(1)
**        IF (DAM.GE.ONE) RETURN
**        THICK = PROPS(7)
**        ALPHA = 0.5
** C
** C      COMPUTE ELEMENT AREA/LENGTH
** C
**        X2 = COORDS(1,2)
**        Y2 = COORDS(2,2)
**        X3 = COORDS(1,3)
**        Y3 = COORDS(2,3)
**        X4 = COORDS(1,4)
**        Y4 = COORDS(2,4)
**        ALEN23 = DSQRT((X3-X2)*(X3-X2) + (Y3-Y2)*(Y3-Y2))
**        ALEN24 = DSQRT((X4-X2)*(X4-X2) + (Y4-Y2)*(Y4-Y2))
**        ALEN = (ONE-ALPHA)*ALEN23 + ALPHA*ALEN24
** C
** C      COMPUTE STRAINS
** C
**        STRAN(1) = (U(4) - U(2))/THICK
**        STRAN(2) = (U(3) - U(1))/THICK
** C
** C      COMPUTE STRESSES AND MATERIAL TANGENT STIFFS AND UPDATE DAMAGE
** C
**        CALL BOND(STRESS,SVARS,DDSDDE,
**     2            STRAN,
**     3            NDI,NSHR,NTENS,NSVARS,PROPS,NPROPS)
** C
**        XNN = DDSDDE(1,1)*ALEN/THICK
**        XNS = DDSDDE(1,2)*ALEN/THICK
**        XSN = DDSDDE(2,1)*ALEN/THICK
**        XSS = DDSDDE(2,2)*ALEN/THICK
**        FN  = STRESS(1)*ALEN
**        FS  = STRESS(2)*ALEN
** C      WRITE(LU,*) 'XNN, XNS, XSN, XSS, FN, FS'
** C      WRITE(LU,*)  XNN, XNS, XSN, XSS, FN, FS
** C
** C      STIFFNESS MATRIX
** C
**        AMATRX(1,1) = XSS
**        AMATRX(1,2) = XSN
**        AMATRX(1,3) = -AMATRX(1,1)
**        AMATRX(1,4) = -AMATRX(1,2)
**        AMATRX(2,1) = XNS
**        AMATRX(2,2) = XNN
**        AMATRX(2,3) = -AMATRX(2,1)
**        AMATRX(2,4) = -AMATRX(2,2)
**        AMATRX(3,1) = -AMATRX(1,1)
**        AMATRX(3,2) = -AMATRX(1,2)
**        AMATRX(3,3) =  AMATRX(1,1)
**        AMATRX(3,4) =  AMATRX(1,2)
**        AMATRX(4,1) = -AMATRX(2,1)
**        AMATRX(4,2) = -AMATRX(2,2)
**        AMATRX(4,3) =  AMATRX(2,1)
**        AMATRX(4,4) =  AMATRX(2,2)
** C
** C      RESIDUAL CONTRIBUTION
```

```
 C
       RHS(1,1) = FS
       RHS(2,1) = FN
       RHS(3,1) = -RHS(1,1)
       RHS(4,1) = -RHS(2,1)
 C
       RETURN
       END
 C
 C
 C
       SUBROUTINE BOND(STRESS,STATEV,DDSDDE,
      2                STRAN,
      3                NDI,NSHR,NTENS,NSTATV,PROPS,NPROPS)
 C
 C   BONDING MATERIAL. THE BEHAVIOUR IS ELASTIC-FRACTURING IN
 C   TENSION AND SHEAR AND ELASTIC IN COMPRESSION.
 C
 C   E1   : YOUNG'S MODULUS IN COMPRESSION AND INITIALLY IN TENSION
 C   EP1  : STRAIN AT PEAK COMPRESSIVE STRESS
 C   EZ1  : STRAIN AT ZERO/FRACTURED STRESS
 C   E2   : SHEAR MODULUS
 C   EP2  : STRAIN AT PEAK SHEAR STRESS
 C   EZ2  : STRAIN AT ZERO/FRACTURED STRESS
 C   STRAN(1) : DIRECT STRAIN
 C   STRAN(2) : SHEAR STRAIN
 C   STRESS(1) : DIRECT STRESS
 C   STRESS(2) : SHEAR STRESS
 C   DDSDDE(I,J) : MATERIAL TANGENT STIFFNESS = DSTRESS(I)/DSTRAN(J)
 C   DAM  : DAMAGE PARAMETER
 C
       IMPLICIT REAL*8(A-H,O-Z)
       PARAMETER (ONE=1.0, ZERO=0.0)
       DIMENSION STRESS(NTENS),STATEV(NSTATV),
      1 DDSDDE(NTENS,NTENS),
      3 STRAN(NTENS),
      4 PROPS(NPROPS)
 C
       E1  = PROPS(1)
       E2  = PROPS(2)
       EP1 = PROPS(3)
       EP2 = PROPS(4)
       EZ1 = PROPS(5)
       EZ2 = PROPS(6)
       DAM = STATEV(1)
 C
       DO 10 I=1,NTENS
       STRESS(I)=ZERO
       DO 10 J=1,NTENS
    10 DDSDDE(I,J)=ZERO
 C
       SIGP1 = E1*EP1
       SIGP2 = E2*EP2
       EPZ1 = EZ1 - EP1
       EPZ2 = EZ2 - EP2
       SOFT1 = -SIGP1/EPZ1
       SOFT2 = -SIGP2/EPZ2
 C
 C   DETERMINE CURRENT DAMAGE
 C
       DAM1 =      (STRAN(1)-EP1)/EPZ1
       DAM2 = (DABS(STRAN(2))-EP2)/EPZ2
       IF (DAM1.GE.DAM2) THEN
          JACT = 1
          DAMACT = DAM1
       ELSE
          JACT = 2
          DAMACT = DAM2
       ENDIF
       IF (DAM.LT.DAMACT) THEN
          DAM = DAMACT
```

```
**              STATEV(1) = DAM
**          ELSE
**              JACT = 0
**          ENDIF
**          STATEV(2) = FLOAT(JACT)
** C
** C      IF COMPLETELY DAMAGED, WE'RE DONE
** C
**          IF (DAM.LT.ONE) THEN
** C
** C          CALCULATE CURRENT PEAK STRAIN AND CURRENT STIFFNESSES AND FORCES
** C
**              EP1N = EP1 + DAM*EPZ1
**              EP2N = EP2 + DAM*EPZ2
**              S1   = SIGP1*(ONE-DAM)/EP1N
**              S2   = SIGP2*(ONE-DAM)/EP2N
**              STRESS(1) = S1*STRAN(1)
**              STRESS(2) = S2*STRAN(2)
** C
** C          CALCULATE TANGENT STIFFNESSES
** C
**              IF (JACT.EQ.0) THEN
** C·                NO DAMAGING
**                  DDSDDE(1,1) = S1
**                  DDSDDE(2,2) = S2
**              ELSEIF (JACT.EQ.1) THEN
** C                DAMAGING IN TENSION ONLY
**                  DDSDDE(1,1) = SOFT1
**                  DDSDDE(2,2) = S2
**                  DDSDDE(2,1) = -SIGP2*EZ2*STRAN(2)/(EP2N*EP2N*EPZ1)
**              ELSE
** C                DAMAGING IN SHEAR ONLY
**                  DDSDDE(1,1) = S1
**                  DDSDDE(2,2) = SOFT2
**                  DDSDDE(1,2) = -SIGP1*EZ1*STRAN(1)
**       +                       /(EP1N*EP1N*DSIGN(EPZ2,STRAN(2)))
**              ENDIF
**          ENDIF
**          IF (STRAN(1).LE.ZERO) THEN
**              DDSDDE(1,1) = E1
**              STRESS(1) = E1*STRAN(1)
**          ENDIF
** C
**          RETURN
**          END
**
** STEP 3 : CONTINUE WITH FRICTION / CHANGED FRICTION CONSTANTS
**
*STEP, NLGEOM, INC=800, CYC=10, SUBMAX, AMPLITUDE=RAMP, MONOTONIC
*COUPLED TEMPERATURE-DISPLACEMENT, PTOL=750.0, TEMTOL=3.0, DELTMX=500.0
1.0E-5, 5.5E-3, 1.0E-8
*CHANGE MATERIAL, ELSET=INTER
*FRICTION
**   oneil put the friction at .50   !! ***
** ref: Iwata, Osakada et al,"process modeling ... rigid-plastic FEM"
0.1, 40.0E12, 400.0E6
*BOUNDARY
** TOTAL ANGULAR ADVANCE OF 6 DEG
CENTER, 6,, 0.104720
*NODE PRINT, FREQ=0
*EL PRINT, FREQ=0
** *NODE PRINT, FREQ=20, NSET=TOOL
** RF
** *ENERGY PRINT
** *PRINT, CONTACT=YES, DEFORMATION=YES
** *NODE PRINT, FREQ=150
** U
** *EL PRINT, ELSET=INTER, FREQ=20
** S,E
```

```
** *EL PRINT, ELSET=BOND, FREQ=20
** SDV
** *NODE PRINT, FREQ=20
** NT
** *PLOT, FREQ=20
** *DETAIL, ELSET=MODEL
** *DISPLACED
** U, 1.0, 1
** ** some oneil output additions
*FILE FORMAT,ASCII
*NODE FILE, FREQ=100
U
NT
COORD
RF
*EL FILE, FREQ=100
S
SINV
PE
TEMP
** end of oneil output mods. ***
*END STEP
```

What is claimed is:

1. A method of designing a cutting tool based on a simulated cutting operation characterized by linear and non-linear physical phenomenon defining the cutting operation of a tool on a workpiece, comprising the steps of:
  representing said linear phenomenon with a modifiable linear model which simulates said linear phenomenon in response to value assignments for modifiable input parameters;
  representing said non-linear phenomenon with a modifiable non-linear model which simulates said non-linear phenomenon in response to value assignments for modifiable input parameters;
  exercising said linear model to derive the simulation of said linear phenomenon, and exercising said non-linear model to derive the simulation of said non-linear phenomenon,
  wherein said models predict a response of said tool and simulate a chip-flow phenomenon;
  evaluating said simulations with an adaptive judgment base in a dynamic learning environment;
  integrating said simulations and evaluation into said learning environment; and
  continuously modifying said input parameters in accordance with said evaluation until an acceptable evaluation corresponding to an optimized tool design which generates a desired chip-flow is achieved.

2. The method as recited in claim 1 wherein
said non-linear model incorporates a representation of a fracture mechanism describing a chip separation phenomenon.

3. The method as recited in claim 2 wherein
said non-linear model incorporates a representation of a heat generating mechanism describing a thermal coupling phenomenon.

4. The method as recited in claim 3 wherein
said non-linear model incorporates a representation of a shear localization mechanism describing a shearing phenomenon.

5. The method as recited in claim 2 wherein
said fracture mechanism defines a release of said chip from the workpiece and is represented by a debonding finite element in said non-linear model.

6. The method as recited in claim 3 wherein
said heat-generating mechanism represents permanent deformation of said chip, fracture of said chip from said workpiece, and sliding of said chip with friction along a contact face of said cutting tool.

7. The method as recited in claim 6 further includes the step of:
  modeling said permanent deformation by representing in the non-linear model that a fraction of heat generated by said deformation is introduced into said deforming chip;
  modeling said fracture by representing in the non-linear model that a fraction of heat liberated by said debonding element upon release from said workpiece is introduced into said chip; and
  modeling said chip sliding by representing in the non-linear model that a selected fraction of heat which is generated by said sliding is introduced into said chip while the remaining fraction is introduced into said tool.

8. The method as recited in claim 4 wherein
said heat localization mechanism represents a shear strain discontinuity in a region of said workpiece and is represented by shear discontinuity finite elements in said non-linear model.

9. The method as recited in claim 8 further includes the steps of:

selecting said shear discontinuity finite elements so as to properly describe said shear localization mechanism;

discretizing said discontinuity elements; and modifying material property-related parameters in said non-linear to be temperature-dependent.

10. The method as recited in claim 1 wherein said models mathematically relate an input vector of tool parameters to an output vector of performance indices together constituting said tool response, and mathematically relate an input vector of chip-flow parameters to an output vector of performance indices together constituting said chip-flow simulation.

11. The method as recited in claim 10 wherein the step of performing an evaluation further includes the steps of:

applying said performance indices to an adaptive set of rules to render judgments; and accessing cutting information from an updatable database, wherein said database includes machining parameters, results of previous cutting operations, and material properties.

12. The method as recited in claim 11 includes the step of manufacturing a cutting tool based on said optimal tool design.

13. A method of designing a cutting tool, comprising the steps of:

providing a modifiable finite element tool model which predicts a response of a tool during a simulated cutting operation on a workpiece, wherein said tool model has an input tool vector of adjustable tool parameters;

providing a modifiable finite element chip-flow model which simulates a chip-flow phenomenon occurring during said cutting operation, wherein said chip-flow model has an input chip-flow vector of adjustable chip-flow parameters;

deriving the predicted response of said tool by exercising said tool model with said input tool vector, and deriving the simulation of said chip-flow phenomenon by exercising said chip-flow model with said input chip-flow vector;

performing an evaluation of the predicted tool response and the chip-flow simulation;

based on said evaluation, continuously adjusting the input tool vectors and the input chip-flow vector, and continuously modifying the tool model and the chip-flow model until said response and simulation converge to a desired result corresponding to an optimal tool design, wherein said tool model mathematically relates said input vector of tool parameters to an output vector of performance indices together constituting said tool response, and said chip-flow model mathematically relates said input vector of chip-flow parameters to an output vector of performance indices together constituting said simulation;

applying said performance indices to an adaptive set of rules to render judgments; and accessing cutting information from an updatable database, wherein said database includes results of previous cutting operations.

14. The method as recited in claim 13 wherein said chip-flow model incorporates a representation of a fracture mechanism describing a chip separation phenomenon.

15. The method as recited in claim 14 wherein said chip-flow model incorporates a representation of a heat generating mechanism describing a thermal coupling phenomenon.

16. The method as recited in claim 15 wherein said chip-flow model incorporates a representation of a shear localization mechanism describing a shearing phenomenon.

17. The method as recited in claim 14 wherein said fracture mechanism defines a release of said chip from the workpiece and is represented by a debonding finite element in said chip-flow model.

18. The method as recited in claim 15 wherein said heat-generating mechanism represents permanent deformation of said chip, fracture of said chip from said workpiece, and sliding of said chip with friction along a contact face of said cutting tool.

19. The method as recited in claim 18 further includes the step of:

modeling said permanent deformation by representing in the chip-flow model that a fraction of heat generated by said deformation is introduced into said deforming chip;

modeling said fracture by representing in the chip-flow model that a fraction of heat liberated by said debonding element upon release from said workpiece is introduced into said chip; and modeling said chip sliding by representing in the chip-flow model that a selected fraction of heat which is generated by said sliding is introduced into said chip while the remaining fraction is introduced into said tool.

20. The method as recited in claim 16 wherein said heat localization mechanism represents a shear strain discontinuity in a region of said workpiece and is represented by shear discontinuity finite elements in said chip-flow model.

21. The method as recited in claim 20 further includes the steps of:

selecting said shear discontinuity finite elements so as to properly describe said shear localization mechanism;

discretizing said discontinuity elements; and modifying material property-related parameters in said chip-flow to be temperature-dependent.

22. The method as recited in claim 13 includes the step of manufacturing a cutting tool based on said optimal tool design.

23. A method of designing a cutting tool, comprising the steps of:

creating a finite element mesh from a tool design;

constructing from said finite element mesh a finite element tool model which predicts a response of said tool during a simulated cutting operation on a workpiece;

wherein said tool model mathematically relates a plurality of adjustable tool parameters to a plurality of performance indices together constituting said tool response;

constructing a non-linear finite element chip-flow model which simulates a chip-flow phenomenon occurring during said cutting operation;

wherein said chip-flow model mathematically relates a plurality of adjustable chip-flow parameters to a plurality of performance indices together constituting said simulation;

said chip-flow model incorporating representations of a fracture mechanism describing a chip separation phenomenon, a heat-generating mechanism describing a thermal coupling phenomenon, and a shear localization mechanism describing a shearing phenomenon, wherein said phenomena occur during said cutting operation;

(a) deriving the predicted response of said tool by exercising said tool model with said tool parameters, and deriving the simulation of said chip-flow phenomenon by exercising said chip-flow model with said chip-flow parameters;

(b) evaluating the predicted tool response and the chip-flow simulation by applying said performance indices to an adaptive set of rules embodying predetermined acceptability criteria, whereby said rules generate a correlation measure between said indices and said criteria;

(c) said evaluating step including accessing cutting information from an updatable database which includes results of past cutting operations;

(d) rendering judgments based on said correlation measure for assigning acceptability levels to said performance indices;

(e) providing a recommendation embodying said judgments;

(f) modifying said rules in accordance with said recommendation;

(g) adjusting said tool parameters and said chip-flow parameters in accordance with said recommendation to generate a tool design;

(h) updating said database with information representing the predicted response of said tool and the simulation of said chip formation process; and repeating steps (a) through (h) using said generated tool design until optimal correlation measures are achieved.

24. The method as recited in claim 23 wherein the step of deriving the simulation of said chip formation process includes the step of:

performing an explicit time integration analysis.

25. The method as recited in claim 23 wherein the step of deriving the simulation of said chip formation process includes the step of:

performing an implicit time integration analysis.

26. The method as recited in claim 23 includes the steps of:

storing parameters from the derived response of said tool and the simulation of said chip formation process in said database.

27. The method as recited in claim 26 includes the steps of:

interactively viewing an animated rendering of said cutting process and concurrently monitoring the performance indices of said tool response and chip-flow simulation.

28. The method as recited in claim 23 includes the steps of:

prior to constructing said cutting tool model and said chip-flow model, producing line drawings of said tool for visual inspection using computer-aided designing.

29. The method as recited in claim 23 wherein said fracture mechanism defines a release of said chip from the workpiece and is represented by a debonding finite element in said chip-flow model.

30. The method as recited in claim 29 wherein said heat-generating mechanism represents permanent deformation of said chip, fracture of said chip from said workpiece, and sliding of said chip with friction along a contact face of said cutting tool.

31. The method as recited in claim 30 further includes the step of:

modeling said permanent deformation by representing in the chip-flow model that a fraction of heat generated by said deformation is introduced into said deforming chip;

modeling said fracture by representing in the chip-flow model that a fraction of heat liberated by said debonding element upon release from said workpiece is introduced into said chip; and modeling said chip sliding by representing in the chip-flow model that a selected fraction of heat which is generated by said sliding is introduced into said chip while the remaining fraction is introduced into said tool.

32. The method as recited in claim 23 wherein said shear localization mechanism represents a shear strain discontinuity in a region of said workpiece and is represented by shear discontinuity finite elements in said chip-flow model.

33. The method as recited in claim 32 further includes the steps of:

selecting said shear discontinuity finite elements so as to properly describe said shear localization mechanism;

discretizing said discontinuity elements; and modifying material property-related parameters in said chip-flow model to be temperature-dependent.

34. The method as recited in claim 23 further includes the step of:

constructing a cutting tool based on said optimal tool design in a computer-aided manufacturing operation.

35. The method as recited in claim 34 includes the steps of:

producing a punch and die combination in accordance with said optimal tool design;

pressing a powder material to form a green body using said punch and die combination;

densifying said green body; and grinding and then coating said densified body to produce said cutting tool.

36. The method as recited in claim 23 further includes the step of:

modifying said tool model and said chip-flow model.

37. A method of manufacturing a cutting tool, comprising the steps of:

performing a tool study based on a tool design, comprising the steps of:

creating a finite element mesh from said tool design;

constructing from said finite element mesh a finite element tool model which predicts a response of said tool during a simulated cutting operation on a workpiece;

wherein said tool model mathematically relates a plurality of adjustable tool parameters to a plurality of performance indices together constituting said tool response;

constructing a non-linear finite element chip-flow model which simulates a chip-flow phenomenon occurring during said cutting operation;

wherein said chip-flow model mathematically relates a plurality of adjustable chip flow parameters to a plurality of performance indices together constituting said simulation;

said chip-flow model incorporating representations of a fracture mechanism describing a chip separation phenomenon, a heat-generating mechanism describing a thermal coupling phenomenon, and a shear localization mechanism describing a shearing phenomenon, wherein said phenomena occur during said cutting operation;

deriving the predicted response of said tool by exercising said tool model with said tool parameters, and deriving the simulation of said chip-flow phenomenon by exercising said chip-flow model with said chip-flow parameters;

evaluating the predicted tool response and the chip-flow simulation by applying said performance indices to an adaptive set of rules embodying predetermined acceptability criteria, whereby said rules generate correlation measures between said indices and said criteria;

said evaluating step including accessing cutting information from an updatable database which includes results of past cutting operations;

rendering judgments based on said correlation measure for assigning acceptability levels to said performance indices;

providing a recommendation embodying said judgments;

modifying said rules in accordance with said recommendation;

adjusting said tool parameters and said chip-flow parameters in accordance with said recommendation, wherein said parameter adjustments generate a new tool design;

modifying said tool model and said chip-flow model in accordance with said recommendation; and updating said database with information representing the predicted response of said tool and the simulation of said chip formation process;

repeating the step of performing a tool study using said generated tool design until optimal correlation measures are achieved; and constructing a cutting tool based on a tool design having said optimal correlation measures.

38. A system for designing a cutting tool based on a simulated cutting operation characterized by linear and non-linear physical phenomenon defining said cutting operation, wherein said linear phenomenon is represented by a modifiable linear model which simulates said linear phenomenon in response to modifiable input parameters, comprising:

model means for representing said non-linear phenomenon with a modifiable non-linear model which simulates said non-linear phenomenon in response to modifiable input parameters;

means for exercising said linear model to derive the simulation of said linear phenomenon, and for exercising said non-linear model to derive the simulation of said non-linear phenomenon;

wherein said model means and said exercising means predict a response of said tool and simulate a chip-flow phenomenon;

means for evaluating said simulations with an adaptive judgment base in a dynamic learning environment;

means for integrating said simulations and evaluation into said learning environment; and means responsive to said evaluation for continuously modifying said input parameters until an acceptable evaluation corresponding to an optimized tool design which generates a desired chip-flow is achieved.

39. The system as recited in claim 38 wherein said non-linear model incorporates a representation of a fracture mechanism describing a chip separation phenomenon.

40. The system as recited in claim 39 wherein said non-linear model incorporates a representation of a heat generating mechanism describing a thermal coupling phenomenon.

41. The system as recited in claim 40 wherein said non-linear model incorporates a representation of a shear localization mechanism describing a shearing phenomenon.

42. The system as recited in claim 39 wherein said fracture mechanism defines a release of said chip from the workpiece and is represented by a debonding finite element in said non-linear model.

43. The system as recited in claim 40 wherein said heat-generating mechanism represents permanent deformation of said chip, fracture of said chip from said workpiece, and sliding of said chip with friction along a contact face of said cutting tool.

44. The system as recited in claim 43 further comprises:

means for modeling said permanent deformation by representing in the non-linear model that a fraction of heat generated by said deformation is introduced into said deforming chip;

means for modeling said fracture by representing in the non-linear model that a fraction of heat liberated by said debonding element upon release from said workpiece is introduced into said chip; and means for modeling said chip sliding by representing in the non-linear model that a selected fraction of heat which is generated by said sliding is introduced into said chip while the remaining fraction is introduced into said tool.

45. The system as recited in claim 41 wherein said heat localization mechanism represents a shear strain discontinuity in a region of said workpiece and is represented by shear discontinuity finite elements in said non-linear model.

46. The system as recited in claim 45 further comprises:

means for selecting said shear discontinuity finite elements so as to properly describe said shear localization mechanism;

means for discretizing said discontinuity elements; and means for modifying material property-related parameters in said non-linear to be temperature-dependent.

47. The system as recited in claim 38 wherein said tool model mathematically relates said input vector of tool parameters to an output vector of performance indices together constituting said tool response; and said non-linear model mathematically relates said input vector of non-linear parameters to an output vector of performance indices together constituting said chip-flow simulation.

48. The system as recited in claim 47 wherein said evaluation means comprises:

means for applying said performance indices to an adaptive set of rules to render judgments; and means for accessing cutting information from an updatable database, wherein said database includes results of previous cutting operations.

49. The system as recited in claim 48 further includes:
means for manufacturing a cutting tool based on said optimal tool design.

50. A system for designing a cutting tool, comprising:
means for providing a modifiable cutting tool finite element simulation model which predicts a response of a tool during a simulated cutting operation on a workpiece, wherein said cutting tool model has an input tool vector of adjustable tool parameters;
means for providing a modifiable finite element chip-flow model which simulates a chip-flow phenomenon occurring during said cutting operation, wherein said chip-flow model has an input chip-flow vector of adjustable chip-flow parameters;
first analysis means responsive to said input tool vector for exercising said tool model and for outputting the predicted tool response;
second analysis means responsive to said input chip-flow vector for exercising said chip-flow model and for outputting the chip-flow simulation;
optimization means coupled to said first and second analysis means for converging said predicted tool response and said chip-flow simulation to a desired result corresponding to an optimal tool design;
said optimization means including artificial intelligence means for evaluating said predicted tool response and said chip-flow simulation, and for providing a recommendation; and
said optimization means further including means coupled to said first and second analysis means and responsive to said recommendation for adjusting the input tool vector and the input chip-flow vector, and for modifying said tool model and said chip-flow model, thereby prompting said first and second analysis means to reexercise said tool and chip-flow models, respectively.

51. The system as recited in claim 50 wherein said artificial intelligence means includes
rule means for comparing said predicted tool response and said chip-flow simulation with predetermined acceptability criteria; and
means responsive to said comparisons for rendering judgments embodied in said recommendation.

52. The system as recited in claim 51 further comprising:
a computer-aided manufacturing subsystem operatively coupled to said optimization means for producing a tool based on said optimal tool design.

53. A system for designing a cutting tool, comprising:
means for creating a finite element mesh from a tool design;
means responsive to said finite element mesh for providing a finite element tool model which predicts a response of said tool during a simulated cutting operation on a workpiece;
wherein said tool model mathematically relates an input vector of adjustable tool parameters to an output vector of performance indices together constituting said tool response;
means for providing a non-linear finite element chip-flow model which simulates a chip-flow phenomenon occurring during said cutting operation;
wherein said chip-flow model mathematically relates an input vector of adjustable chip flow parameters to an output vector of performance indices together constituting said chip-flow simulation;
said chip-flow model incorporating representations of a fracture mechanism describing a chip separation phenomenon, a heat-generating mechanism describing a thermal coupling phenomenon, and a shear localization mechanism describing a shearing phenomenon, wherein said phenomena occur during said cutting operation;
means for exercising said tool model and said chip-flow model to derive the predicted response of said tool and the simulation of said chip-flow phenomenon;
artificial intelligence means for evaluating the predicted tool response and the chip-flow simulation by applying said performance indices to an adaptive set of rules embodying predetermined acceptability criteria, whereby said rules generate correlation measures between said indices and said criteria;
means operatively coupled to said artificial intelligence means for accessing cutting information from an updatable database which includes results of past cutting operations;
means responsive to said correlation measures for rendering judgments which assign acceptability levels to said performance indices;
means for providing a recommendation embodying said judgments;
means responsive to said recommendation for modifying said rules;
means coupled to said exercising means and responsive to said recommendation for adjusting said tool parameters and said chip-flow parameters so as to reexercise said tool model and said chip-flow model; and
means for updating said database with information representing the predicted tool response and the chip-flow simulation.

* * * * *